US012750443B2

(12) United States Patent
Pandey et al.

(10) Patent No.: US 12,750,443 B2
(45) Date of Patent: Sep. 29, 2026

(54) AUTOMATED CALL LIST BASED ON SIMILAR DISCUSSIONS

(71) Applicant: The Toronto-Dominion Bank, Toronto (CA)

(72) Inventors: Anand Pandey, Toronto (CA); Prerak Trivedi, Toronto (CA); Linda Ling Tao, Toronto (CA); John Jong-Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 375 days.

(21) Appl. No.: 18/481,102

(22) Filed: Oct. 4, 2023

(65) Prior Publication Data

US 2025/0119494 A1 Apr. 10, 2025

(51) Int. Cl.

| | |
|---|---|
| ***G10L 15/26*** | (2006.01) |
| ***G10L 15/18*** | (2013.01) |
| ***H04M 3/22*** | (2006.01) |
| *G10L 15/08* | (2006.01) |

(52) U.S. Cl.

CPC ....... *H04M 3/2218* (2013.01); *G10L 15/1822* (2013.01); *G10L 15/26* (2013.01); *G10L 2015/088* (2013.01)

(58) Field of Classification Search

CPC .. H04M 3/2218; G06F 40/284; G06F 40/216; G06F 40/30; G06Q 30/015; G06Q 10/109; G06Q 30/0241; G06Q 40/06; G06Q 50/16; G06Q 50/186; G06Q 2220/00; G10L 15/1822; G10L 15/26; G10L 2015/088; H04L 12/1822; H04L 12/1827; H04L 51/02

USPC ........................................................ 455/414.1

See application file for complete search history.

(56) References Cited

U.S. PATENT DOCUMENTS

| | | | |
|---|---|---|---|
| 7,890,409 | B2 | 2/2011 | Rachev et al. |
| 8,254,535 | B1 | 8/2012 | Madhavapeddi et al. |
| 8,498,913 | B2 | 7/2013 | Jenson et al. |
| 8,977,584 | B2 | 3/2015 | Jerram et al. |
| 9,864,982 | B2 | 1/2018 | Bristow et al. |
| 9,936,066 | B1 | 4/2018 | Mammen et al. |
| 10,163,085 | B2 | 12/2018 | D'Agostino et al. |
| 10,176,808 | B1 | 1/2019 | Lovitt et al. |
| 10,178,246 | B1 | 1/2019 | Horvath et al. |
| 10,181,114 | B2 | 1/2019 | Tseretopoulos et al. |
| 10,191,951 | B1 | 1/2019 | Bronstein et al. |
| 10,339,931 | B2 | 7/2019 | Tseretopoulos et al. |
| 10,346,824 | B2 | 7/2019 | Chan et al. |

(Continued)

OTHER PUBLICATIONS

IP.com search history (Year: 2025).*

Heglin et al., "Auto-Adjudication Process via Machine Learning," U.S. Appl. No. 19/053,942, filed Feb. 14, 2025.

*Primary Examiner* — Moustapha Diaby

(57) ABSTRACT

An example operation may include one or more of receiving content from a conversation between a user on a user device and a second user on a second user device that is connected to the user device via a network, identifying a topic of the conversation based on execution of a generative artificial intelligence (GenAI) model on the received content from the conversation, identifying a call list that is previously stored in memory that is associated with the topic of the conversation based on keywords included in the identified topic of the conversation, and adding an identifier of the user to the call list stored in memory.

20 Claims, 30 Drawing Sheets

(56) References Cited

U.S. PATENT DOCUMENTS

| | | | |
|---|---|---|---|
| 10,360,303 | B2 | 7/2019 | Volkovs et al. |
| 10,405,146 | B1 | 9/2019 | Kuruvilla et al. |
| 10,438,206 | B2 | 10/2019 | Jivraj et al. |
| 10,440,196 | B2 | 10/2019 | Horvath et al. |
| 10,440,197 | B2 | 10/2019 | Horvath et al. |
| 10,460,748 | B2 | 10/2019 | Tseretopoulos et al. |
| 10,475,125 | B1 | 11/2019 | Kumari et al. |
| 10,482,675 | B1 | 11/2019 | Sutter et al. |
| 10,546,350 | B2 | 1/2020 | Dorai et al. |
| 10,607,294 | B1 | 3/2020 | Mitchell et al. |
| 10,659,400 | B2 | 5/2020 | Moon et al. |
| 10,698,902 | B2 | 6/2020 | Tseretopoulos et al. |
| 10,706,635 | B2 | 7/2020 | Sutter et al. |
| 10,708,721 | B2 | 7/2020 | Kuruvilla et al. |
| 10,713,725 | B1 | 7/2020 | Shelon et al. |
| 10,714,084 | B2 | 7/2020 | Engles et al. |
| 10,728,259 | B2 | 7/2020 | McCarter et al. |
| 10,762,683 | B2 | 9/2020 | Matas et al. |
| 10,776,619 | B2 | 9/2020 | Collinson et al. |
| 10,824,941 | B2 | 11/2020 | Volkovs et al. |
| 10,831,923 | B2 | 11/2020 | Dunjic et al. |
| 10,832,047 | B2 | 11/2020 | Moghtadai |
| 10,841,424 | B1 | 11/2020 | Lemus et al. |
| 10,862,897 | B2 | 12/2020 | D'Agostino et al. |
| 10,867,292 | B2 | 12/2020 | Lin et al. |
| 10,867,293 | B2 | 12/2020 | Bristow et al. |
| 10,877,980 | B1 | 12/2020 | Bronstein et al. |
| 10,878,816 | B2 | 12/2020 | Tseretopoulos et al. |
| 10,902,220 | B2 | 1/2021 | Lozon et al. |
| 10,922,665 | B2 | 2/2021 | Miller et al. |
| 10,943,605 | B2 | 3/2021 | Tseretopoulos et al. |
| 10,970,792 | B1 | 4/2021 | Benkreira et al. |
| 10,977,617 | B2 | 4/2021 | Tseretopoulos et al. |
| 11,004,187 | B2 | 5/2021 | Kuruvilla et al. |
| 11,017,028 | B2 | 5/2021 | Dunjic et al. |
| 11,030,415 | B2 | 6/2021 | Volkovs et al. |
| 11,055,924 | B2 | 7/2021 | Navarro et al. |
| 11,061,638 | B2 | 7/2021 | Lam |
| 11,070,448 | B2 | 7/2021 | Miller et al. |
| 11,070,673 | B1 | 7/2021 | Lemus et al. |
| 11,087,314 | B2 | 8/2021 | Gandhi et al. |
| 11,089,154 | B2 | 8/2021 | Kim |
| 11,100,168 | B2 | 8/2021 | Miller et al. |
| 11,120,510 | B1 | 9/2021 | Mitchell et al. |
| 11,140,143 | B2 | 10/2021 | Moon et al. |
| 11,144,921 | B2 | 10/2021 | Dunjic et al. |
| 11,144,998 | B2 | 10/2021 | Kuruvilla et al. |
| 11,145,169 | B2 | 10/2021 | Pratten et al. |
| 11,182,860 | B2 | 11/2021 | Kuruvilla et al. |
| 11,200,328 | B2 | 12/2021 | Shpurov et al. |
| 11,200,411 | B2 | 12/2021 | Rizvi et al. |
| 11,210,857 | B2 | 12/2021 | Rizvi et al. |
| 11,222,286 | B2 | 1/2022 | Choe et al. |
| 11,232,304 | B2 | 1/2022 | Navarro et al. |
| 11,276,257 | B2 | 3/2022 | Moghtadai et al. |
| 11,297,181 | B2 | 4/2022 | Johnson et al. |
| 11,303,642 | B2 | 4/2022 | Dunjic et al. |
| 11,308,561 | B2 | 4/2022 | Amaral et al. |
| 11,334,574 | B2 | 5/2022 | Caputo et al. |
| 11,347,744 | B2 | 5/2022 | Tseretopoulos et al. |
| 11,349,871 | B2 | 5/2022 | Moon et al. |
| 11,354,442 | B2 | 6/2022 | Haldenby et al. |
| 11,361,566 | B2 | 6/2022 | Collinson et al. |
| 11,373,229 | B2 | 6/2022 | Tseretopoulos et al. |
| 11,386,496 | B2 | 7/2022 | Zhu et al. |
| 11,392,776 | B2 | 7/2022 | Lozon et al. |
| 11,393,020 | B2 | 7/2022 | Mathew et al. |
| 11,394,668 | B1 | 7/2022 | Subbunarayanan et al. |
| 11,397,765 | B2 | 7/2022 | Volkovs et al. |
| 11,409,811 | B2 | 8/2022 | D'Agostino |
| 11,411,734 | B2 | 8/2022 | Shpurov et al. |
| 11,430,242 | B2 | 8/2022 | Moghtadai |
| 11,436,809 | B2 | 9/2022 | Rizvi et al. |
| 11,443,380 | B2 | 9/2022 | Cummings |
| 11,451,669 | B1 | 9/2022 | Navarro et al. |
| 11,469,878 | B2 | 10/2022 | Shpurov et al. |
| 11,470,091 | B2 | 10/2022 | McCarter et al. |
| 11,470,143 | B2 | 10/2022 | Joheb et al. |
| 11,475,059 | B2 | 10/2022 | Liu et al. |
| 11,475,251 | B2 | 10/2022 | Morin et al. |
| 11,477,265 | B2 | 10/2022 | McPhee et al. |
| 11,507,622 | B2 | 11/2022 | Grebenisan et al. |
| 11,507,868 | B2 | 11/2022 | Kwong et al. |
| 11,514,294 | B2 | 11/2022 | Snelgrove et al. |
| 11,521,601 | B2 | 12/2022 | McCourt et al. |
| 11,538,116 | B2 | 12/2022 | Benkreira et al. |
| 11,546,345 | B2 | 1/2023 | D'Agostino et al. |
| 11,580,762 | B2 | 2/2023 | Rizvi et al. |
| 11,600,064 | B2 | 3/2023 | Navarro et al. |
| 11,604,899 | B2 | 3/2023 | Haldenby et al. |
| 11,620,741 | B2 | 4/2023 | Kuruvilla et al. |
| 11,632,311 | B2 | 4/2023 | Miller et al. |
| 11,645,547 | B2 | 5/2023 | Tian et al. |
| 11,651,100 | B2 | 5/2023 | Dunjic et al. |
| 11,663,488 | B2 | 5/2023 | Volkovs et al. |
| 11,671,536 | B2 | 6/2023 | Navarro et al. |
| 11,676,593 | B2 | 6/2023 | Kwatra et al. |
| 11,687,995 | B2 | 6/2023 | Tseretopoulos et al. |
| 11,689,484 | B2 | 6/2023 | Moon et al. |
| 11,704,736 | B1 | 7/2023 | Krieger et al. |
| 11,704,782 | B2 | 7/2023 | Wakim et al. |
| 11,741,305 | B2 | 8/2023 | Skaljin et al. |
| 11,743,210 | B2 | 8/2023 | Moon et al. |
| 11,743,378 | B1 | 8/2023 | Johnston et al. |
| 11,748,400 | B2 | 9/2023 | Volkovs et al. |
| 11,756,388 | B2 | 9/2023 | Pratten et al. |
| 11,777,918 | B2 | 10/2023 | Moon et al. |
| 11,782,935 | B2 | 10/2023 | Caputo et al. |
| 11,789,909 | B2 | 10/2023 | Grebenisan et al. |
| 11,790,012 | B2 | 10/2023 | D'Agostino |
| 11,790,354 | B2 | 10/2023 | Gandhi et al. |
| 11,797,962 | B2 | 10/2023 | Jones et al. |
| 11,809,486 | B2 | 11/2023 | Liu et al. |
| 11,809,577 | B2 | 11/2023 | Begg et al. |
| 11,811,826 | B2 | 11/2023 | Moon et al. |
| 11,842,252 | B2 | 12/2023 | Kuang et al. |
| 11,875,398 | B2 | 1/2024 | Pratten et al. |
| 11,880,811 | B2 | 1/2024 | Pawelkiewicz et al. |
| 11,886,764 | B2 | 1/2024 | Lam |
| 11,928,112 | B2 | 3/2024 | Dunjic et al. |
| 11,941,525 | B2 | 3/2024 | Morin et al. |
| 11,941,703 | B2 | 3/2024 | Kuruvilla et al. |
| 11,955,117 | B2 | 4/2024 | McDermid et al. |
| 11,966,491 | B2 | 4/2024 | D'Agostino |
| 11,978,085 | B2 | 5/2024 | Rai et al. |
| 11,978,090 | B2 | 5/2024 | Navarro et al. |
| 11,985,153 | B2 | 5/2024 | Karl |
| 11,995,121 | B2 | 5/2024 | Volkovs et al. |
| 12,008,315 | B2 | 6/2024 | Miller et al. |
| 12,014,303 | B2 | 6/2024 | Carvalho et al. |
| 12,019,594 | B2 | 6/2024 | Floyd et al. |
| 12,021,874 | B2 | 6/2024 | Dunjic et al. |
| 12,039,535 | B2 | 7/2024 | Dunjic et al. |
| 12,052,363 | B2 | 7/2024 | Shpurov et al. |
| 12,061,652 | B2 | 8/2024 | Miller et al. |
| 12,067,130 | B2 | 8/2024 | Shpurov et al. |
| 12,067,580 | B2 | 8/2024 | Jeske et al. |
| 12,079,351 | B2 | 9/2024 | Begg et al. |
| 12,094,005 | B1 | 9/2024 | Boyd et al. |
| 12,106,220 | B2 | 10/2024 | Volkovs et al. |
| 12,111,793 | B2 | 10/2024 | Grebenisan et al. |
| 12,124,925 | B2 | 10/2024 | Rho et al. |
| 12,136,079 | B2 | 11/2024 | Jones et al. |
| 12,164,542 | B1 | 12/2024 | Rahman et al. |
| 12,169,693 | B2 | 12/2024 | Lu |
| 12,182,800 | B2 | 12/2024 | Navarro et al. |
| 12,198,109 | B2 | 1/2025 | Abbas |
| 12,198,510 | B2 | 1/2025 | Pratten et al. |
| 12,210,534 | B2 | 1/2025 | Cashion et al. |
| 12,211,274 | B2 | 1/2025 | Ma et al. |
| 12,217,011 | B2 | 2/2025 | Luo et al. |
| 12,223,549 | B2 | 2/2025 | Bouëtté et al. |
| 12,229,690 | B2 | 2/2025 | Stanevich et al. |
| 12,254,512 | B2 | 3/2025 | Heglin et al. |

(56) References Cited

U.S. PATENT DOCUMENTS 12,282,785 B2 4/2025 Karbasi et al.
12,288,236 B2 4/2025 Volkovs et al.
12,299,149 B2 5/2025 Nikoghossian et al.
12,316,715 B2 5/2025 Taheri et al.
12,321,861 B2 6/2025 Volkovs et al.
12,326,856 B2 6/2025 Mohammed et al.
12,333,354 B2 6/2025 Mohammed et al.
12,353,969 B2 7/2025 Kuang et al.
12,354,094 B2 7/2025 Jones et al.
12,373,795 B2 7/2025 Misler et al.
12,406,084 B1 9/2025 Krull et al.
2002/0111890 A1 8/2002 Sloan et al.
2005/0027632 A1 2/2005 Zeitoun et al.
2007/0156512 A1 7/2007 Yerkie
2009/0276368 A1 11/2009 Martin et al.
2010/0088406 A1 4/2010 Yu et al.
2012/0136804 A1 5/2012 Lucia, Sr. et al.
2013/0013530 A1 1/2013 Nowacki
2013/0018819 A1 1/2013 Willis
2014/0019380 A1 1/2014 Farrow
2015/0154706 A1 6/2015 Wakeman
2016/0358260 A1 12/2016 Banner et al.
2017/0213288 A1 7/2017 Zhang et al.
2017/0293845 A1 10/2017 McAllister et al.
2018/0196796 A1* 7/2018 Wu ....................... G06F 40/289
2018/0268818 A1 9/2018 Schoenmackers et al.
2019/0108592 A1 4/2019 Banner et al.
2019/0172045 A1 6/2019 Dunjic et al.
2019/0172142 A1 6/2019 Sundby
2019/0354557 A1 11/2019 Kornblit
2020/0058068 A1 2/2020 Gandhi et al.
2020/0137230 A1 4/2020 Spohrer
2020/0211100 A1 7/2020 Orogbemi
2020/0279554 A1 9/2020 Canter et al.
2021/0027160 A1 1/2021 Volkovs et al.
2021/0027320 A1 1/2021 Schwenkler et al.
2021/0037040 A1 2/2021 Aleks et al.
2021/0044697 A1* 2/2021 Khafizov ............ G06N 3/0442
2021/0056625 A1 2/2021 Kotarinos
2021/0117893 A1 4/2021 Sohum et al.
2021/0174218 A1 6/2021 Miller et al.
2021/0224899 A1 7/2021 Kirk
2021/0225052 A1 7/2021 Marzorati et al.
2021/0232950 A1 7/2021 Kono
2021/0264461 A1 8/2021 Fam
2021/0319513 A1 10/2021 Oliveira et al.
2021/0334473 A1 10/2021 Trehan
2021/0335367 A1 10/2021 Graff et al.
2021/0407016 A1 12/2021 Kuruvilla et al.
2022/0019750 A1 1/2022 Ravichandran et al.
2022/0058489 A1 2/2022 Volkovs et al.
2022/0084119 A1 3/2022 French et al.
2022/0108069 A1 4/2022 Lee
2022/0157094 A1 5/2022 Moghtadai et al.
2022/0172083 A1 6/2022 Wu et al.
2022/0188705 A1 6/2022 Davoodi et al.
2022/0198411 A1 6/2022 Jones et al.
2022/0198432 A1 6/2022 Jones et al.
2022/0198445 A1 6/2022 Jones et al.
2022/0198565 A1 6/2022 Krishnaswamy et al.
2022/0207295 A1 6/2022 Stanevich et al.
2022/0207430 A1 6/2022 Dickie et al.
2022/0207432 A1 6/2022 Whelan et al.
2022/0207606 A1 6/2022 Dickie et al.
2022/0207617 A1 6/2022 Amaral et al.
2022/0237700 A1 7/2022 Sreenivasan
2022/0245060 A1 8/2022 Kathuria et al.
2022/0255889 A1* 8/2022 Deole ................... H04L 51/046
2022/0261535 A1 8/2022 Madaan et al.
2022/0261885 A1 8/2022 Kim et al.
2022/0270155 A1 8/2022 Volkovs et al.
2022/0270594 A1 8/2022 Sejpal et al.
2022/0277213 A1 9/2022 Braviner et al.
2022/0277227 A1 9/2022 Yu et al.
2022/0277323 A1 9/2022 Whelan et al.
2022/0284450 A1 9/2022 Asta et al.
2022/0294904 A1* 9/2022 Shah .................. G06Q 30/0601
2022/0300716 A1 9/2022 Sabharwal et al.
2022/0300903 A1 9/2022 Huang et al.
2022/0309079 A1 9/2022 Kurniawan et al.
2022/0309573 A1 9/2022 Mathew et al.
2022/0318573 A1 10/2022 Smith et al.
2022/0318617 A1 10/2022 Wong et al.
2022/0318860 A1 10/2022 Dorch et al.
2022/0327397 A1 10/2022 Braviner et al.
2022/0327430 A1 10/2022 Zuberi et al.
2022/0327431 A1 10/2022 Braviner et al.
2022/0327432 A1 10/2022 Gutierrez Bugarin et al.
2022/0327625 A1 10/2022 Leung et al.
2022/0335718 A1 10/2022 Ma et al.
2022/0343422 A1 10/2022 Zuberi et al.
2022/0366064 A1 11/2022 Nikoghossian et al.
2022/0383301 A1 12/2022 Jones et al.
2022/0383313 A1 12/2022 Jones et al.
2022/0383314 A1 12/2022 Jones et al.
2022/0385491 A1* 12/2022 Morris ................ H04L 12/1822
2022/0405299 A1 12/2022 Leung et al.
2022/0414495 A1 12/2022 Stanevich et al.
2023/0006809 A1 1/2023 Shpurov et al.
2023/0007063 A1* 1/2023 Gupta .................. H04L 65/403
2023/0007075 A1 1/2023 Mcphee et al.
2023/0011451 A1 1/2023 Lu
2023/0048437 A1 2/2023 Karbasi et al.
2023/0083899 A1 3/2023 Gandouet et al.
2023/0086653 A1 3/2023 Zykh et al.
2023/0107703 A1 4/2023 Zhang et al.
2023/0113752 A1 4/2023 Jorlett et al.
2023/0114589 A1 4/2023 Siow et al.
2023/0119108 A1 4/2023 Volkovs et al.
2023/0131935 A1 4/2023 Volkovs et al.
2023/0135162 A1 5/2023 Cohen et al.
2023/0153461 A1 5/2023 Kalra et al.
2023/0195734 A1 6/2023 Cashion et al.
2023/0196406 A1 6/2023 Gandouet et al.
2023/0244917 A1 8/2023 Loaiza Ganem et al.
2023/0244962 A1 8/2023 Volkovs et al.
2023/0252301 A1 8/2023 Volkovs et al.
2023/0259883 A1 8/2023 Misler et al.
2023/0267367 A1 8/2023 Volkovs et al.
2023/0267475 A1 8/2023 Navarro et al.
2023/0306434 A1 9/2023 Dunjic et al.
2023/0316485 A1 10/2023 Wakim et al.
2023/0318994 A1 10/2023 Moon et al.
2023/0336615 A1 10/2023 Joheb et al.
2023/0342481 A1 10/2023 Nikoghossian et al.
2023/0344814 A1 10/2023 Moon et al.
2023/0351116 A1 11/2023 Skaljin et al.
2023/0368048 A1 11/2023 Yang et al.
2023/0377047 A1 11/2023 Bouëtté et al.
2023/0385693 A1 11/2023 Cresswell et al.
2023/0385694 A1 11/2023 Cresswell et al.
2023/0386190 A1 11/2023 Cresswell et al.
2023/0394452 A1 12/2023 Jones et al.
2023/0401192 A1 12/2023 Yang et al.
2023/0401553 A1 12/2023 Navarro et al.
2023/0401572 A1 12/2023 Navarro et al.
2023/0419302 A1 12/2023 Navarro et al.
2023/0419402 A1 12/2023 Ghelichi et al.
2024/0020534 A1 1/2024 Perez Vallejo et al.
2024/0062117 A1 2/2024 Kuang et al.
2024/0087029 A1 3/2024 Carter
2024/0106851 A1 3/2024 Kennedy et al.
2024/0119346 A1 4/2024 Chang et al.
2024/0126575 A1 4/2024 Kiriakou et al.
2024/0127036 A1 4/2024 Zuberi et al.
2024/0127214 A1 4/2024 Wander et al.
2024/0193562 A1 6/2024 Pratten et al.
2024/0202756 A1 6/2024 Karl et al.
2024/0203405 A1 6/2024 McDermid et al.
2024/0211732 A1 6/2024 Wander et al.
2024/0212049 A1 6/2024 Ghelichi et al.
2024/0220653 A1 7/2024 D'Agostino
2024/0232614 A1 7/2024 Esmaeili et al.
2024/0232950 A1 7/2024 Navarro et al.

(56) References Cited

U.S. PATENT DOCUMENTS

| | | | |
|---|---|---|---|
| 2024/0249310 | A1 | 7/2024 | Rai et al. |
| 2024/0256903 | A1 | 8/2024 | Ens et al. |
| 2024/0256904 | A1 | 8/2024 | Leung et al. |
| 2024/0256968 | A1 | 8/2024 | Hosseinzadeh et al. |
| 2024/0265055 | A1 | 8/2024 | Purkayastha |
| 2024/0281467 | A1 | 8/2024 | Volkovs et al. |
| 2024/0281808 | A1 | 8/2024 | Vouitsis et al. |
| 2024/0281818 | A1 | 8/2024 | Golestan Irani et al. |
| 2024/0289645 | A1 | 8/2024 | Makhijani et al. |
| 2024/0289876 | A1 | 8/2024 | Mathew et al. |
| 2024/0303551 | A1 | 9/2024 | Li et al. |
| 2024/0304182 | A1 | 9/2024 | Hamilton et al. |
| 2024/0330772 | A1 | 10/2024 | Cresswell et al. |
| 2024/0330809 | A1 | 10/2024 | Carvalho et al. |
| 2024/0338520 | A1 | 10/2024 | Misler et al. |
| 2024/0346338 | A1 | 10/2024 | Desai et al. |
| 2024/0362716 | A1 | 10/2024 | Woiwood |
| 2024/0370880 | A1 | 11/2024 | Jeske et al. |
| 2024/0370881 | A1 | 11/2024 | Jeske et al. |
| 2024/0385838 | A1 | 11/2024 | Yu et al. |
| 2024/0386295 | A1 | 11/2024 | Yu et al. |
| 2024/0386325 | A1 | 11/2024 | Yu et al. |
| 2024/0386326 | A1 | 11/2024 | Yu et al. |
| 2024/0386427 | A1 | 11/2024 | Abbas et al. |
| 2024/0386495 | A1 | 11/2024 | Radosta |
| 2024/0394569 | A1 | 11/2024 | Farhadi Hassan Kiadeh et al. |
| 2024/0394588 | A1 | 11/2024 | Heglan et al. |
| 2024/0403702 | A1 | 12/2024 | Deljavan Farshi |
| 2024/0403862 | A1 | 12/2024 | Abbas et al. |
| 2024/0412069 | A1 | 12/2024 | Volkovs et al. |
| 2024/0412078 | A1 | 12/2024 | Ghelichi et al. |
| 2024/0412083 | A1 | 12/2024 | Starszyk et al. |
| 2024/0419978 | A1 | 12/2024 | Stein et al. |
| 2024/0420010 | A1 | 12/2024 | Cirulis et al. |
| 2024/0420011 | A1 | 12/2024 | Cirulis et al. |
| 2024/0428283 | A1 | 12/2024 | Belbahri et al. |
| 2025/0013363 | A1 | 1/2025 | Estoesta et al. |
| 2025/0013697 | A1 | 1/2025 | Estoesta et al. |
| 2025/0013927 | A1 | 1/2025 | Rho et al. |
| 2025/0014010 | A1 | 1/2025 | Jones et al. |
| 2025/0014052 | A1 | 1/2025 | Bhattacharjee et al. |
| 2025/0028852 | A1 | 1/2025 | Chowanski et al. |
| 2025/0028934 | A1 | 1/2025 | Wong et al. |
| 2025/0029012 | A1 | 1/2025 | Rho et al. |
| 2025/0045308 | A1 | 2/2025 | Rogynskyy et al. |
| 2025/0045601 | A1 | 2/2025 | Zuberi et al. |
| 2025/0053387 | A1 | 2/2025 | Wang et al. |
| 2025/0068646 | A1 | 2/2025 | Rahman et al. |
| 2025/0068853 | A1 | 2/2025 | Lu |
| 2025/0069063 | A1 | 2/2025 | Navarro et al. |
| 2025/0070994 | A1 | 2/2025 | Daredia et al. |
| 2025/0077187 | A1 | 3/2025 | Guttridge et al. |
| 2025/0077188 | A1 | 3/2025 | Guttridge et al. |
| 2025/0077189 | A1 | 3/2025 | Guttridge et al. |
| 2025/0077190 | A1 | 3/2025 | Guttridge et al. |
| 2025/0077204 | A1 | 3/2025 | Guttridge et al. |
| 2025/0077227 | A1 | 3/2025 | Guttridge et al. |
| 2025/0077396 | A1 | 3/2025 | Sen |
| 2025/0077397 | A1 | 3/2025 | Sen |
| 2025/0077399 | A1 | 3/2025 | Sen |
| 2025/0077400 | A1 | 3/2025 | Sen |
| 2025/0077556 | A1 | 3/2025 | Guttridge et al. |
| 2025/0077681 | A1 | 3/2025 | Sen |
| 2025/0077682 | A1 | 3/2025 | Guttridge et al. |
| 2025/0077939 | A1 | 3/2025 | Tabatabaei et al. |
| 2025/0078324 | A1 | 3/2025 | Gormley |
| 2025/0078325 | A1 | 3/2025 | Gormley |
| 2025/0078344 | A1 | 3/2025 | Gormley |
| 2025/0078345 | A1 | 3/2025 | Gormley |
| 2025/0078972 | A1 | 3/2025 | Gormley |
| 2025/0085936 | A1 | 3/2025 | Guttridge et al. |
| 2025/0086096 | A1 | 3/2025 | Guttridge et al. |
| 2025/0086440 | A1 | 3/2025 | Erb et al. |
| 2025/0086441 | A1 | 3/2025 | Guttridge et al. |
| 2025/0086451 | A1 | 3/2025 | Guttridge et al. |
| 2025/0086551 | A1 | 3/2025 | Zhao |
| 2025/0094437 | A1 | 3/2025 | Upendran |
| 2025/0103609 | A1 | 3/2025 | Upendran |
| 2025/0103961 | A1 | 3/2025 | Cresswell et al. |
| 2025/0103980 | A1 | 3/2025 | Deljavan Farshi et al. |
| 2025/0104024 | A1 | 3/2025 | Abbas |
| 2025/0104029 | A1 | 3/2025 | Deljavan Farshi et al. |
| 2025/0104047 | A1 | 3/2025 | Mashkevich |
| 2025/0104050 | A1 | 3/2025 | Mashkevich |
| 2025/0104059 | A1 | 3/2025 | Mashkevich |
| 2025/0104074 | A1 | 3/2025 | Tsang et al. |
| 2025/0104306 | A1 | 3/2025 | Mashkevich |
| 2025/0104700 | A1 | 3/2025 | Henault-Ethier et al. |
| 2025/0106060 | A1 | 3/2025 | Gormley et al. |
| 2025/0106201 | A1 | 3/2025 | Gormley |
| 2025/0110805 | A1 | 4/2025 | Starszyk et al. |
| 2025/0117411 | A1 | 4/2025 | Mohammed |
| 2025/0117595 | A1 | 4/2025 | Taheri |
| 2025/0117596 | A1 | 4/2025 | Taheri |
| 2025/0117623 | A1 | 4/2025 | Devarajan et al. |
| 2025/0117629 | A1 | 4/2025 | Pandey et al. |
| 2025/0117630 | A1 | 4/2025 | Taheri |
| 2025/0117769 | A1 | 4/2025 | Taheri |
| 2025/0117836 | A1 | 4/2025 | Taheri et al. |
| 2025/0117853 | A1 | 4/2025 | Pandey et al. |
| 2025/0117854 | A1 | 4/2025 | Pandey et al. |
| 2025/0117855 | A1 | 4/2025 | Pandey et al. |
| 2025/0117856 | A1 | 4/2025 | Pandey et al. |
| 2025/0119396 | A1 | 4/2025 | Taheri |
| 2025/0119494 | A1 | 4/2025 | Pandey et al. |
| 2025/0119495 | A1 | 4/2025 | Pandey et al. |
| 2025/0124039 | A1 | 4/2025 | Cashion et al. |
| 2025/0124240 | A1 | 4/2025 | Luo et al. |
| 2025/0131718 | A1 | 4/2025 | Ma et al. |
| 2025/0138838 | A1 | 5/2025 | Ramesh et al. |
| 2025/0139267 | A1 | 5/2025 | Zykh et al. |
| 2025/0139382 | A1 | 5/2025 | Mohammed et al. |
| 2025/0139708 | A1 | 5/2025 | Bouëttéet al. |
| 2025/0147733 | A1 | 5/2025 | Abbas et al. |
| 2025/0148321 | A1 | 5/2025 | Stanevich et al. |
| 2025/0165375 | A1 | 5/2025 | Cresswell et al. |
| 2025/0165866 | A1 | 5/2025 | Cresswell et al. |
| 2025/0173170 | A1 | 5/2025 | Glynn-Udrow et al. |
| 2025/0173568 | A1 | 5/2025 | Cresswell et al. |
| 2025/0173618 | A1 | 5/2025 | Cresswell et al. |
| 2025/0173619 | A1 | 5/2025 | Cresswell et al. |
| 2025/0173725 | A1 | 5/2025 | Devarajan et al. |
| 2025/0181321 | A1 | 6/2025 | Gormley |
| 2025/0182028 | A1 | 6/2025 | Gormley |
| 2025/0182196 | A1 | 6/2025 | Gormley |
| 2025/0182222 | A1 | 6/2025 | Gormley |
| 2025/0191062 | A1 | 6/2025 | Heglin et al. |
| 2025/0217175 | A1 | 7/2025 | Karbasi et al. |
| 2025/0225560 | A1 | 7/2025 | Bajaj et al. |
| 2025/0231668 | A1 | 7/2025 | Tao et al. |
| 2025/0231750 | A1 | 7/2025 | Lim et al. |
| 2025/0231774 | A1 | 7/2025 | Tao et al. |
| 2025/0231775 | A1 | 7/2025 | Tao et al. |
| 2025/0231793 | A1 | 7/2025 | Lim et al. |
| 2025/0232130 | A1 | 7/2025 | Tao et al. |
| 2025/0232351 | A1 | 7/2025 | Tao et al. |
| 2025/0232375 | A1 | 7/2025 | Tao et al. |
| 2025/0232376 | A1 | 7/2025 | Tao et al. |
| 2025/0232377 | A1 | 7/2025 | Tao et al. |
| 2025/0232503 | A1 | 7/2025 | Lim et al. |
| 2025/0238536 | A1 | 7/2025 | Nikoghossian et al. |
| 2025/0245071 | A1 | 7/2025 | Ionescu et al. |
| 2025/0245511 | A1 | 7/2025 | D'Agostino et al. |

* cited by examiner

200

300A

300B

300C

400

570

640

650

750

800

900

1000

1110

1130

1140

1150

1160

AUTOMATED CALL LIST BASED ON SIMILAR DISCUSSIONS

BACKGROUND

Wealth advisors work with clients to develop investment strategies, retirement plans, wealth-building plans, and the like. In many cases, an advisor will speak with clients during meetings, phone calls, teleconferences, and the like, which are conducted using meeting software. The meeting software may display a dashboard with information about assets to help the client understand and make informed wealth management decisions. Over time, an advisor may meet with multiple clients to discuss similar assets and strategies. In many cases, the content displayed on the dashboard and discussed during the meetings contains significant overlap with previous content discussed by the advisor during previous meetings with the client or other clients. However, at present, there is no way to leverage the redundant content.

SUMMARY

An example embodiment provides an apparatus that may include receive a conversation of a user, identify a goal of the user from the conversation, identify a different user that is associated with the identified goal of the conversation, generating a call script comprising a description of content therein to be discussed with a different user based on execution of a generative artificial intelligence (GenAI) model on the identified goal, and integrate the call script into a digital calendar of the different user within the memory.

Another example embodiment provides a method that includes one or more of receiving a conversation of a user, identifying a goal of the user from the conversation, identifying a different user that is associated with the identified goal of the conversation, generating a call script comprising a description of content therein to be discussed with a different user based on execution of a generative artificial intelligence (GenAI) model on the identified goal, and integrating the call script into a digital calendar of the different user.

A further example embodiment provides a computer-readable medium comprising instructions, that when read by a processor, cause the processor to perform one or more of receiving a conversation of a user, identifying a goal of the user from the conversation, identifying a different user that is associated with the identified goal of the conversation, generating a call script comprising a description of content therein to be discussed with a different user based on execution of a generative artificial intelligence (GenAI) model on the identified goal, and integrating the call script into a digital calendar of the different user.

A further example embodiment provides an apparatus that may include store a portfolio of assets of a user in memory, receive contextual data of the user from a user device of the user, identify an asset of interest that is not included in the portfolio of assets of the user based on execution of a generative artificial intelligence (GenAI) model on the portfolio of assets of the user and the received contextual data of the user, generate a different portfolio of assets based on the asset of interest that is not included in the portfolio of assets of the user, and display the different portfolio of assets via a user interface.

A further example embodiment provides a method that includes one or more of storing a portfolio of assets of a user in memory, receiving contextual data of the user from a user device of the user, identifying an asset of interest that is not included in the portfolio of assets of the user based on execution of a generative artificial intelligence (GenAI) model on the portfolio of assets of the user and the received contextual data of the user, generating a different portfolio of assets based on the asset of interest that is not included in the portfolio of assets of the user; and displaying the different portfolio of assets via a user interface.

A further example embodiment provides a computer-readable medium comprising instructions, that when read by a processor, cause the processor to perform one or more of storing a portfolio of assets of a user in memory, receiving contextual data of the user from a user device of the user, identifying an asset of interest that is not included in the portfolio of assets of the user based on execution of a generative artificial intelligence (GenAI) model on the portfolio of assets of the user and the received contextual data of the user, generating a different portfolio of assets based on the asset of interest that is not included in the portfolio of assets of the user; and displaying the different portfolio of assets via a user interface.

One example embodiment provides an apparatus that may include store a portfolio of assets of a user in memory, receive text from a conversation between the user on a first device and a second user on a second device, identify an upcoming life event of the user based on execution of a generative artificial intelligence (GenAI) model on the received text from the conversation, determine a change to the portfolio of assets of the user based on the upcoming life event and existing assets within the portfolio of assets, and display the change to the portfolio of assets of the user via a user interface.

Another example embodiment provides a method that includes one or more of storing a portfolio of assets of a user in memory, receiving text from a conversation between the user on a first device and a second user on a second device, identifying an upcoming life event of the user based on execution of a generative artificial intelligence (GenAI) model on the received text from the conversation, determining a change to the portfolio of assets of the user based on the upcoming life event and existing assets within the portfolio of assets, and displaying the change to the portfolio of assets of the user via a user interface.

A further example embodiment provides a computer-readable medium comprising instructions, that when read by a processor, cause the processor to perform one or more of storing a portfolio of assets of a user in memory, receiving text from a conversation between the user on a first device and a second user on a second device, identifying an upcoming life event of the user based on execution of a generative artificial intelligence (GenAI) model on the received text from the conversation, determining a change to the portfolio of assets of the user based on the upcoming life event and existing assets within the portfolio of assets, and displaying the change to the portfolio of assets of the user via a user interface.

A further example embodiment provides an apparatus that may include store a current portfolio of a user in memory, receive contextual data of the user from a user device of the user, identify an asset of interest of the user based on execution of a generative artificial intelligence (GenAI) model based on the received contextual data of the user and the current portfolio of the user stored in memory, predict a performance of the current portfolio with the identified asset of interest included therein at a future point in time, and display the predicted performance of the current portfolio with the identified asset of interest included therein on a user interface.

A further example embodiment provides a method that includes one or more of storing a current portfolio of a user in memory, receiving contextual data of the user from a user device of the user, identifying an asset of interest of the user based on execution of a generative artificial intelligence (GenAI) model based on the received contextual data of the user and the current portfolio of the user stored in memory, predicting a performance of the current portfolio with the identified asset of interest included therein at a future point in time, and displaying the predicted performance of the current portfolio with the identified asset of interest included therein on a user interface.

A further example embodiment provides a computer-readable medium comprising instructions, that when read by a processor, cause the processor to perform one or more of storing a current portfolio of a user in memory, receiving contextual data of the user from a user device of the user, identifying an asset of interest of the user based on execution of a generative artificial intelligence (GenAI) model based on the received contextual data of the user and the current portfolio of the user stored in memory, predicting a performance of the current portfolio with the identified asset of interest included therein at a future point in time, and displaying the predicted performance of the current portfolio with the identified asset of interest included therein on a user interface.

A further example embodiment provides an apparatus that may include receive a current status of a portfolio of a user and previous actions taken on the portfolio of the user over a predetermined period of time, determine a goal for the user based on execution of a generative artificial intelligence (GenAI) model on the current status of the portfolio of the user and the previous actions taken, receive a request for the portfolio of the user via a user device, and in response to the request, generate a text-based description of the goal and display the text-based description of the goal with portfolio content from the portfolio of the user on a user interface of the user device.

A further example embodiment provides a method that includes one or more of receiving a current status of a portfolio of a user and previous actions taken on the portfolio of the user over a predetermined period of time, determining a goal for the user based on execution of a generative artificial intelligence (GenAI) model on the current status of the portfolio of the user and the previous actions taken, receiving a request for the portfolio of the user via a user device and in response to the request, generating a text-based description of the goal and displaying the text-based description of the goal with portfolio content from the portfolio of the user on a user interface of the user device.

A further example embodiment provides a computer-readable medium comprising instructions, that when read by a processor, cause the processor to perform one or more of receiving a current status of a portfolio of a user and previous actions taken on the portfolio of the user over a predetermined period of time, determining a goal for the user based on execution of a generative artificial intelligence (GenAI) model on the current status of the portfolio of the user and the previous actions taken, receiving a request for the portfolio of the user via a user device and in response to the request, generating a text-based description of the goal and displaying the text-based description of the goal with portfolio content from the portfolio of the user on a user interface of the user device.

A further example embodiment provides an apparatus that may include receive content from a conversation between a user on a user device and a second user on a second user device that is connected to the user device via a network, identify a topic of the conversation based on execution of a generative artificial intelligence (GenAI) model on the received content from the conversation, identify a call list from among the call lists that are stored in the memory which is associated with the topic of the conversation based on keywords included in the identified topic of the conversation, and add an identifier of the user to the call list stored in memory.

A further example embodiment provides a method that includes one or more of receiving content from a conversation between a user on a user device and a second user on a second user device that is connected to the user device via a network, identifying a topic of the conversation based on execution of a generative artificial intelligence (GenAI) model on the received content from the conversation, identifying a call list that is previously stored in memory that is associated with the topic of the conversation based on keywords included in the identified topic of the conversation, and adding an identifier of the user to the call list stored in memory.

A further example embodiment provides a computer-readable medium comprising instructions, that when read by a processor, cause the processor to perform one or more of receiving content from a conversation between a user on a user device and a second user on a second user device that is connected to the user device via a network, identifying a topic of the conversation based on execution of a generative artificial intelligence (GenAI) model on the received content from the conversation, identifying a call list that is previously stored in memory that is associated with the topic of the conversation based on keywords included in the identified topic of the conversation, and adding an identifier of the user to the call list stored in memory.

A further example embodiment provides an apparatus that may include display a report on a user interface of a software application on a user device, listen to a call between a user on the user device and a different user on a second user device that is connected to the user device via a network, execute a generative artificial intelligence (GenAI) model based on content that is heard during the call and content within the report displayed on the user interface to identify content within the displayed report that is discussed during the call, and modify the displayed report to emphasize the identified content within the displayed report on the user interface.

A further example embodiment provides a method that includes one or more of displaying a report on a user interface of a software application on a user device, listening to a call between a user on the user device and a different user on a second user device that is connected to the user device via a network, executing a generative artificial intelligence (GenAI) model based on content that is heard during the call and content within the report displayed on the user interface to identify content within the displayed report that is discussed during the call, and modifying the displayed report to emphasize the identified content within the displayed report on the user interface.

A further example embodiment provides a computer-readable medium comprising instructions, that when read by a processor, cause the processor to perform one or more of displaying a report on a user interface of a software application on a user device, listening to a call between a user on the user device and a different user on a second user device that is connected to the user device via a network, executing a generative artificial intelligence (GenAI) model based on content that is heard during the call and content within the report displayed on the user interface to identify content within the displayed report that is discussed during the call, and modifying the displayed report to emphasize the identified content within the displayed report on the user interface.

DETAILED DESCRIPTION

Figure 1:
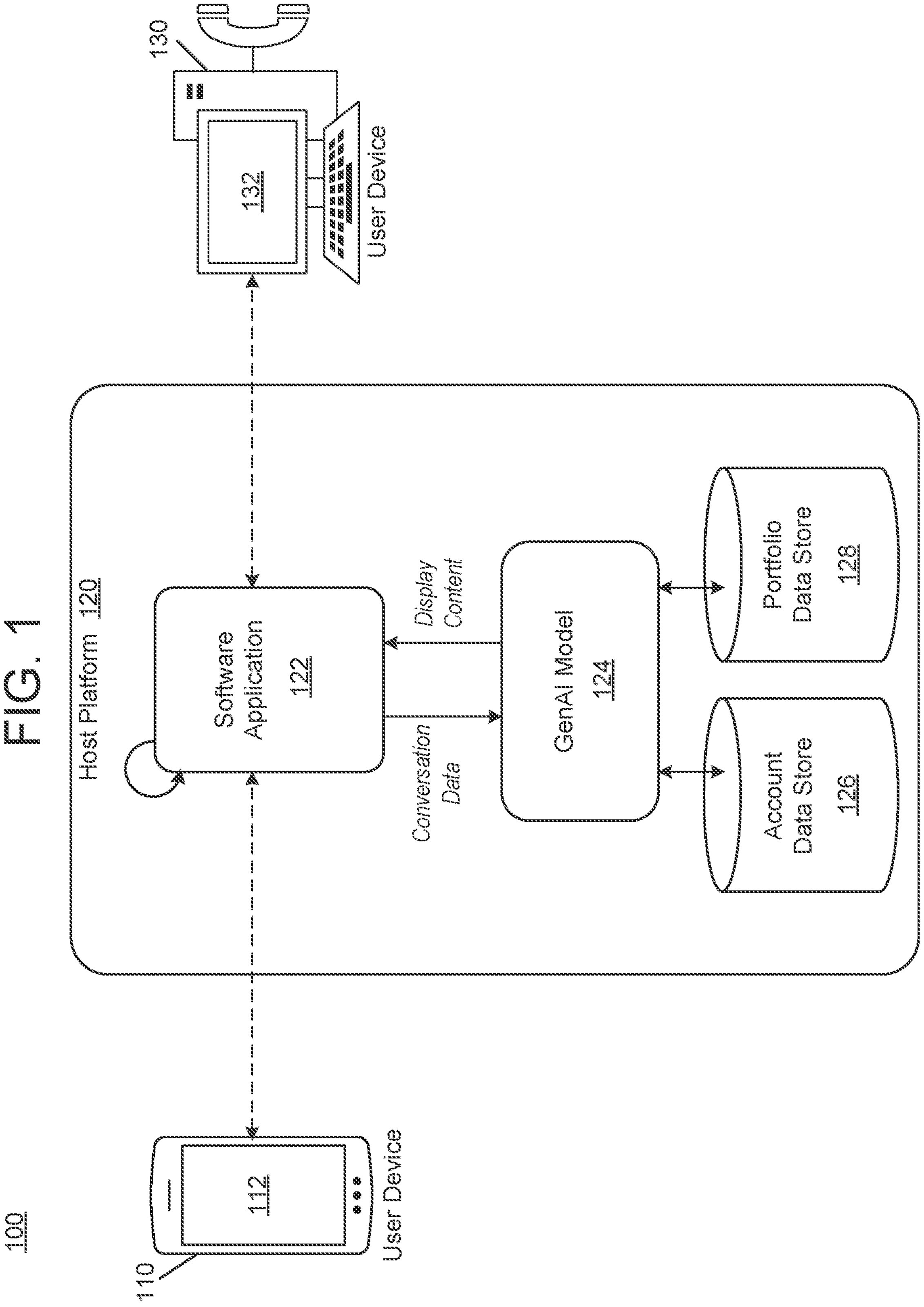
FIG. 1 is a diagram illustrating a generative artificial intelligence (GenAI) computing environment for generating meeting content according to example embodiments.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

The example embodiments are directed to a platform that can ingest content from a meeting, such as audio, text, speech, and the like, and generate content to be displayed during the meeting and other meetings based on generative artificial intelligence. In some embodiments, a generative artificial intelligence (GenAI) model may be trained to understand meeting content, topics, assets, asset content, and the like, based on execution of the GenAI model on a large corpus of documents, text, files, etc. which create correlations between topics of discussion and assets that can be invested in. The GenAI model may learn a correlation between text (e.g., words) and assets through training. Furthermore, the GenAI model may also generate display content that can be output on a dashboard of the meeting application. Training data and feedback inputs are fed into the GenAI model, and from there, the GenAI model uses the data inputs to detect patterns in the data, make associations and connections with the data, correlate the data, identify relationships among the data, and this happens with millions of iterations to strengthen and adjust the patterns, associations, connections, correlations, and relationships. Once trained, the GenAI model transforms a received prompt by extending from its associations, connections, patterns, correlations, relationships in order to produce generated output that is relevant to the received prompt.

In one embodiment, Generative AI (GenAI) is used to transform data. The process of GenAI may begin with the preprocessing of input data or raw data. The preprocessing process may be comprised of normalization, outlier detection, and the handling of missing values to ensure data integrity and consistency. When the input data is structured, GenAI facilitates data augmentation. Data input related to financial institutions may be imbalanced or lack a variance required for robust analysis. Data augmentation may include the generation of synthetic transactions or modeling hypothetical market scenarios to bolster the dataset's diversity and volume. Techniques that may be utilized may include bootstrapping or synthetic minority over-sampling, which address data imbalances, especially in areas like fraud detection, where certain event classes are sparse.

The use of software tools, such as Generative Adversarial Networks (GANs) and Variational Autoencoders (VAEs), are trained on input datasets to produce entirely new yet coherent data points. For example, these or similar tools may be employed to generate synthetic customer profiles for testing new financial products, simulate financial markets under various conditions, or even model the potential impact of unseen economic events. Post-generation, the synthetic data's quality is evaluated. This evaluation may involve comparing the synthetic data with historical real-world data, running statistical tests to ensure distributions match, and/or the use of discriminator components of GANs as a litmus test for data realism.

According to various embodiments, the GenAI model may be a large language model (LLM), such as a multimodal large language model. As another example, the GenAI model may be a transformer neural network ("transformer") or the like. The GenAI model is capable of understanding connections between text and display components (e.g., boxes of content, windows of content, modules of content, etc.) within the dashboard. For example, the GenAI model may include libraries and deep learning frameworks that enable the GenAI model to create realistic display content based on text inputs.

The GenAI model may also analyze the content from the meeting to identify correlations between other clients/meetings and build automated call lists, scripts, and content.

By creating software meeting content from text, the GenAI model can relieve a user from having to generate such content. Furthermore, the GenAI model can provide the content in "real-time" while the call is being performed, thereby allowing the advisor to continue to converse with the client while the GenAI model and software automatically create content that is displayed on a dashboard of the meeting software while the client is conversing with the advisor. In some cases, the GenAI model can determine what is currently being discussed between the client and the advisor and emphasize content on the dashboard in real time.

Additionally, the GenAI model can dynamically generate new portfolios and dynamically modify existing portfolios with assets of interest that are not already within a client's portfolio, allowing the client to see how their portfolio would have/will perform with the asset of interest. The GenAI model can output graphs, charts, text content, and the like, describing the current performance, the future/predicted performance, and the like. Furthermore, the GenAI model can dynamically emphasize content on the screen based on what is being discussed.

FIG. 1 illustrates a generative artificial intelligence (GenAI) computing environment 100 for generating meeting content according to example embodiments. Referring to FIG. 1, a host platform 120, such as a cloud platform, web server, etc., may host a meeting between a user device 110 and a user device 130.

Each user's device may be a mobile device, a computer, a laptop, a desktop computer, or the like.

The user devices may include a display that can output visual content such as meeting content. For example, the user device 110 includes a user interface 112 for displaying meeting content. Meanwhile, the user device 130 may include a user interface 132 for displaying meeting content.

Here, the host platform 120 may host the software application 122 and make it accessible to the user device 110 and the user device 130 simultaneously over a computer network such as the Internet.

For example, the software application 122 may be a mobile application with a front-end installed on the user device 110 (and the user device 130) and a back-end installed on the host platform 120. As another example, the software application 122 may be a progressive web application (PWA) hosted by the host platform 120 and made accessible via a browser on the user device 110 and/or the user device 130 via an address on the web.

In the example embodiments, the host platform 120 may include one or more generative artificial intelligence (GenAI) models, including GenAI model 124, which can prompt a user for information (e.g., images, text, etc.) and generating software architecture diagrams based on responses to the prompts. The host platform 120 may include one or more additional models, including one or more machine learning models, one or more artificial intelligence (AI) models, one or more additional GenAI models, and the like. The models, including the GenAI model 124, may be held by the host platform 120 within a model repository (not shown).

In the example embodiments, the GenAI model 124 may be trained based on the account data of one or more users, portfolio data of one or more users, asset data from open sources such as publicly available sources on the web, and the like. The GenAI model 124 may be trained to generate visual content that can be depicted on a user interface of the meeting software. For example, the GenAI model 124 may be trained based on account data stored within a data store 126, portfolio data stored in a data store 128, etc.

The account data within the data store 126 and/or the portfolio data within the data store 128 may be accessed via one or more application programming interfaces (APIs). Although not shown, the host platform 120 may also access one or more external systems (e.g., databases, websites, etc.) over a computer network and collect/retrieve data from the one or more external systems, including user data.

In the example of FIG. 1, the user devices 110 and 130 may exchange speech, text, images, and the like, submitted through the software application 122.

For example, audio may be spoken, text may be entered into a text box, documents may be viewed, and the like.

The content may be recorded by the software application 122 and provided to the GenAI model 124. In response, the GenAI model 124 may dynamically identify content to be displayed during the meeting based on the content being discussed, displayed, emphasized, etc., during the meeting.

As an example, a dashboard may be output by the software application 122 on the user interface 112 of the user device 110 and the user interface 132 of the user device 130. Here, the dashboard may include content that is visible to both user devices 110 and 130 and/or content that is only visible to one of the user devices. The software application 122 may control which device sees which content and create different experiences on the user interface for each of the user devices 110 and 130 during the meeting. Furthermore, the GenAI model 124 may ingest the content recorded from the meeting and generate additional content that can be displayed during the meeting and additional content that can be used after the meeting, such as a call script, a call list, and the like. The GenAI model 124 may use account data from the data store 126, portfolio data from the data store 128, asset data from external data sources (not shown), and the like. The assets may include stocks, bonds, digital assets, cryptocurrency, and other investment vehicles.

Figure 2:
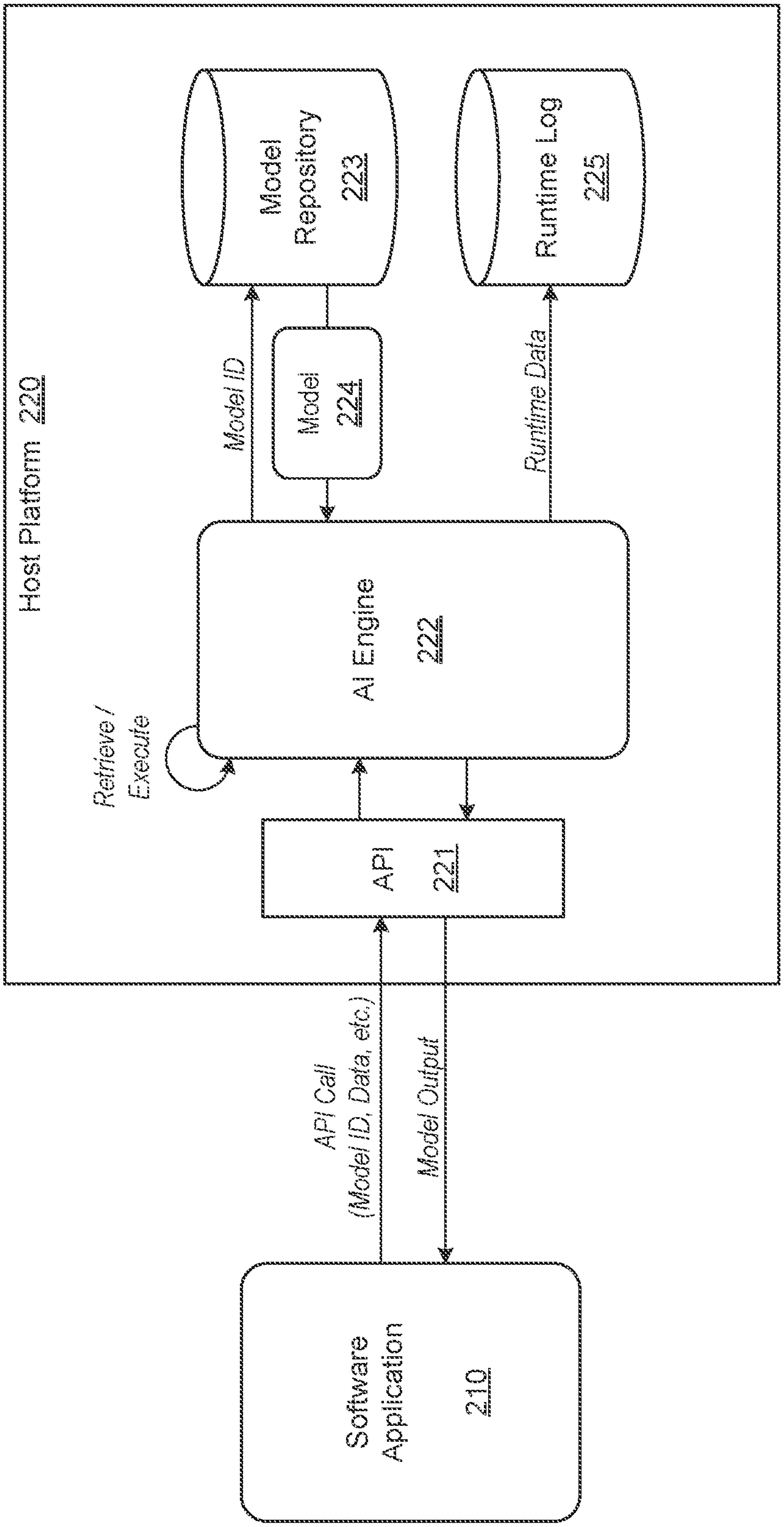
FIG. 2 is a diagram illustrating a process of executing a machine-learning model on input content according to example embodiments.

FIG. 2 illustrates a process 200 of executing a model 224 on input content according to example embodiments. For example, the model 224 may be the GenAI model 124 described in FIG. 1A, however, embodiments are not limited thereto.

Referring to FIG. 2, a software application 210 may request execution of the model 224 by submitting a request to the host platform 220. In response, an AI engine 222 may receive the request and trigger the model 224 to execute within a runtime environment of the host platform 220.

In FIG. 2, the AI engine 222 may control access to models stored within the model repository 223. For example, the models may include GenAI models, AI models, machine learning models, neural networks, and/or the like. The software application 210 may trigger execution of the model 224 from the model repository 223 via submission of a call to an API 221 (application programming interface) of the AI engine 222. The request may include an identifier of the model 224, such as a unique ID assigned by the host platform 220, a payload of data (e.g., to be input to the model during execution), and the like. The AI engine 222 may retrieve the model 224 from the model repository 223 in response and deploy the model 224 within a live runtime environment. After the model is deployed, the AI engine 222 may execute the running instance of the model 224 on the payload of data and return a result of the execution to the software application 210.

In some embodiments, the data payload may be a format that cannot be input to the model 224 nor read by a computer processor. For example, the data payload may be in text, image, audio, etc. In response, the AI engine 222 may convert the data payload into a format readable by the model 224, such as a vector or other encoding.

The vector may then be input to the model 224.

In some embodiments, the software application 210 may display a user interface enabling a user to provide feedback from the output provided by the model 224. For example, a user may input a confirmation that the asset of interest generated by a GenAI model is correct or is liked. This information may be added to the results of execution and stored within a log 225.

The log 225 may include an identifier of the input, an identifier of the output, an identifier of the model used, and feedback from the recipient. This information may be used to retrain the model subsequently.

Figure 3A:
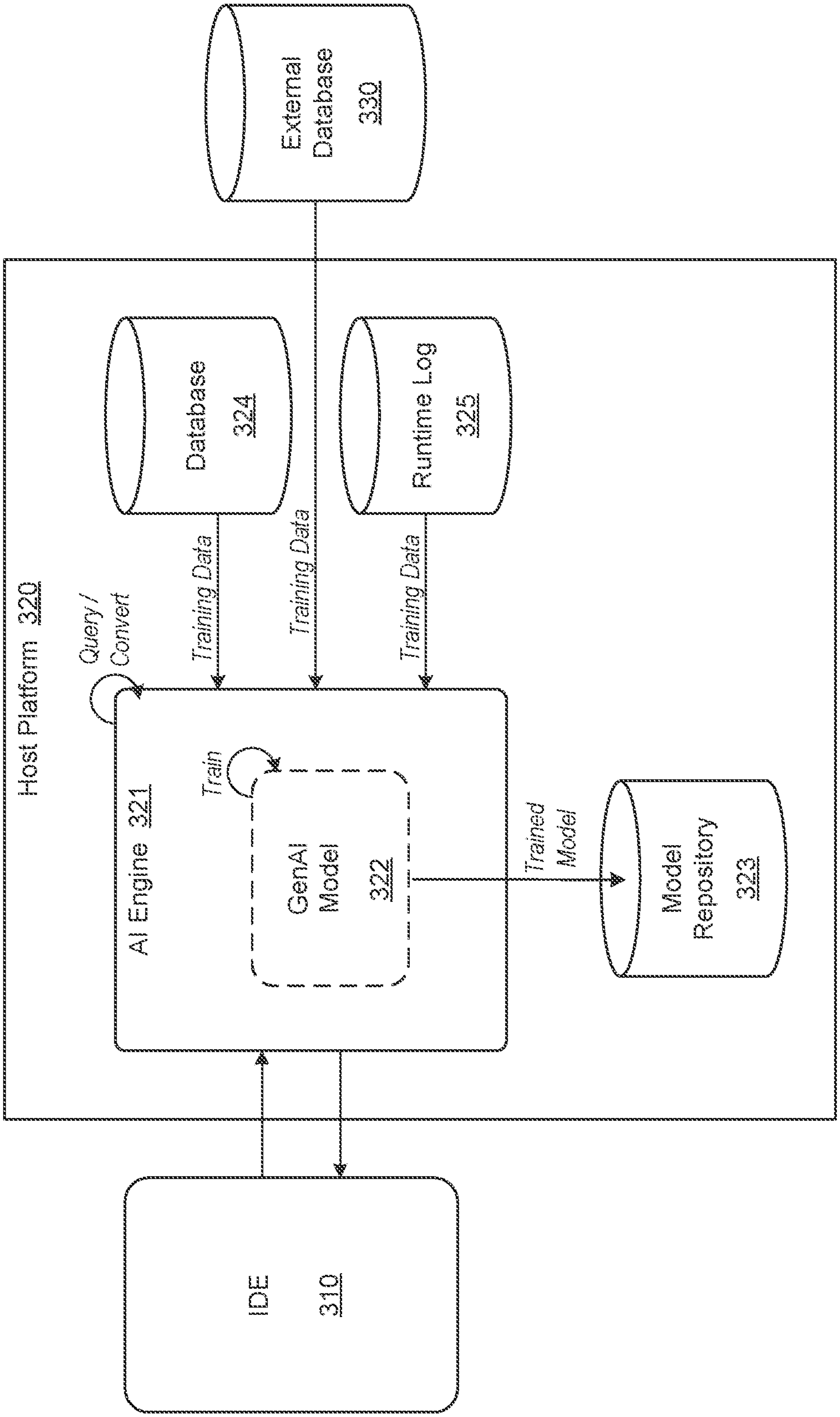
FIGS. 3A-3C are diagrams illustrating processes for training a machine learning model according to example embodiments.

FIG. 3A illustrates a process 300A of training a GenAI model 322 according to example embodiments. However, it should be appreciated that the process 300A shown in FIG. 3A also applies to other models, such as machine learning models, AI models, and the like. Referring to FIG. 3A, a host platform 320, may host an IDE 310 (integrated development environment) where GenAI models, machine learning models, AI models, and the like may be developed, trained, retrained, and the like. In this example, the IDE 310 may include a software application with a user interface accessible by a user device over a network or through a local connection.

For example, the IDE 310 may be embodied as a web application that can be accessed at a network address, URL, etc., by a device. As another example, the IDE 310 may be locally or remotely installed on a computing device used by a user.

The IDE 310 may be used to design a model (via a user interface of the IDE), such as a generative artificial intelligence model that can receive text as input and generate custom imagery, text, etc., which can be displayed on a user interface/dashboard of a software application that displays content during meetings between user devices. The model can be executed/trained based on the training data established via the user interface. For example, the user interface may be used to build a new model. The training data for training such a new model may be provided from a training data store such as a database 324, which includes training samples from the web, customers, and the like. As another example, the training data may be pulled from one or more external data stores 330 such as publicly available sites, etc.

The GenAI model 322 may be executed on training data via an AI engine 321 of the host platform 320 during training. The training data may include a large corpus of generic images and text that is related to those images. In the example embodiments, the training data may include asset data such as web pages of content on different assets, performance data of the assets, predicted performance data of the assets (in the future), portfolio data of users, account data history of users, and the like. The GenAI model 322 may learn mappings/connections between text and visual content during the execution and can thus create meeting content that can be displayed on the user interface from input text. When fully trained, the model may be stored within the model repository 323 via the IDE 310 or the like.

As another example, the IDE 310 may be used to retrain the GenAI model 322 after the model has already been deployed. Here, the training process may use executional results that have already been generated/output by the GenAI model 322 in a live environment (including any customer feedback, etc.) to retrain the GenAI model 322. For example, predicted outputs/images custom generated by the GenAI model 322 and the user feedback of the images may be used to retrain the model to enhance the images generated for all users. The responses may indicate whether the generated content is correct and, if not, what aspects of the images and text are incorrect. This data may be captured and stored within a runtime log 325 or other data stored within the live environment and can be subsequently used to retrain the GenAI model 322.

Figure 3B:
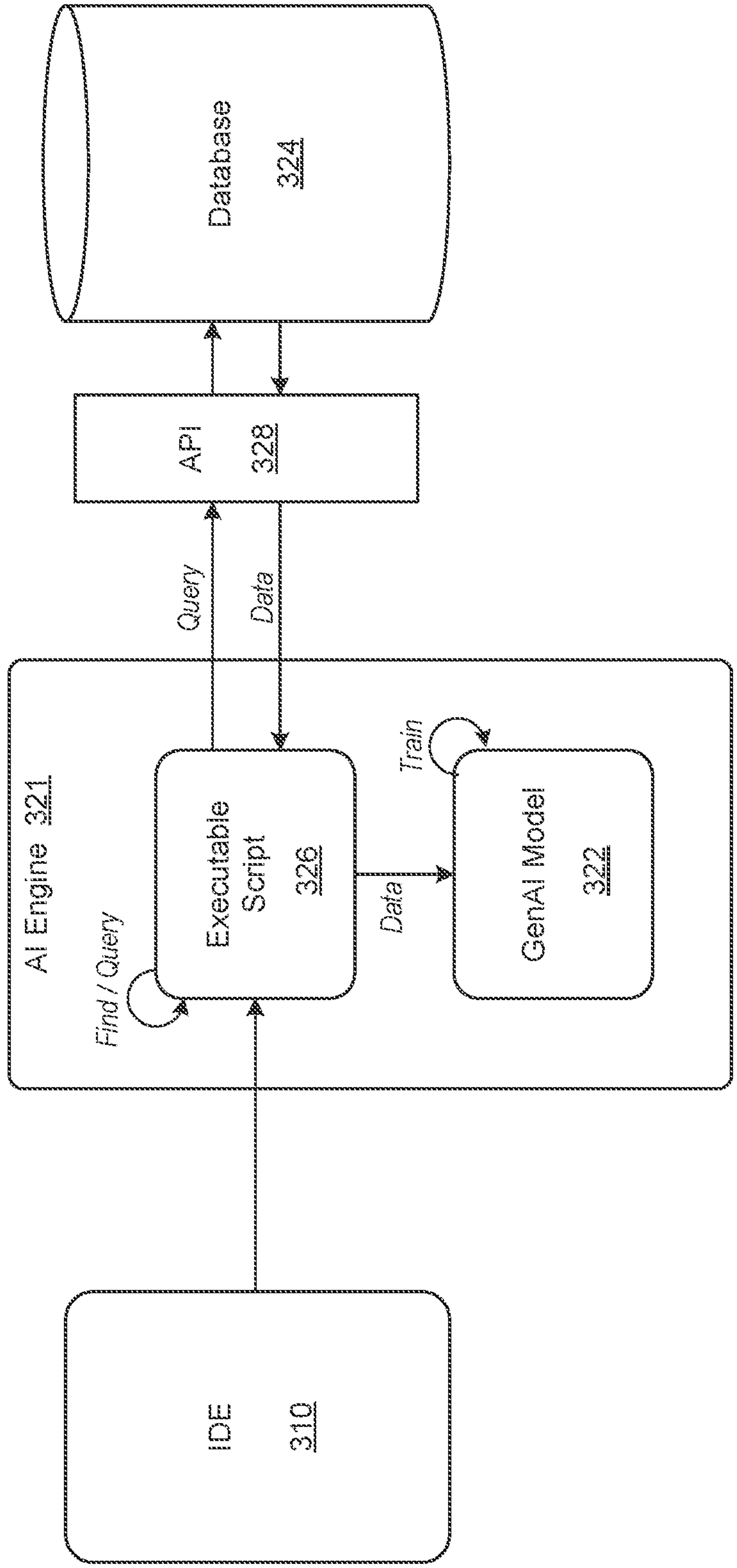

FIG. 3B illustrates a process 300B of executing a training process for training/retraining the GenAI model 322 via an AI engine 321. In this example, a script 326 (executable) is developed and configured to read data from a database 324 and input the data to the GenAI model 322 while the GenAI model is running/executing via the AI engine 321.

For example, the script 326 may use identifiers of data locations (e.g., table IDs, row IDs, column IDs, topic IDs, object IDs, etc.) to identify locations of the training data within the database 324 and query an API 328 of the database 324. In response, the database 324 may receive the query, load the requested data, and return it to the AI engine 321, which is input to the GenAI model 322. The process may be managed via a user interface of the IDE 310, which enables a human-in-the-loop during the training process (supervised learning). However, it should also be appreciated that the system is capable of unsupervised learning.

The script 326 may iteratively retrieve additional training data sets from the database 324 and iteratively input the additional training data sets into the GenAI model 322 during the execution of the model to continue to train the model. The script may continue until instructions within the script tell the script to terminate, which may be based on a number of iterations (training loops), total time elapsed during the training process, etc.

Figure 3C:
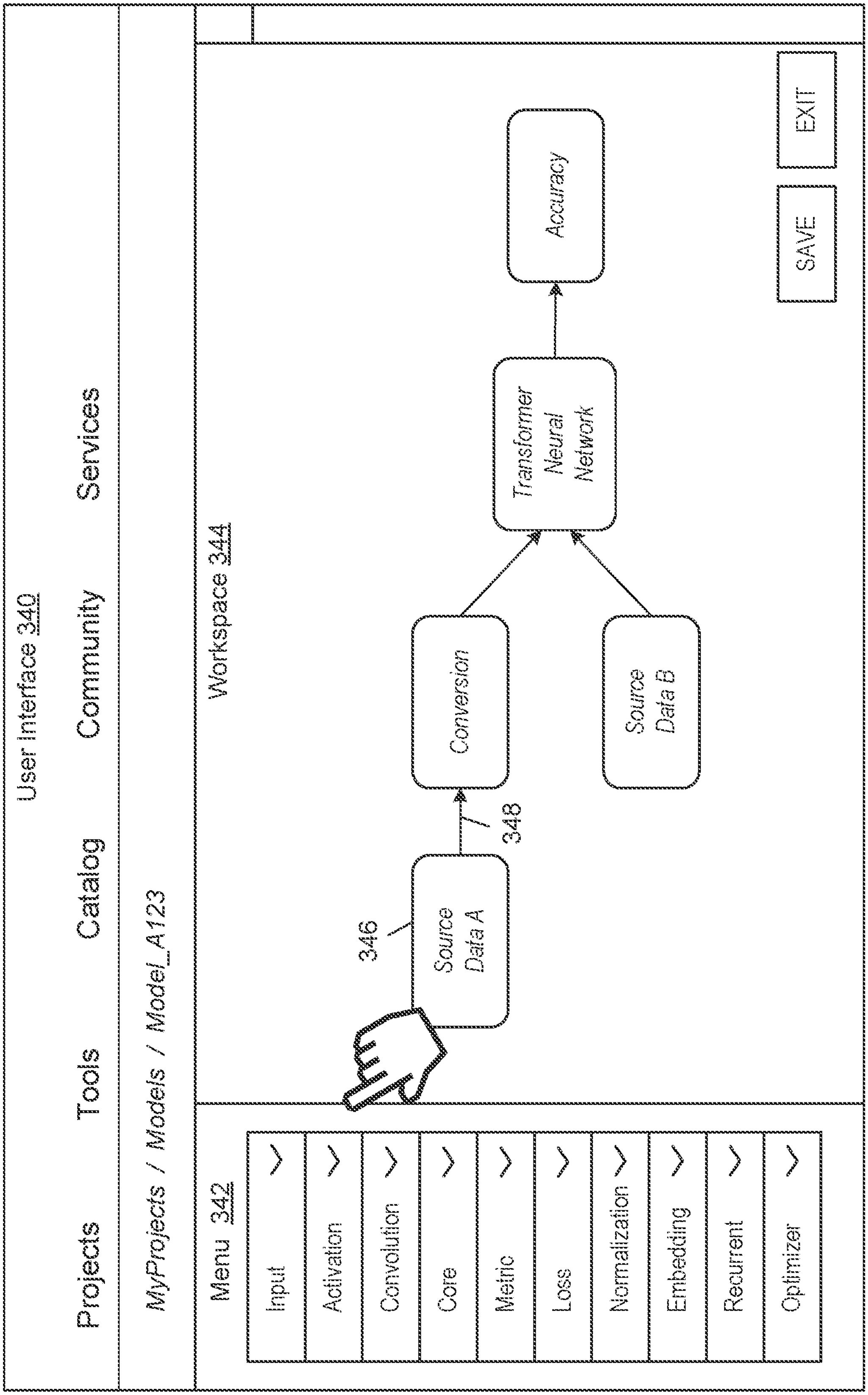

FIG. 3C illustrates a process 300C of designing a new AI model via a user interface 340 according to example embodiments. For example, the user interface 340 may be output as part of the software application that interacts with the IDE 310 shown in FIG. 3A, however, embodiments are not limited thereto. Referring to FIG. 3C, a user can use an input mechanism to make selections from a menu 342 shown on the left-hand side of the user interface 340 to add pieces to the model such as data components, model components, analysis components, etc., within a workspace 344 of the user interface 340.

In the example of FIG. 3C, the menu 342 includes a plurality of graphical user interface (GUI) menu options, which can be selected to drill down into additional components that can be added to the model design shown in the workspace 344.

Here, the GUI menu options include options for adding features such as neural networks, machine learning models, AI models, data sources, conversion processes (e.g., vectorization, encoding, etc.), analytics, etc. The user can continue to add features to the model and connect them using edges or other means to create a flow within the workspace 344. For example, the user may add a node 346 to a new model diagram within the workspace 344. For example, the user may connect the node 346 to another node in the diagram via an edge 348, creating a dependency within the diagram. When the user is done, the user can save the model for subsequent training/testing.

According to various embodiments, the GenAI model described herein may be trained based on custom-defined prompts designed to draw out specific attributes associated with a user's goal. These same prompts may be output during live execution of the GenAI model. For example, a user may input a goal description and other attributes.

The GenAI model can then use the description/attributes to generate a custom image that enables the user to visualize the goal. The prompts may be generated via prompt engineering that can be performed through the model training process, such as the model training process described above in the examples of FIGS. 3A-3C.

Prompt engineering is the process of structing sentences (prompts) so that the GenAI model understands them. A prompt may include a description of a goal, such as a goal of purchasing a particular type of asset. The prompt may also provide an amount to purchase, a price range, and the like. All of this information may be input to the GenAI model and used to create a custom content about the asset to enable the user to visualize the asset and understand how to add the asset to their portfolio, such as the steps to take to obtain the asset. Part of the prompting process may include delays/waiting times intentionally included within the script so the model has time to think/understand the input data.

Figure 4:
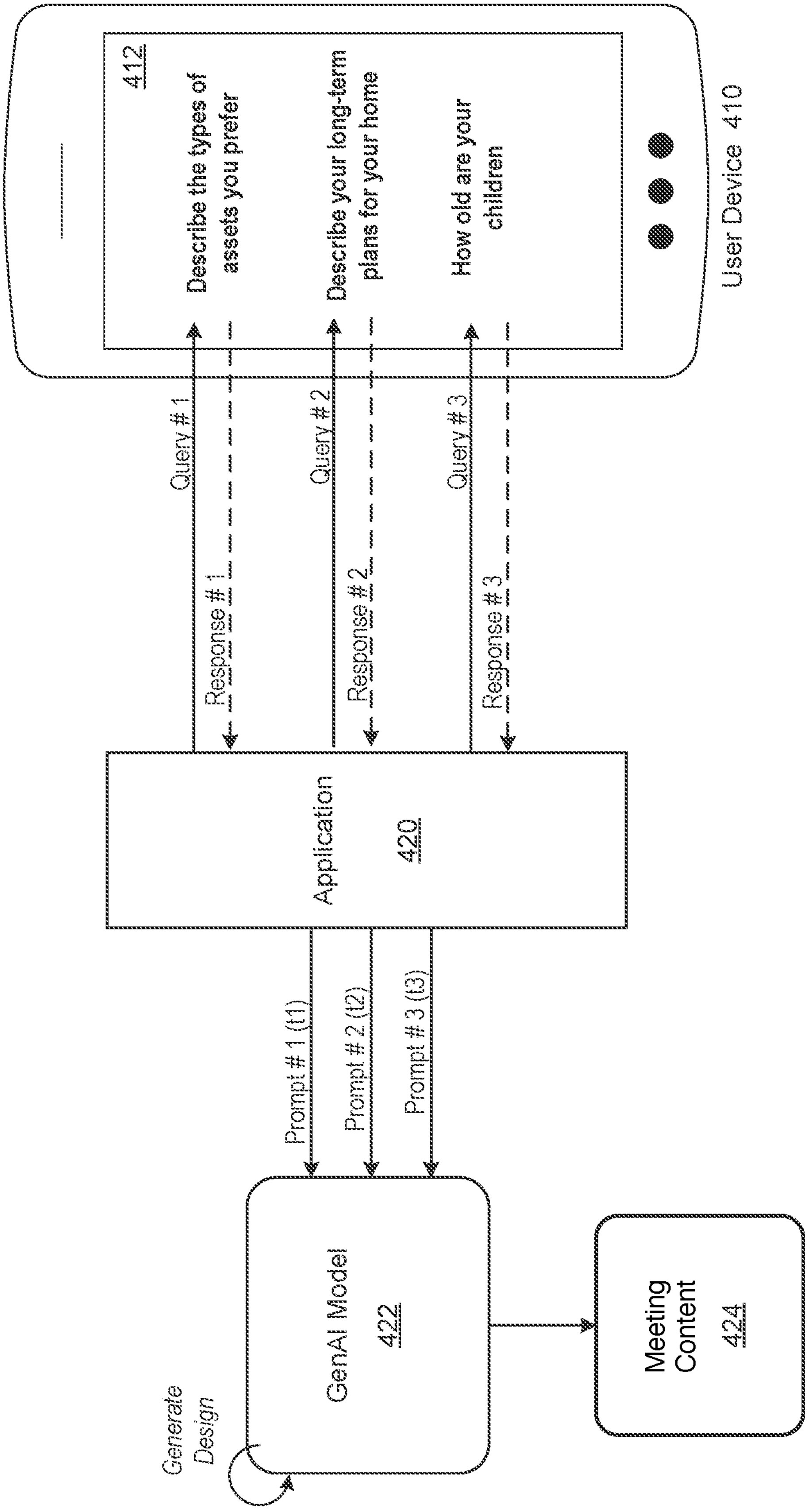
FIG. 4 is a diagram illustrating a process of prompting a GenAI model to generate an architecture diagram according to example embodiments.

FIG. 4 illustrates a process 400 of a GenAI model 422 generating a meeting content 424 based on prompts and responses to the prompts according to example embodiments. Referring to FIG. 4, the GenAI model 422 may be hosted by a host platform and may be part of a software application 420 that is also hosted on the host platform. Here, the software application 420 may establish a connection with a user device 410, such as a secure network connection. The secure connection may include a PIN, biometric scan, password, username, TTL handshake, etc.

In the example of FIG. 4, the software application 420 may control the interaction of the GenAI model 422 on the host platform and the user device 410. In this example, the software application 420 may output queries on a user interface 412 of the user device 410 with user information requests. The user may enter values into the fields on the user interface corresponding to the queries and submit/transfer the data to the software application 420, for example, by pressing a submit button, etc. In this example, the application may combine the query with the response from the user interface and generate a prompt submitted to the GenAI model 422. For example, each prompt may include a combination of a query on the UI plus the response from the user. For example, if the query is "Please describe the type of assets you prefer" and the response is "Investment vehicles with low risk and less return," then the text from both the prompt and the response to the prompt may be submitted to the GenAI model 422.

In some embodiments, the software application 420 may deliberately add waiting times between submitting prompts to the GenAI model 422 to ensure the model has enough time to "think" about the answer. The waiting times may be integrated into the code of the software application 420, or they may be modified/configured via a user interface. Furthermore, the ordering of the prompts and the follow-up questions may differ depending on the answers given during the previous prompt or prompts. The content within the prompts and the ordering of the prompts can cause the GenAI model 422 to have architecture diagrams, descriptions of architecture diagrams, combinations of architecture diagrams, new architecture diagrams, and the like. Each prompt may include multiple components, including one or more of context, an instruction, input data, and an expected response/output.

Figure 5A:
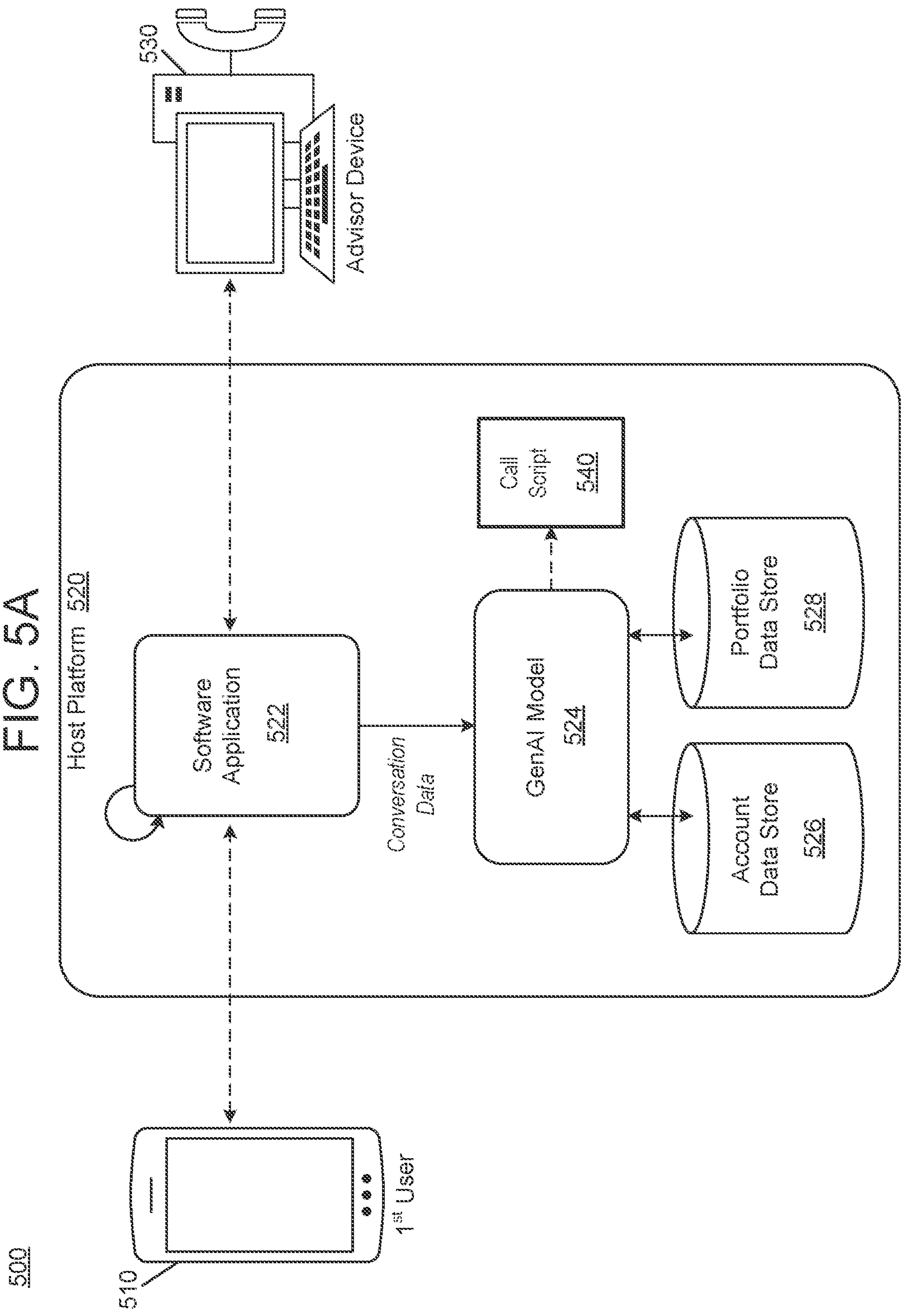
FIGS. 5A-5D are diagrams illustrating a process of generating a call script, call list, and call content based on overlapping discussion content according to example embodiments.

FIGS. 5A-5D illustrate generating a call script, call list, and call content based on overlapping discussion content according to example embodiments. For example, FIG. 5A illustrates a process 500 of listening to a conversation between a first user device 510 and a second user device 530 via a software application 522 and generating a call script 540 for a different call based on the conversation. For example, a host platform 520 may host the software application 522 and may enable access to the software application 522 over a network.

In some embodiments, the software application 522 may include a teleconferencing feature, a chat feature, a speech recording feature, meeting software, voice over IP (VOIP) call system, and the like. The teleconferencing software may generate call transcripts with a description of the text/words discussed during the call in the sequence they are discussed, along with identifiers of the users that made each piece of speech. Here, the software application 522 may record conversation data such as audio that is spoken during the conversation, text that is typed into a chat window of the conversation, or the like, convert it into a transcript, and transfer the conversation data to a generative artificial intelligence (GenAI) model 524, which generates the call script 540.

In the example of FIG. 1, the first user device 510 may be a client/user, and the second user device 530 may be the client's financial advisor. In this example, the GenAI model 524 may consume account data of the client from the data store 526 and portfolio data of the client from the data store 528 and make predictions based on the conversation data, the account data, and the portfolio data. Here, the client's account data may include investment account data along with call scripts of conversations between the client and the advisor when discussing the investment account data. Likewise, the portfolio data of the client may include portfolio status, actions taken on the portfolio over a predetermined period of time, and the like, along with call scripts of conversations between the client and the advisor when discussing the portfolio data and the management of the portfolio. Furthermore, the GenAI model 524 may also be iteratively trained based on asset data and asset performance of assets of the client and all assets in general. The image data may include charts, graphs, etc., showing performance as well as text content, images, etc., describing the assets. Thus, the GenAI model 524 can have an understanding of current asset performance as well as the assets in general.

The GenAI model 524 may be trained based on a corpus of call scripts and investment account data discussed during the call scripts stored in a data store 526.

The GenAI model 524 may also be trained based on call scripts and portfolios discussed during the calls, which are stored in a data store 528. The training can teach the GenAI model 524 to generate call scripts and call lists of users/clients with overlapping interests. By identifying such call scripts, the GenAI model 524 can identify patterns among multiple users' investment strategies, portfolio management strategies, and the like.

Figure 5B:
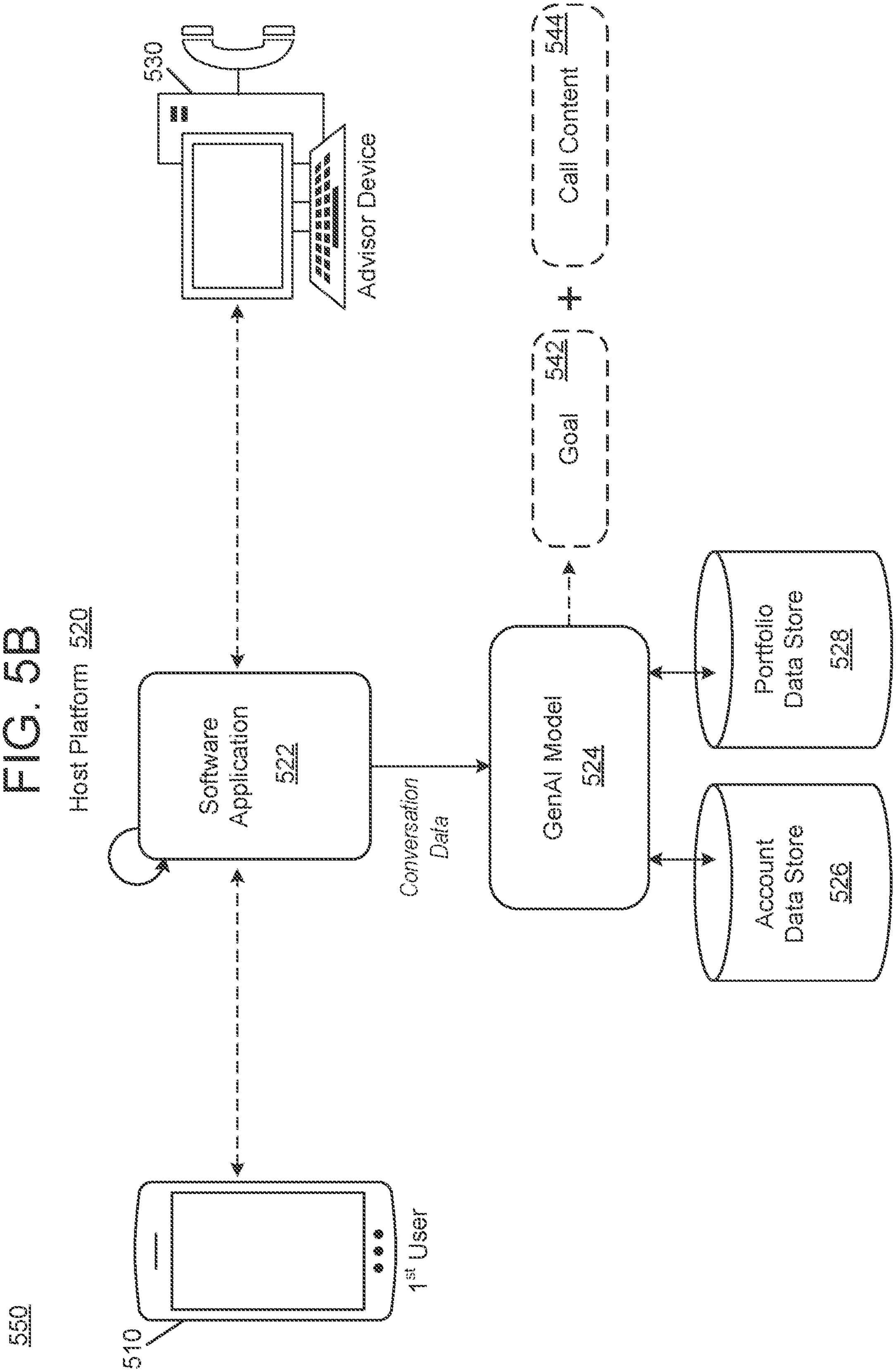

FIG. 5B illustrates a process 550 of identifying a goal of a user (e.g., the client) during a conversation between the first user device 510 (e.g., client device) and the second user device 530 (e.g., advisor device).

In this example, the users can converse via a software application 522 that provides a video conferencing feature that captures images and audio and presents them to the other device via the software application 522. This way, both users may view the other user live. While conversing, the software application 522 may record spoken audio and submit it to the GenAI model 524 in the form of text. For example, the software application 522 may convert the audio into text via a speech-to-text converter and input the text into the GenAI model 524.

In this example, the GenAI model 524 can identify a goal 542 of the user based on the conversation data captured and sent to the GenAI model 524 in real time. The GenAI model 524 may identify goal 542 based on keywords, text patterns, text sequences, etc. Furthermore, in some embodiments, the GenAI model 524 may generate call content 544 based on the goal 542. For example, the GenAI model 524 may generate image content, including graphs, charts, etc., as well as descriptive content describing the assets associated with the goal 542 and the call content 544.

Figure 5C:
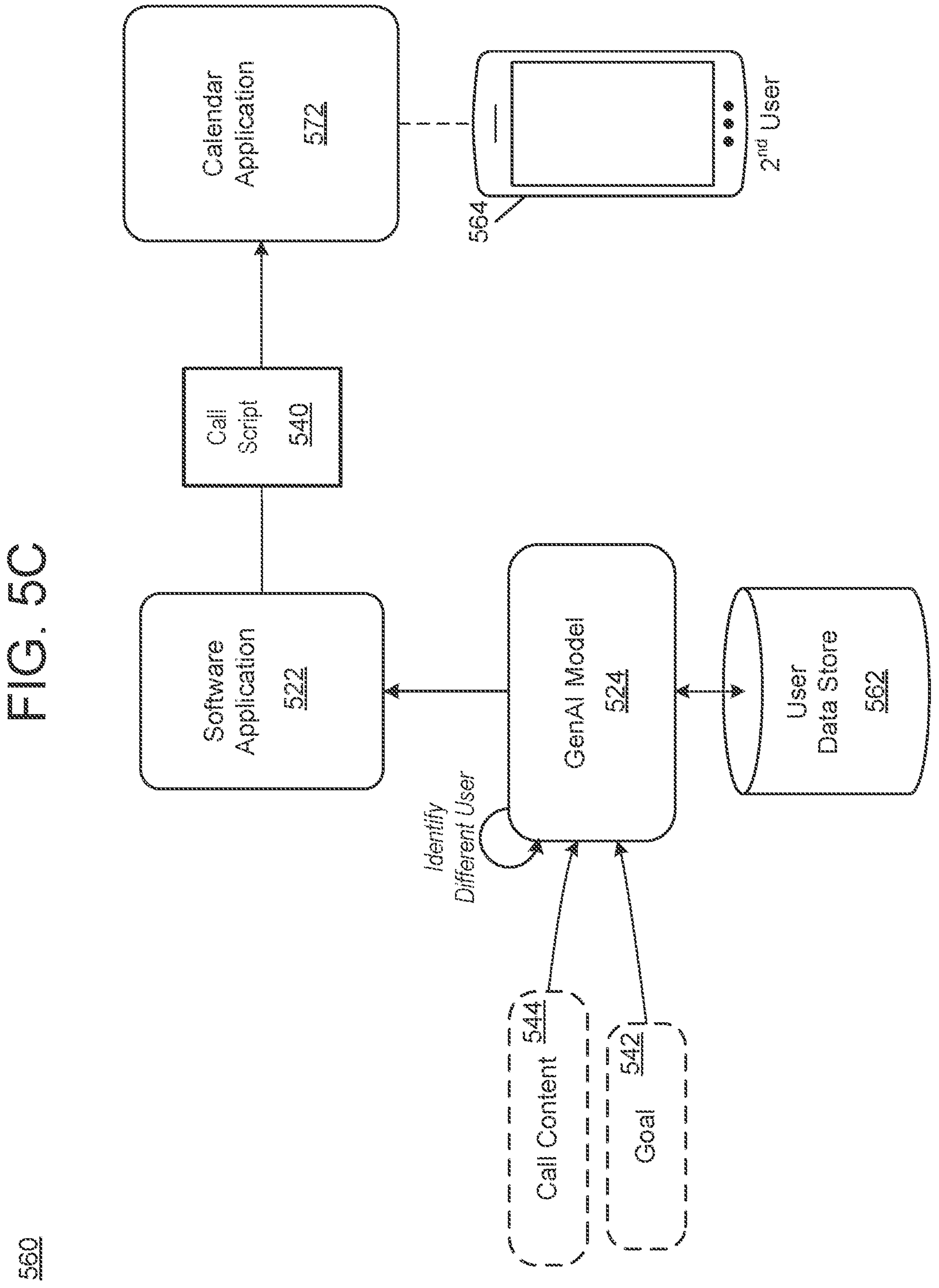

FIG. 5C illustrates a process 560 of integrating the call content 544 generated by the GenAI model 524 in FIG. 5B into a calendar application 572 installed on a user device 564 of a different user from which the goal 542 was identified.

In this example, the GenAI model 524 may ingest call scripts, portfolios, account data, asset data, and the like, from user accounts of multiple users, which are stored in a user database 562 and identify a different user (a user that owns/registers the user device 564) that has the same goal 542 as the user of the first user device 510. Here, the GenAI model 524 can store the call content 544 within a call script 540 and import the call script 540 into the calendar application 572, thus ensuring the content is discussed during a next call with the client (the user device 564). For example, the call script 540 may be added to a calendar at a future time with respect to the current time, such as a meeting scheduled in the future, etc.

Although not shown in FIG. 5C, the software application 522 may simultaneously import the call script 540 into a calendar application on the second user device 530 and ensure that the time/day of the scheduled meeting in the calendar application 572 on the user device 564 is in sync with the calendar application on the first user device 510. For example, the software application 522 may generate a new meeting and schedule it to ensure that the calendars and content discussed during the call are in sync.

Figure 5D:
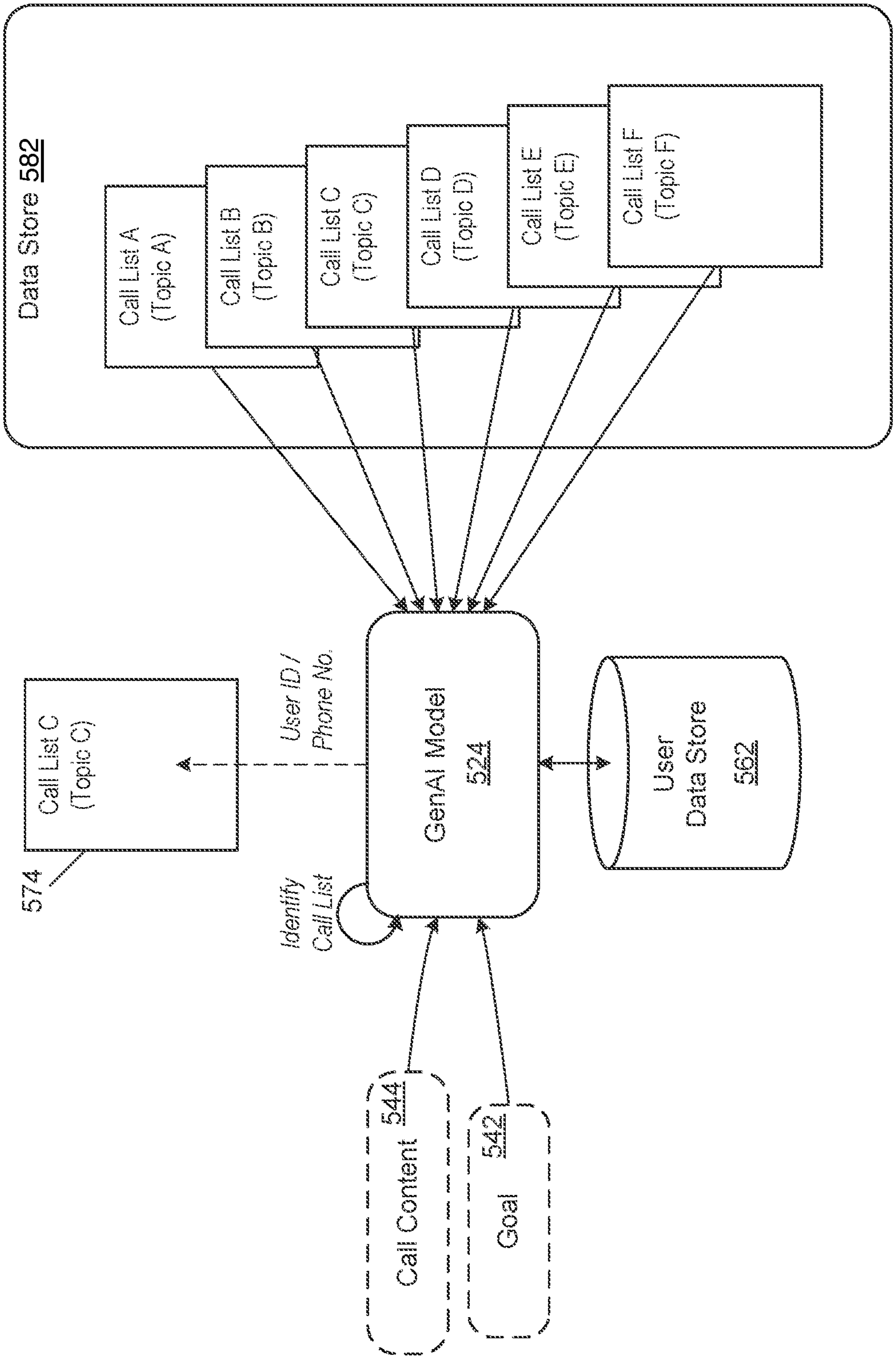

FIG. 5D illustrates a process 570 of adding a user identifier of the user device 564 to a call list 584 based on the call content 544 within the call script 540 imported into the calendar application 572 on the user device 564.

Here, the GenAI model 524 can compare the call content 544 to call scripts associated with different call lists stored in a data store 582. If there is enough overlap between the content, the GenAI model 524 may determine to add an identifier of the user (e.g., name, phone number, topic, etc.) to the call list 584. The call list 584 may be an automated call list. For example, the host platform may include a messaging system that can send voice messages and calls to clients based on the call list and the content included in the call scripts associated with the call list.

Figure 6A:
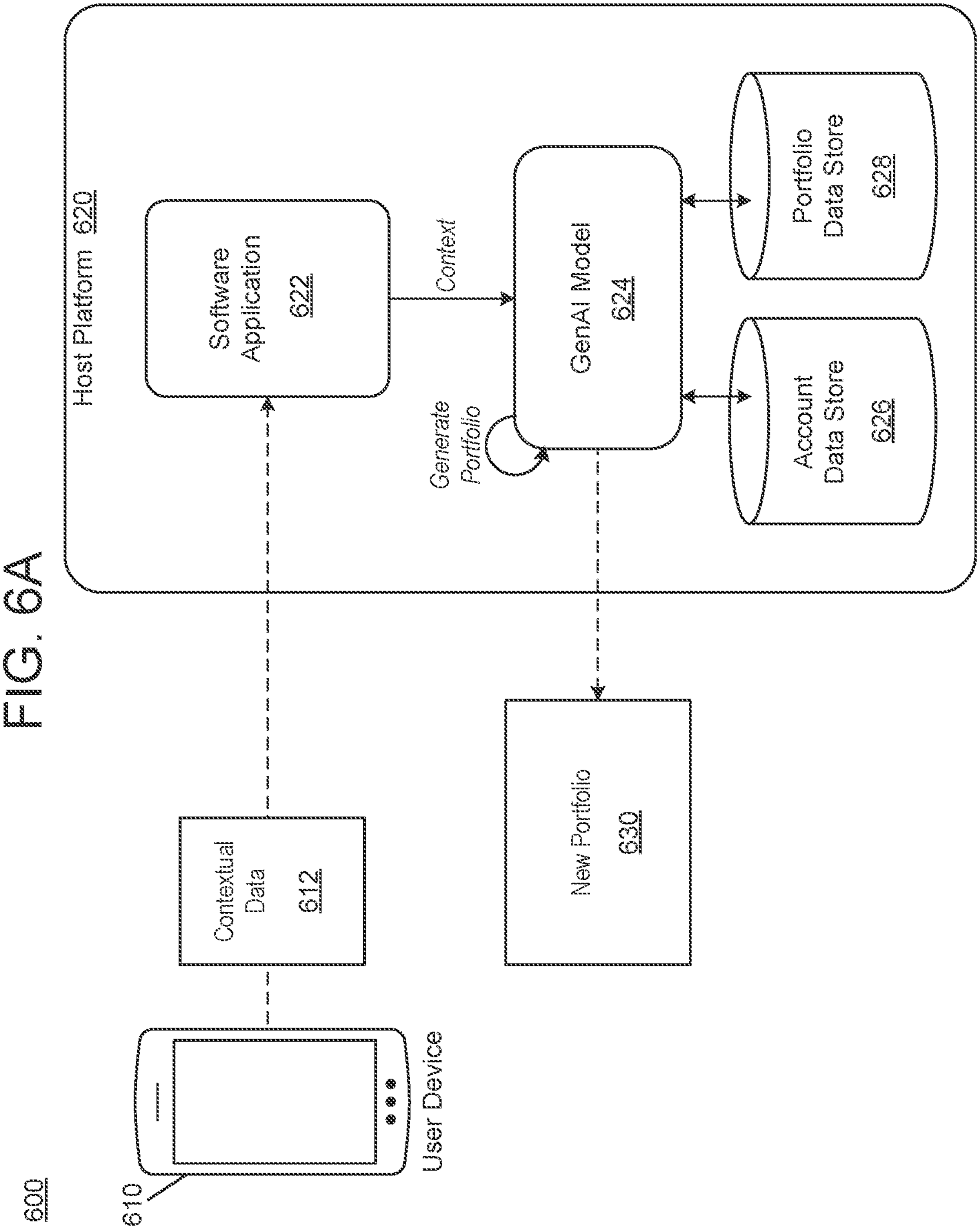
FIGS. 6A-6C are diagrams illustrating a process of detecting a missing asset of interest using GenAI and generating a new portfolio according to example embodiments.
Figure 6B:
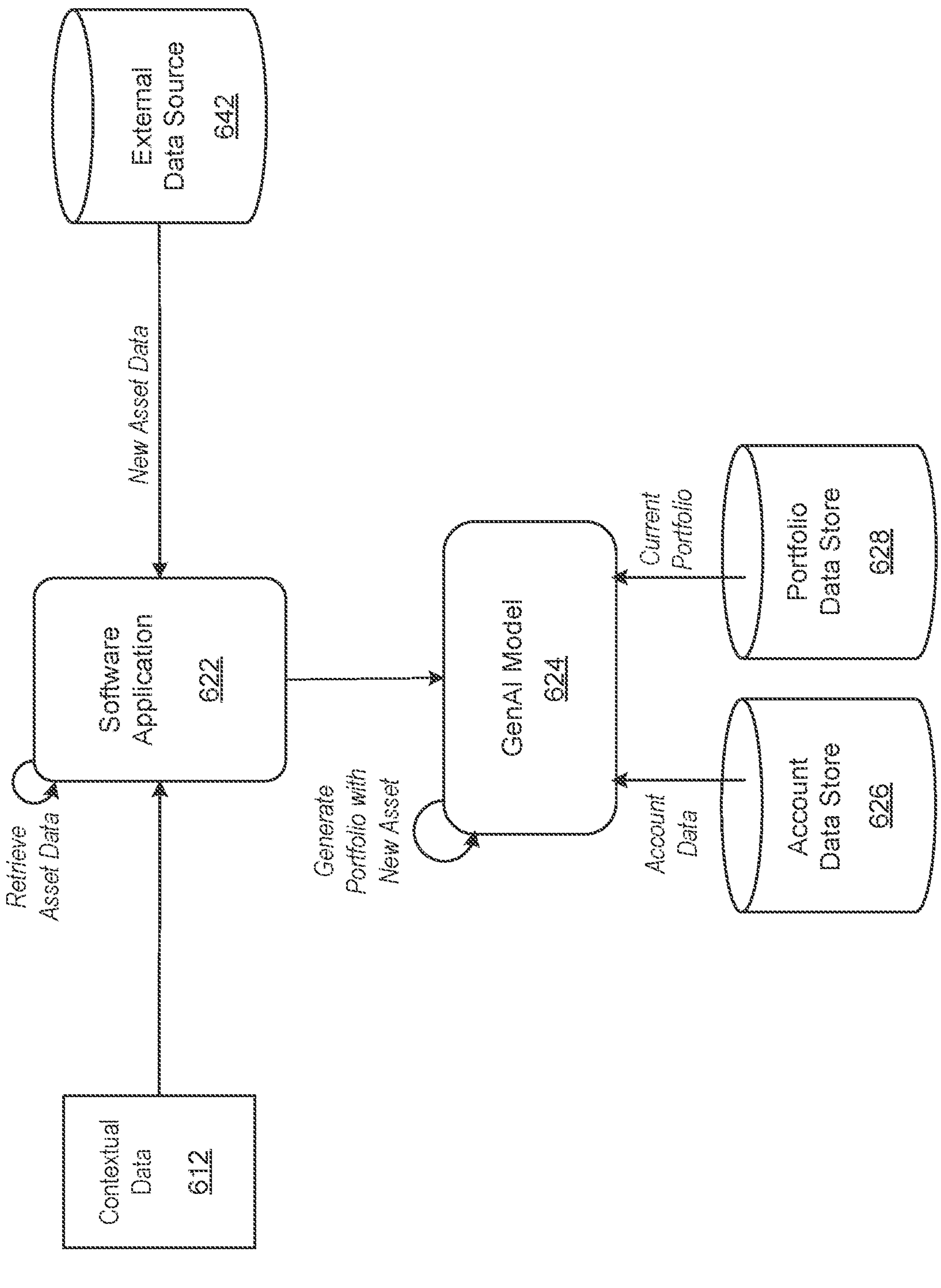
Figure 6C:
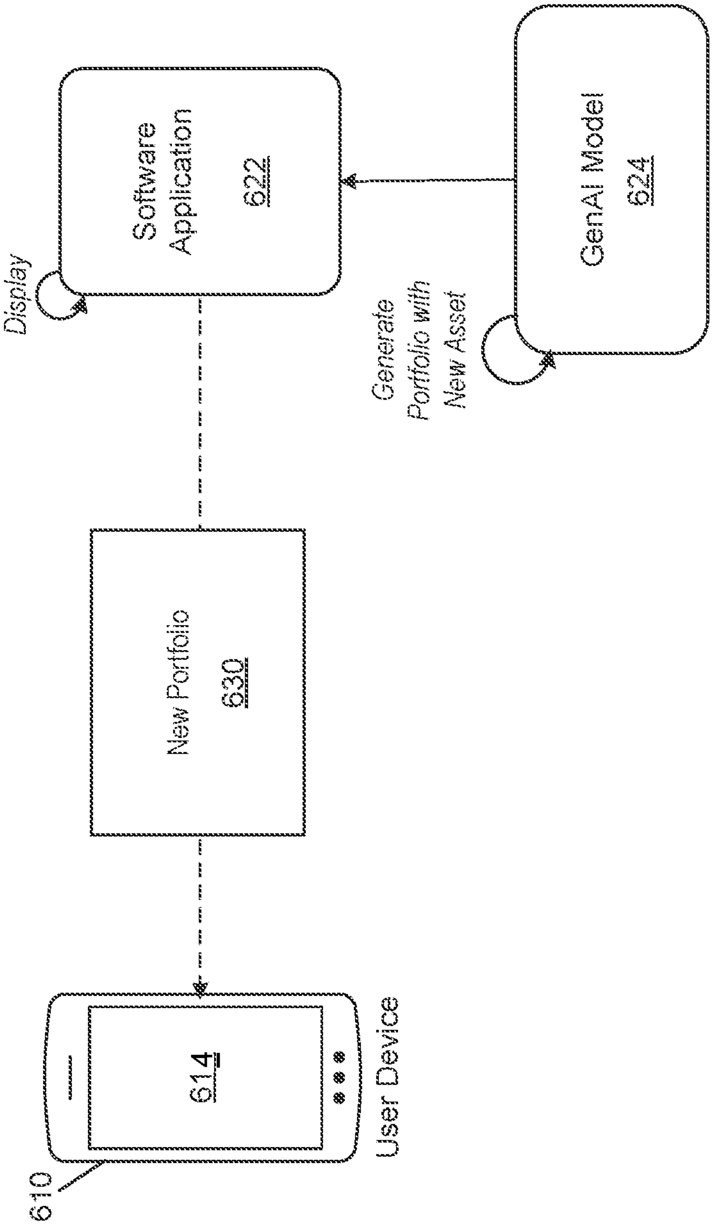

FIGS. 6A-6C illustrate a process of detecting a missing asset of interest using GenAI and generating a new portfolio according to example embodiments. For example, FIG. 6A illustrates a process 600 of dynamically generating a new portfolio 630 for a client based on contextual data 612 observed from the client device (e.g., user device 610) by a software application 622 hosted by a host platform 620. Here, the contextual data 612 may include a cookies file or the like extracted from a browser on the user device 610, which includes browsing history data of the user device 610, and which is passed to the host platform 620 by the user device 610.

As another example, the contextual data 612 may include transcripts and call logs of the user of the user device 610, and the like. The contextual data 612 may be received by the software application 622 each time the user device 610 communicates with the software application 622. As another example, the contextual data 612 may be provided periodically or only at login.

In FIG. 6A, the software application 622 may send the contextual data 612 to a GenAI model 624, which can identify an asset that is not included in a current portfolio of the user that is of interest to the user. Here, the GenAI model 624 can identify the asset based on a current status of the user's portfolio and generate a new portfolio that shows the user what their portfolio would look like today if they had the asset of interest in their portfolio. In some embodiments, the asset may be added to an existing portfolio of the user at a previous point in time such as 10 days ago, 30 days ago, etc. The existing portfolio can be modified with the new asset to generate the new portfolio 630. In some cases, an asset can be removed from the existing portfolio to generate the new portfolio 630.

Thus, the user can see how their portfolio would have performed over the last predetermined period of time (e.g., the last 10 days, the last 30 days, etc.).

The software application 622 can use the GenAI model 624 or another model, such as a machine learning model, to integrate the performance of the newly added asset to the performance data of existing assets already included in the portfolio to identify how the asset would have performed as a whole with the newly added asset. The content generated by the GenAI model 624 may include performance charts, performance graphs, etc., of the excluded asset being included in the portfolio, thereby allowing the client to visualize how their portfolio would have done.

In the example of FIG. 6A, the GenAI model 624 may be trained based on portfolios and account information about the portfolios to learn investment strategy patterns that can be applied to conversations with the client. For example, the GenAI model 624 can detect types of assets, types of purchases, sales, etc., financial amounts, life events, and the like, and learn investment strategies based on the portfolio size.

Clients with similar financial totals often invest in similar investment vehicles. The GenAI model 624 can learn these patterns through the training process. The data may be stored in an account data store 626, a portfolio data store 628, external data stores (not shown), and the like.

FIG. 6B illustrates a process 640 of generating asset data about the excluded asset that can be added to the new portfolio 630 according to example embodiments.

Referring to FIG. 6B, the software application 622 may identify an asset of interest from the contextual data 612 and extract pages of web content about the asset of interest from an external data store 642. The pages of content may include performance attributes about the asset over a predetermined period of time, such as the last 10 days, last 30 days, etc. The performance attributes such as charts and graphs may be added into the new portfolio 630 by the GenAI model 624.

Furthermore, the software application 622 may output the new portfolio 630 onto a user interface 614 of the user device 610. For example, FIG. 6C illustrates a process 650 of displaying the new portfolio 630 on the user interface 614 of the user device 610.

In this example, the newly added charts/graphs can be displayed in addition to the user's portfolio's existing/current asset content.

Figure 7A:
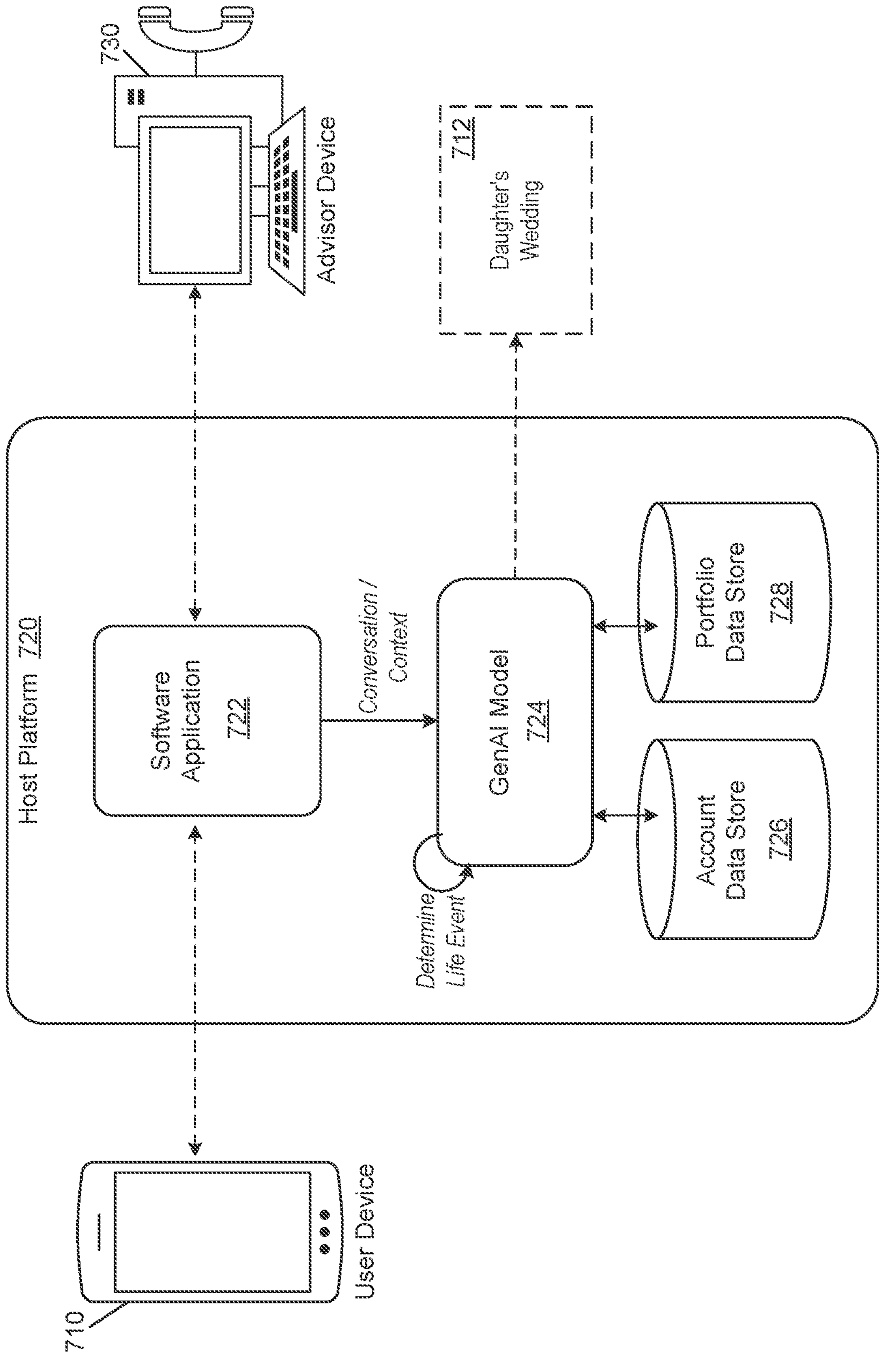
FIGS. 7A-7B are diagrams illustrating a process of generating portfolio changes based on an upcoming life event using GenAI according to example embodiments.
Figure 7B:
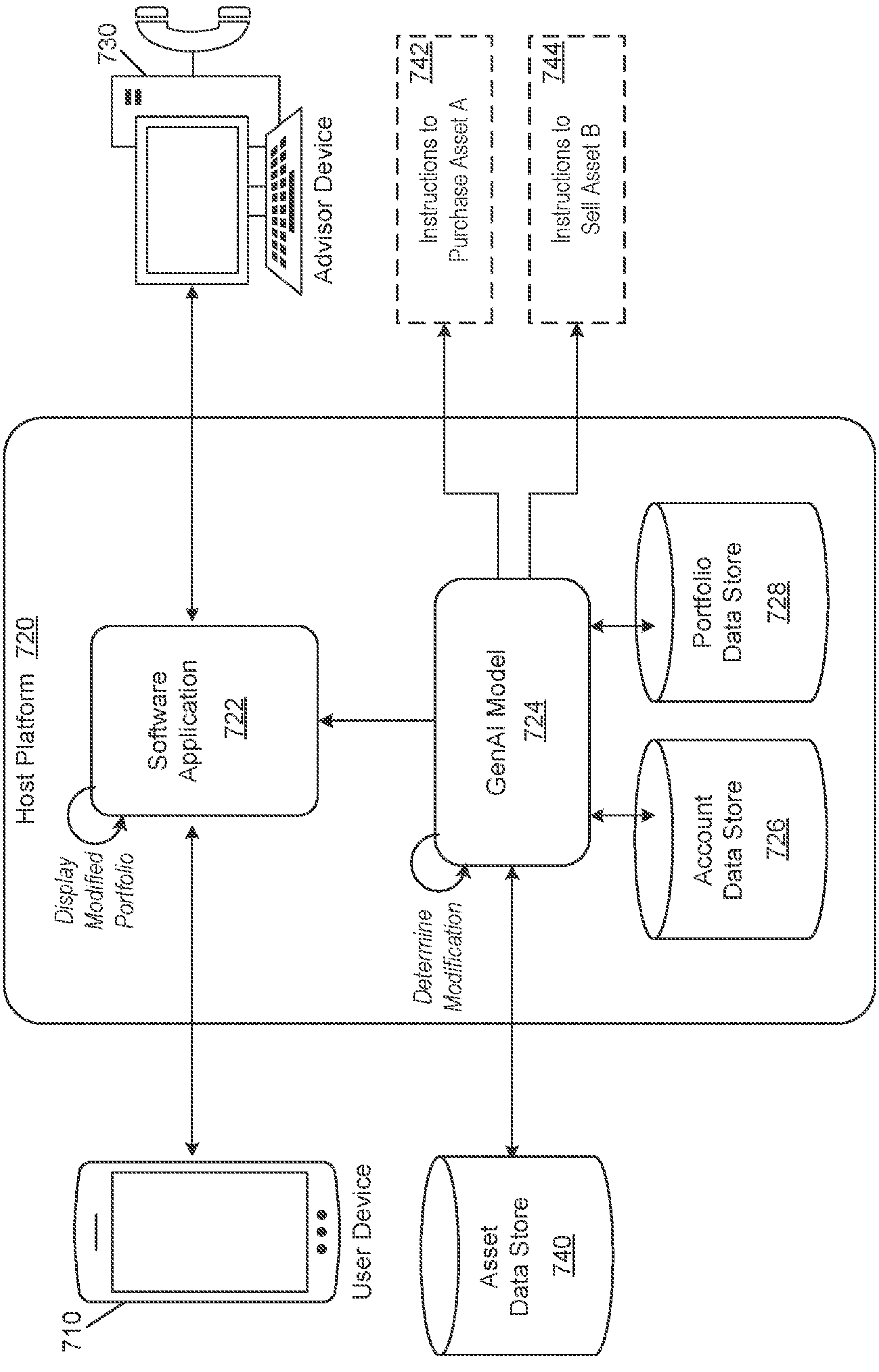

FIGS. 7A-7B illustrates a process of generating portfolio changes based on an upcoming life event using GenAI according to example embodiments. For example, FIG. 7A illustrates a process 700 of detecting an upcoming life event of a user from a conversation with the user. In this example, the user is conversing with a financial advisor using a user device 710 and a software application 722 (such as a meeting application) hosted by a host platform 720. Here, the advisor may access the meeting from the user device 730 and see a live view of the client/user via the software application 722. The client and the advisor may converse with each other via the user device 710 and the user device 730 via the software application 722.

Conversation data may be captured by the software application 722 and submitted to a GenAI model 724, also hosted on the host platform 720.

Here, the GenAI model 724 may identify an upcoming life event of the client/user based on the conversation and additional information about the user and assets. For example, the GenAI model 724 may ingest account data of the client from a data store 726, portfolio data of the client from a data store 728, asset data about available assets from external data stores, etc., to predict the upcoming life event. Here, the GenAI model 724 may be trained to learn a correlation between text and life events based on historical text associated with the life events. In this example, the GenAI model 724 identifies an upcoming life event 712 based on the conversation with the client.

The GenAI model 724 may also be trained to recommend/generate investment recommendations based on the identified life events. The investment recommendations may include purchasing assets, selling assets, an amount to purchase, an amount to sell, a purchase amount, a range of purchase amounts, etc.

For example, FIG. 7B illustrates a process 750 of generating instructions 742 and 744 on modifying a user's current portfolio to prepare for the upcoming life event. For example, the upcoming life event 712 may be used along with asset data from an asset data store 740, account data of the client from the data store 726, portfolio data of the client from the data store 728, and the like, to generate the recommend asset purchase/sell instructions including an instruction 742 to purchase a first asset to be added to the current portfolio and an instruction 744 to sell a second asset that already exists in the current portfolio to make room for the first asset in the portfolio.

In some embodiments, the software application 722 may delete personally identifiable information from the conversation (e.g., a transcript of the conversation generated by the software application 722, etc.) to clean the transcript and execute the GenAI model 724 on the cleaned transcript to prevent personally identifiable information from being used by the system. Furthermore, the upcoming life event may be one or more of a medical event, a travel event, a purchase event, a sale event, or the like. The event may be detected based on execution of the GenAI model on the conversation. An identifier of the event may be displayed by the software application 722 during the call.

Figure 8A:
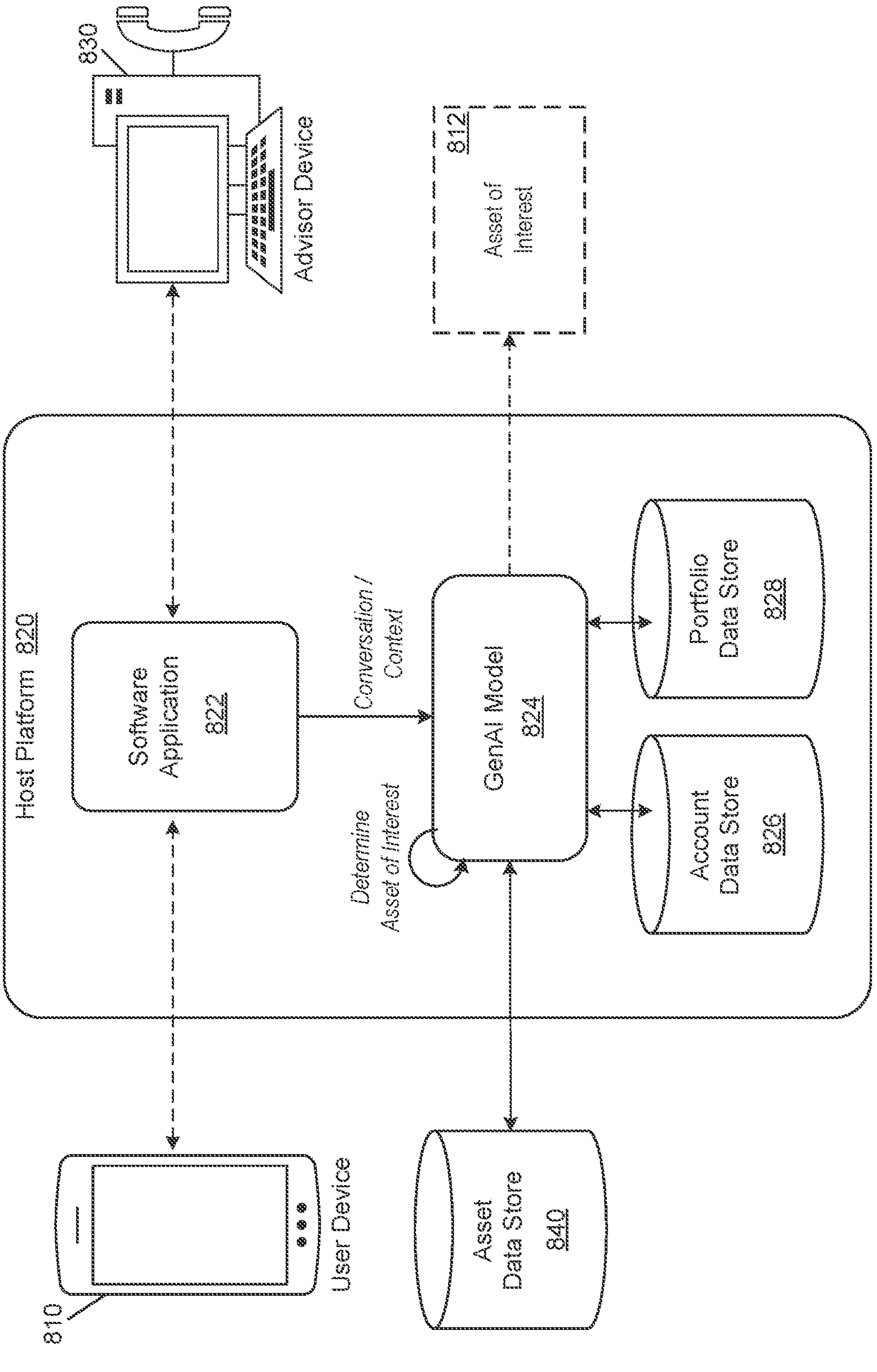
FIGS. 8A-8B are diagrams illustrating a process of identifying an asset of interest based on context and predicting performance of a portfolio with the asset of interest according to example embodiments.
Figure 8B:
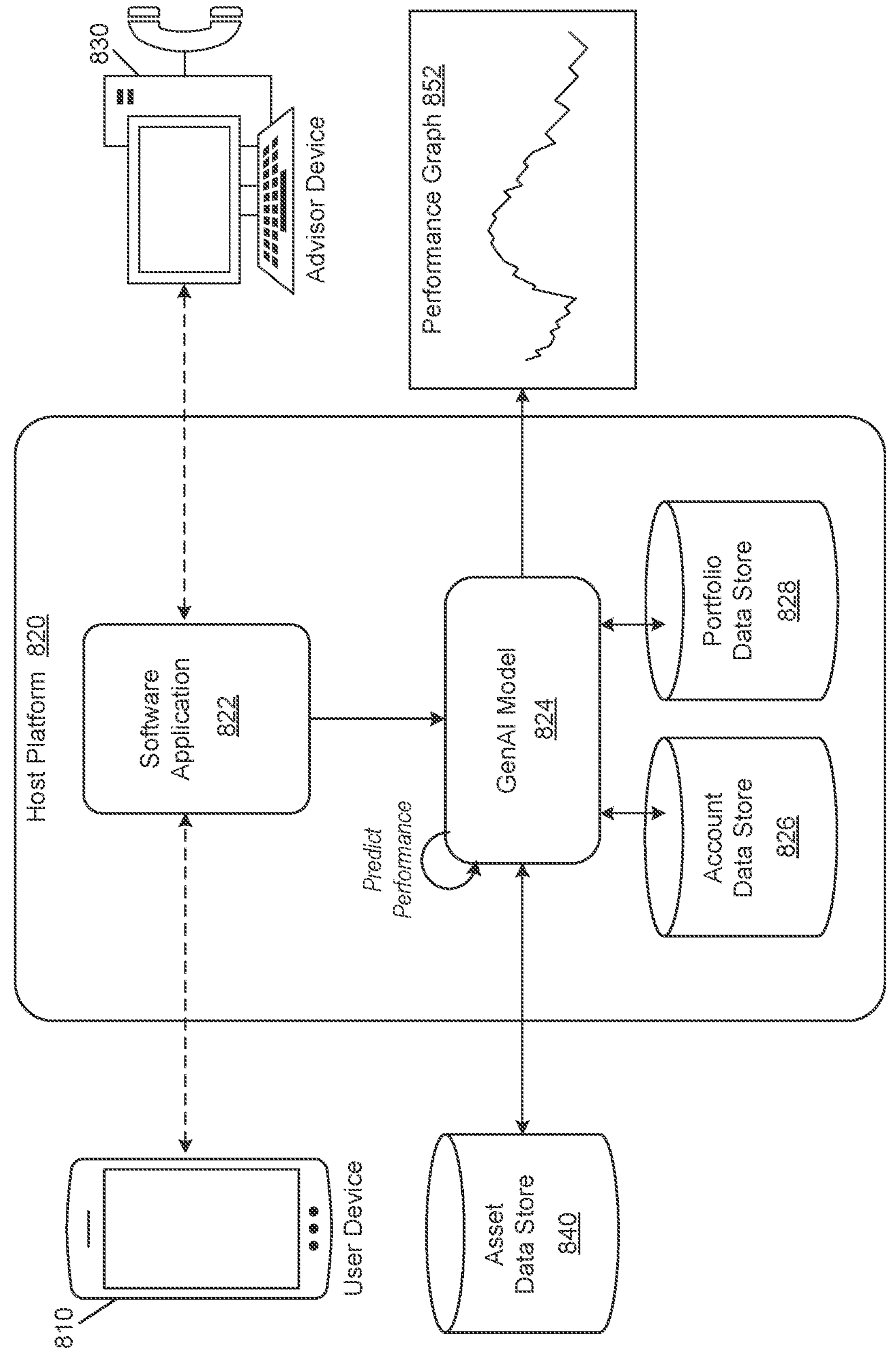

FIGS. 8A-8B illustrate a process of identifying an asset of interest based on context and predicting performance of a portfolio with the asset of interest according to example embodiments.

For example, FIG. 8A illustrates a process 800 of identifying an asset of interest 812 based on the user using context and creating a predicted/future portfolio of the user with the asset of interest included therein. The prediction can be into the future to allow the user to see how the asset is expected to perform compared to the rest of the existing assets within their portfolio. Here, the user can visually compare the predicted future performance of the asset of interest with respect to the existing assets in the portfolio to make management decisions.

In this example, contextual data such as browsing history, call logs, etc., may be gathered from a user device 810 of the user based on conversations between the user on the user device 810 and an advisor on a user device 830. Here, the conversations may be conducted through a software application 822 hosted by a host platform 820, such as a cloud platform, a web server, a database, a combination of systems, and the like. The conversation data and the context, such as browsing history, may be transferred to a GenAI model 824, which identifies an asset of interest of the user that is not included in their current portfolio based on the received contextual data of the user and account data and portfolio data of the user stored in data stores 826 and 828, respectively. The received contextual data may include websites, web pages, addresses, URLs, etc., associated with assets. The text from content included in the websites, web pages, addresses, URLs, etc., may be used to identify the asset of interest.

As an example, the asset may be a municipal bond. Here, the GenAI model 824 may obtain information about the asset (e.g., the municipal bond) from an asset data store 840 and generate content about the asset that the user can view.

The content may include a predicted asset performance generated by the GenAI model 824 or a machine learning model (not shown). Here, the model may predict a performance of the current portfolio with the identified asset of interest included therein at a future point in time. Furthermore, the software application 822 may display the predicted performance of the current portfolio with the identified asset of interest included at the future point during the meeting with the user device 810 or a future meeting.

For example, FIG. 8B illustrates a process 850 of a next meeting between the client and the advisor. In this example, the advisor may query the software application 822 with an identifier of the user of the user device 810, such as a username, an email address, an account number, etc. In response, the software application 822 may trigger the GenAI model 824 to identify an asset of interest in the browsing history of the user device 810 and generate content about the asset of interest, such as a performance graph 852 that is integrated into a future/predicted portfolio of the user. The predicted portfolio may also include predictions about the performance of other assets already existing. The performance of the other assets may also be displayed in comparison to the performance graph 852 to enable the user to visualize how the assets are expected to perform.

For example, the performance may include performance of the asset of interest from a current point to a predetermined time in the future (e.g., 10 days, 15 days, 30 days, etc.)

Furthermore, the system may show the user additional information about existing assets in the current portfolio that the user may get rid of to make room for the new asset of interest in the portfolio. The instructions may include instructions to sell, purchase, and the like.

Figure 9A:
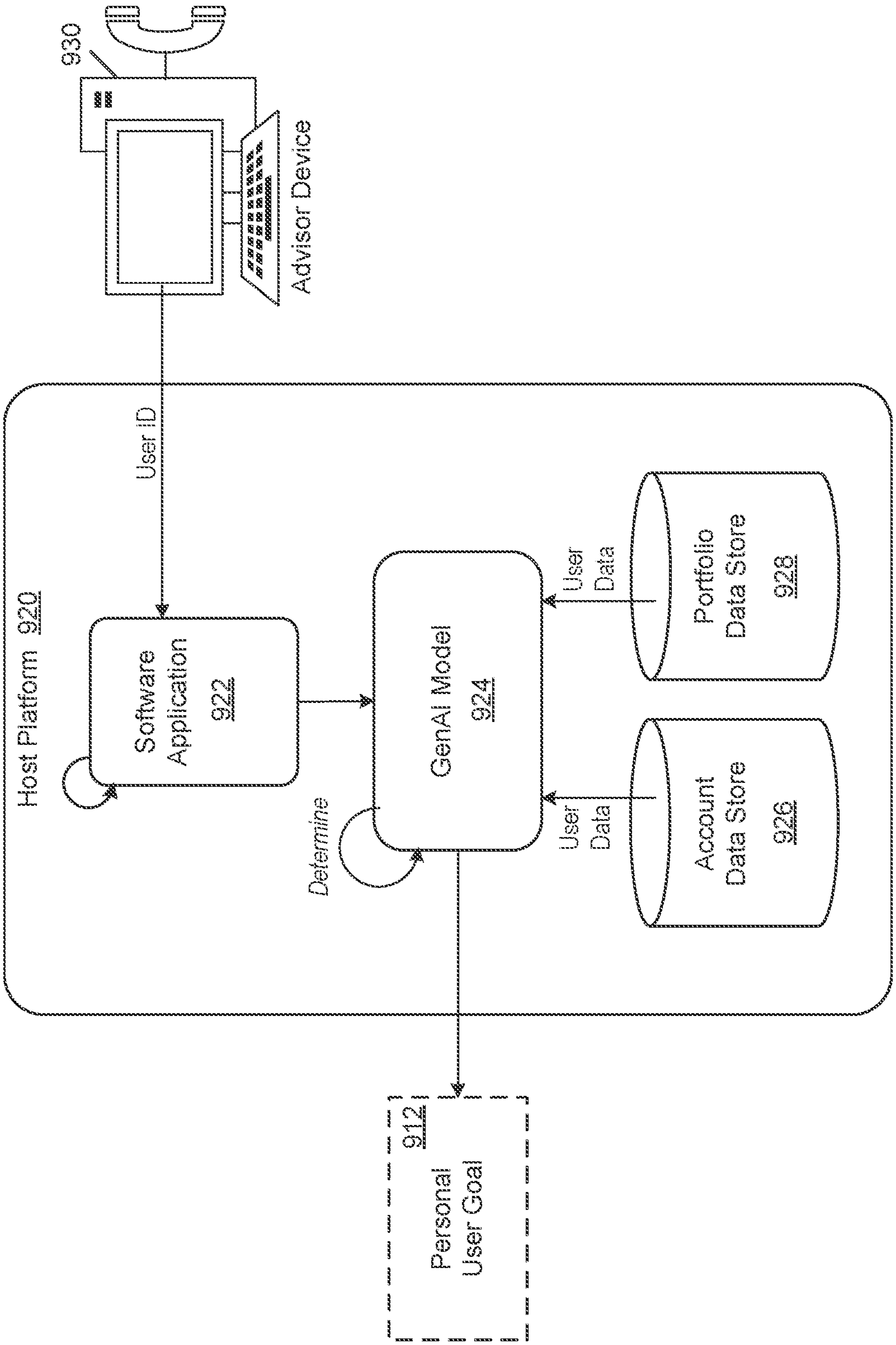
FIGS. 9A-9B are diagrams illustrating a process of tracking goals and delivering display content based on tracked goals according to example embodiments.
Figure 9B:
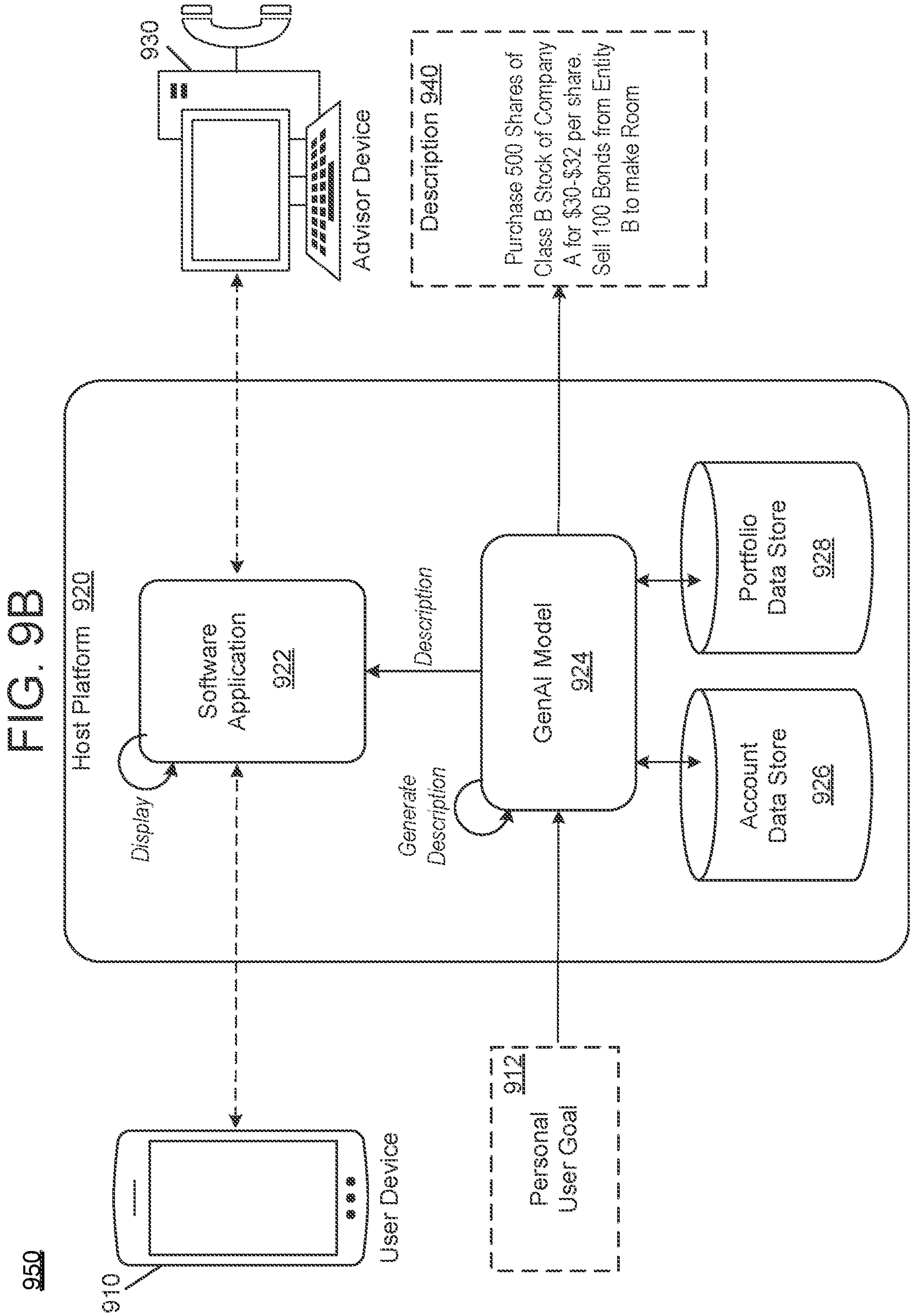

FIGS. 9A-9B illustrate a process of tracking goals and delivering display content based on tracked goals according to example embodiments. For example, FIG. 9A illustrates a process 900 of determining a goal 912 for a user.

Here, a host platform 920 may host a software application 922, such as a conferencing software, etc. based on one or more of account history data of a user's financial account, banking account, etc., within a data store 926 and portfolio history data of the user from the user's investment account, retirement account, etc. within a data store 928. In this example, the system already stores the user's account data. The advisor may use a user device 930 to conduct meetings with the user via a user device 910 (shown in FIG. 9B).

Here, the user device 930 (e.g., an advisor, etc.) may submit an identifier of the user to a software application 922.

In response, the software application 922 may trigger an AI engine (not shown) to retrieve user data from the data stores 926 and 928 and predict a personal goal of the user based on execution of the user data via a GenAI model 924 on the retrieved data. The goal may be a financial goal such as a predetermined account balance to try to achieve by a predetermined period of time (e.g., have $100,000 in your account by July 1 of next year, etc.) The GenAI model 924 may be trained to identify investment strategies based on goals, including investment goals, financial planning goals, retirement goals, life event goals, etc., which may be learned by executing the GenAI model 924 on historical portfolios of other users. The GenAI model 924 may be used to make recommendations based thereon.

FIG. 9B illustrates a process 940 of generating a description 950 of an investment strategy based on the goal 912 identified by the GenAI model 924. For example, the GenAI model 924 may ingest portfolio data of the user from the data store 928 and/or financial account data from the data store 926. In addition, the GenAI model 924 may ingest the goal 912 (e.g., a description of the goal). Based on the data ingested, the GenAI model 924 may determine a strategy, such as a plan to purchase an asset, sell an asset, take another action with an asset, and the like. The ingested data may be vectorized or otherwise encoded into a numerical format capable of processing by a computer processor before input to the GenAI model 924.

Here, the GenAI model 924 may be trained based on historical portfolios, investment strategies, goals, life events, planned expenses, and the like to understand a connection between goals and investment actions. The description 950 may include one or more instructions on how to purchase the asset and/or sell an asset. The description 950 may be output onto a user interface of the software application 922.

As such, the description 950 may be output on the user device 910 and/or the user device 930 for viewing by the client and the advisor. In some embodiments, the software application 922 may display prompts on a user interface of one or more of the user device 910 and the user device 930 and receive responses from a corresponding user to the prompt(s). The GenAI model 924 may also identify the goal based on the prompt responses. Here, the goal may be a goal the user is unaware of.

The GenAI model 924 can identify the goal based on its knowledge obtained/learned from other portfolios.

Figure 10A:
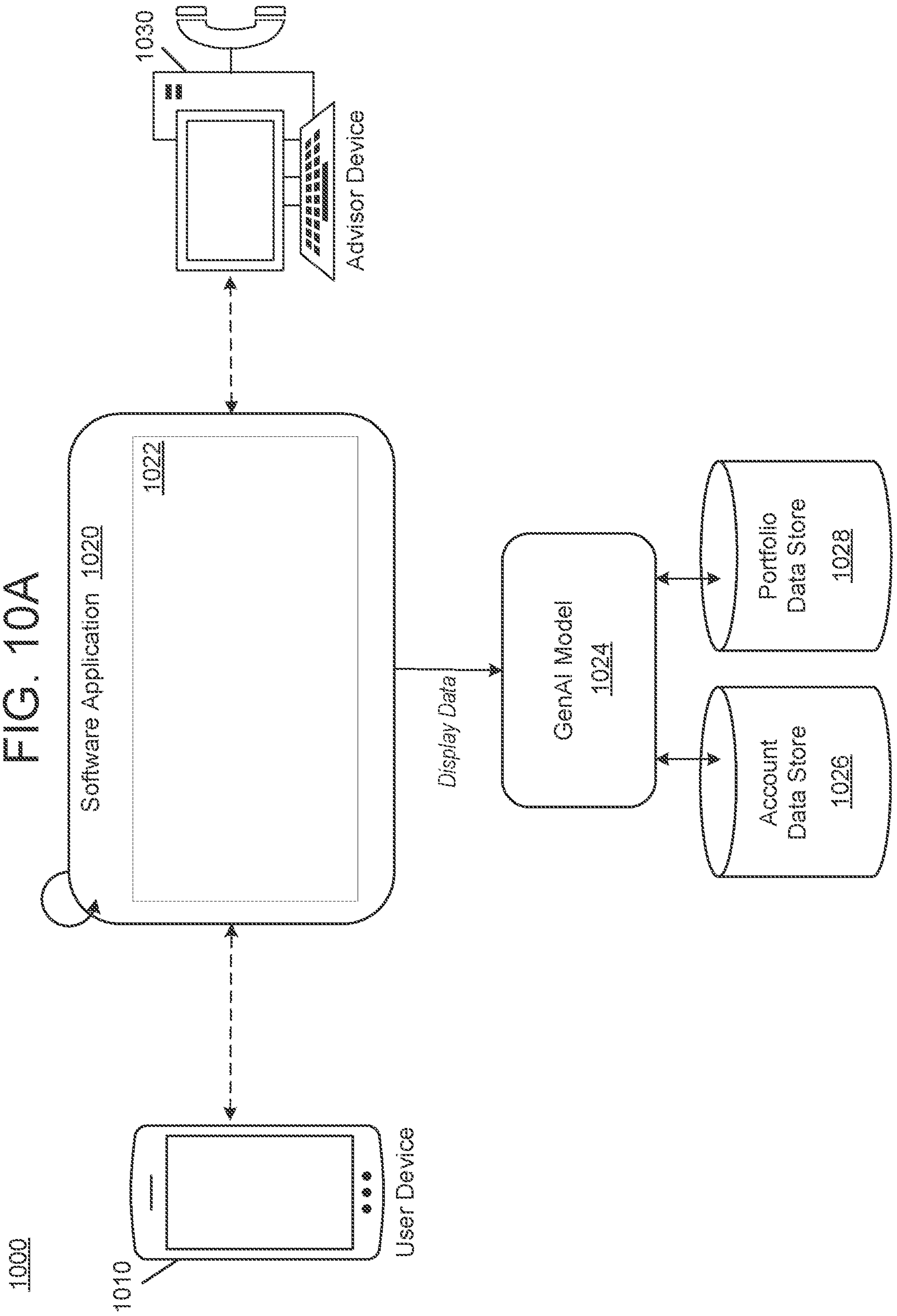
FIG. 10A-10C are diagrams illustrating a process dynamically reconfiguring content on a dashboard according to example embodiments.
Figure 10B:
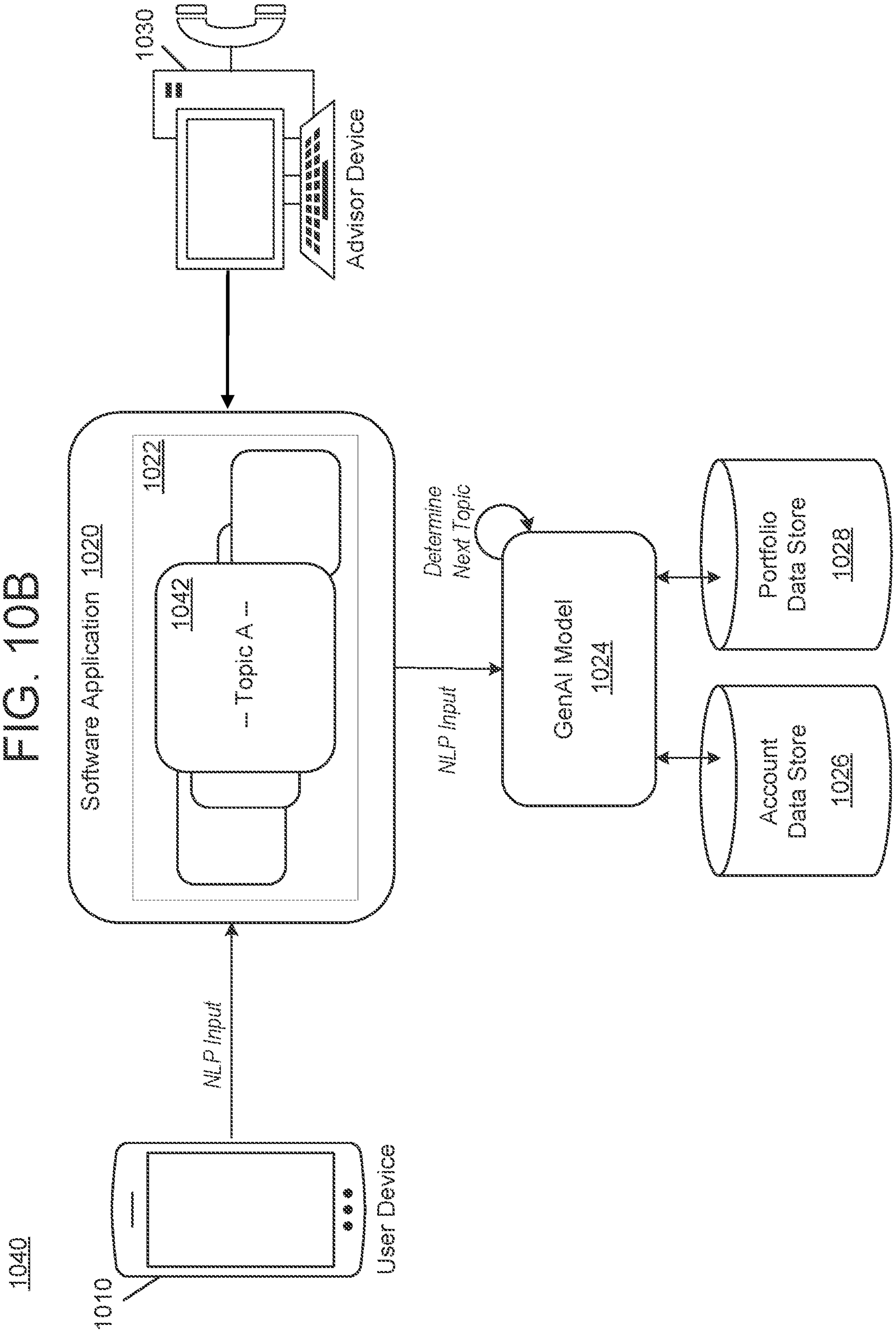
Figure 10C:
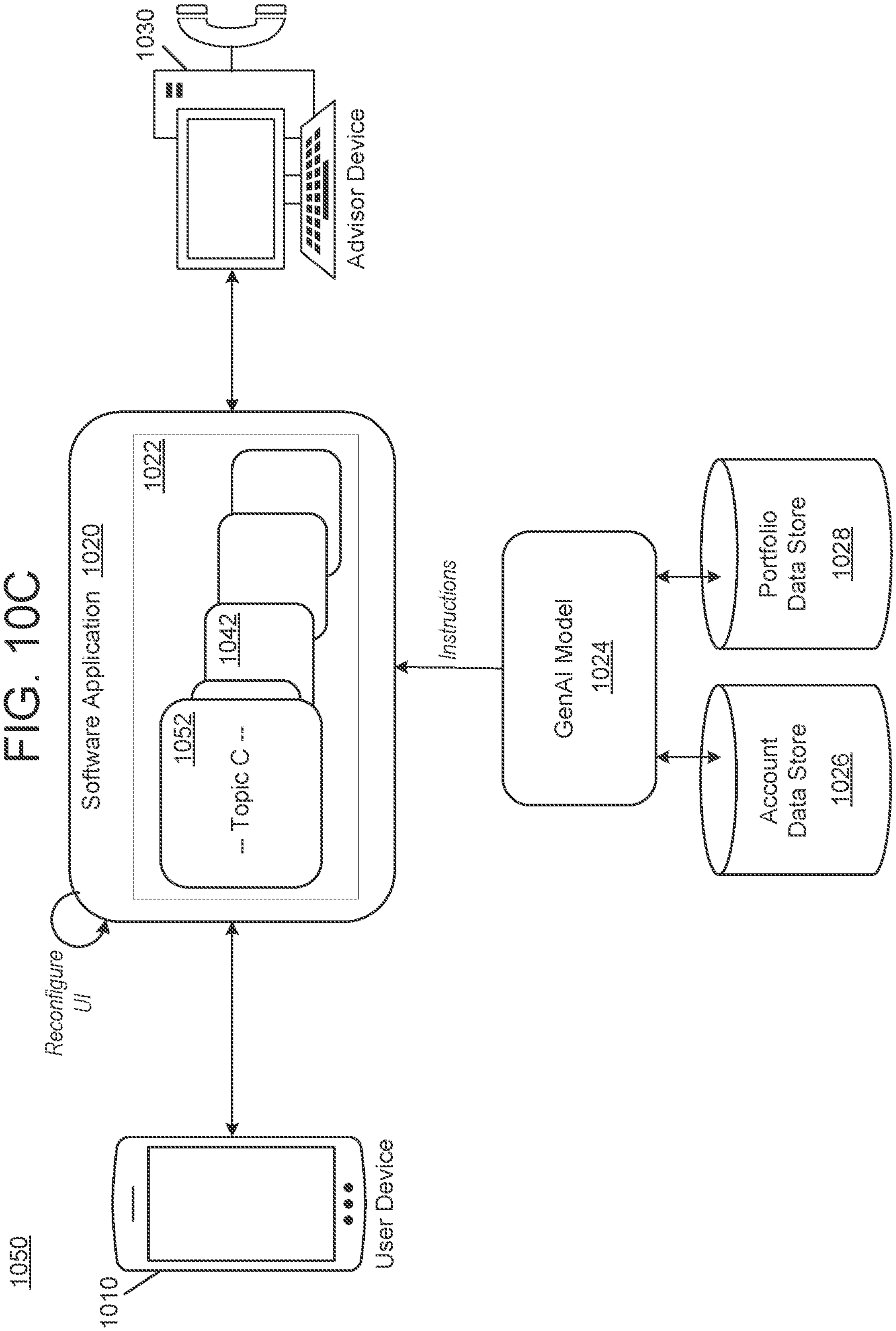

FIG. 10A-10C illustrate a process of dynamically reconfiguring content on a dashboard according to example embodiments. For example, FIG. 10A illustrates a process 1000 of conducting a meeting between a user device 1010 and a user device 1030. Here, the user device 1010 and the user device 1030 may connect to a host platform where a software application 1020 is hosted. Here, the software application 1020 may be a teleconferencing application.

The software application 1020 may include a user interface 1022 where content such as documents, images, videos, power points, files, and the like may be displayed.

The user interface 1022 may also be referred to as a dashboard. The user device 1010 or the user device 1030 may upload content to the software application 1020 and display it via the user interface 1022. Furthermore, audio may be spoken by a user of the user device 1010 and a user of the user device 1030 and transferred between the user devices via the software application 1020. Thus, the users may have both a live view and a live audio feed of the other user via the software application 1020.

In the example of FIG. 10A, the software application 1020, includes a GenAI model 1024 that can receive content from the dashboard and audio from the conversation and emphasize content currently displayed based on the topics discussed during the conversation. For example, if either user mentions an asset from the portfolio, the GenAI model 1024 may reconfigure how content is displayed on the user interface 1022. Here, the GenAI model 1024 may consume the display content from the user interface 1022, audio spoken during the meeting in "real-time," the user's account data from a data store 1026, portfolio data of the user from a data store 1028, and the like.

For example, FIG. 10B illustrates a process 1040 of displaying an initial configuration of content on the user interface 1022 based on a default setting, a first topic to be discussed, or the like. In this example, the user device 1010 or the user device 1030 may request to view a report on the user interface 1022. The report may include a plurality of display modules corresponding to a plurality of different assets, income, spending, accounts, and the like. In this example, a display module 1042 is initially emphasized on the user interface 1022 based on default settings, a condition, or the like.

The display data is provided to the GenAI model 1024 along with meeting content such as a meeting agenda and audio as it is spoken during the meeting. The display data may identify the different modules on the screen and the content included in each module, such as the file's name, the asset's name, etc. The audio may be submitted at recurring intervals (e.g., every 1 second, etc.)

According to various embodiments, the GenAI model 1024 may detect a topic currently being discussed between the user of the user device 1010 and the user of the user device 1030 is not related to the content within the display module but is instead related to a different topic. Here, the audio does not match the content being displayed within the display module 1042. In response, the GenAI model 1024 may identify a different display module on the screen that is being discussed based on the audio and the display data provided by the software application 1022 during the meeting and reconfigure the content within the user interface 1022.

For example, FIG. 10C illustrates a process 1050 of reconfiguring the user interface 1022 based on the content spoken during the conversation.

In this example, the GenAI model 1024 may visually emphasize a different display module corresponding to the different topics being discussed during the conversation at this time (i.e., in real-time). Here, the GenAI model 1024 determines that the users are discussing an asset containing content within a display module 1052. In response, the GenAI model 1024 can emphasize the display module 1052 by submitting instructions to the software application 1020 to move the display module 1052, enlarge the display module 1052, change a color of the display module 1052, change a shading of the display module 1052, or the like. The reconfiguring may cause the currently displayed display module (e.g., the display module 1042) to be darkened, greyed out, moved to a different play, covered by another module, etc.

Figure 11A:
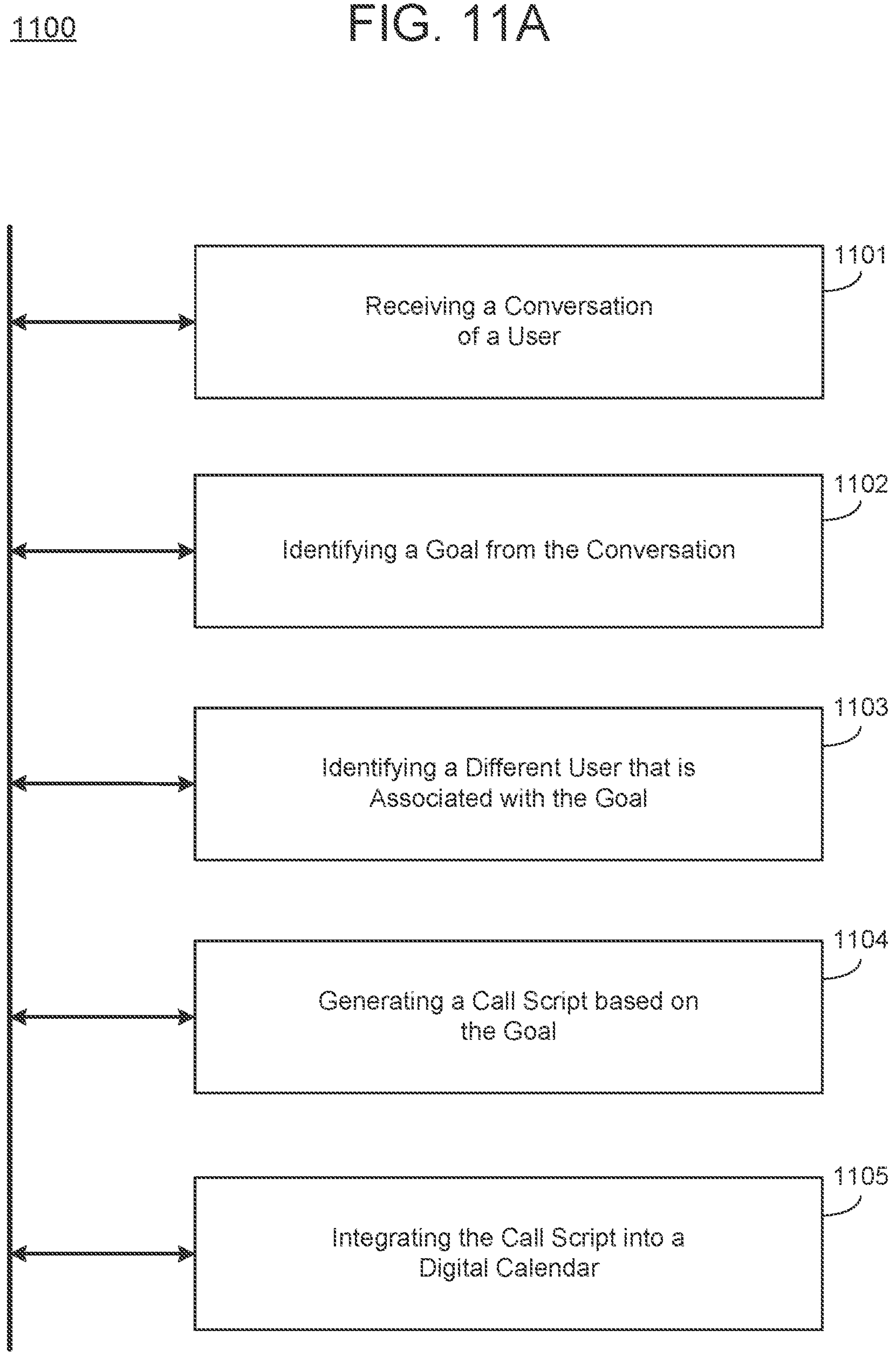
FIG. 11A is a diagram illustrating a method of generating a call script for a different user based on a conversation with a user according to example embodiments.

FIG. 11A illustrates a method 1100 of generating a call script for a different user based on a conversation with a user according to example embodiments. As an example, the method 1100 may be performed by a computing system, a software application, a server, a cloud platform, a combination of systems, and the like. Referring to FIG. 11A, in 1101, the method may include receiving a user's conversation. In 1102, the method may include identifying the user's goal from the conversation. In 1103, the method may include identifying a different user associated with the identified goal of the conversation.

In 1104, the method may include generating a call script comprising a description of content to be discussed with a different user based on the execution of a generative artificial intelligence (GenAI) model on the identified goal. In 1105, the method may include integrating the call script into a digital calendar of the different users.

In some embodiments, the receiving may include recording audio spoken during one or more of a call, a meeting, and a teleconference, and converting the recorded audio into text based on a speech-to-text converter. In some embodiments, the identifying the goal may include identifying a topic of interest based on execution of a machine learning model in the conversation. In some embodiments, the generating the call script may include generating conversation text about the topic of interest based on execution of the GenAI model on a corpus of pages corresponding to the topic of interest and displaying the conversation text via a user interface of a user device of the sender.

In some embodiments, the identifying the different users may include identifying the different user based on comparing the identified goal to keywords included in a conversation log of a previous conversation with the different user. In some embodiments, the generating may include generating text to be discussed during the upcoming call and images to be displayed on the screen during the upcoming call based on execution of the GenAI model on the identified goal. In some embodiment, the method may further include training the GenAI model to generate the call script based on execution of the GenAI model, a corpus of historical call scripts between the sender and a plurality of users. In some embodiments, the integration may include simultaneously integrating the call script into a digital calendar of the sender.

Figure 11B:
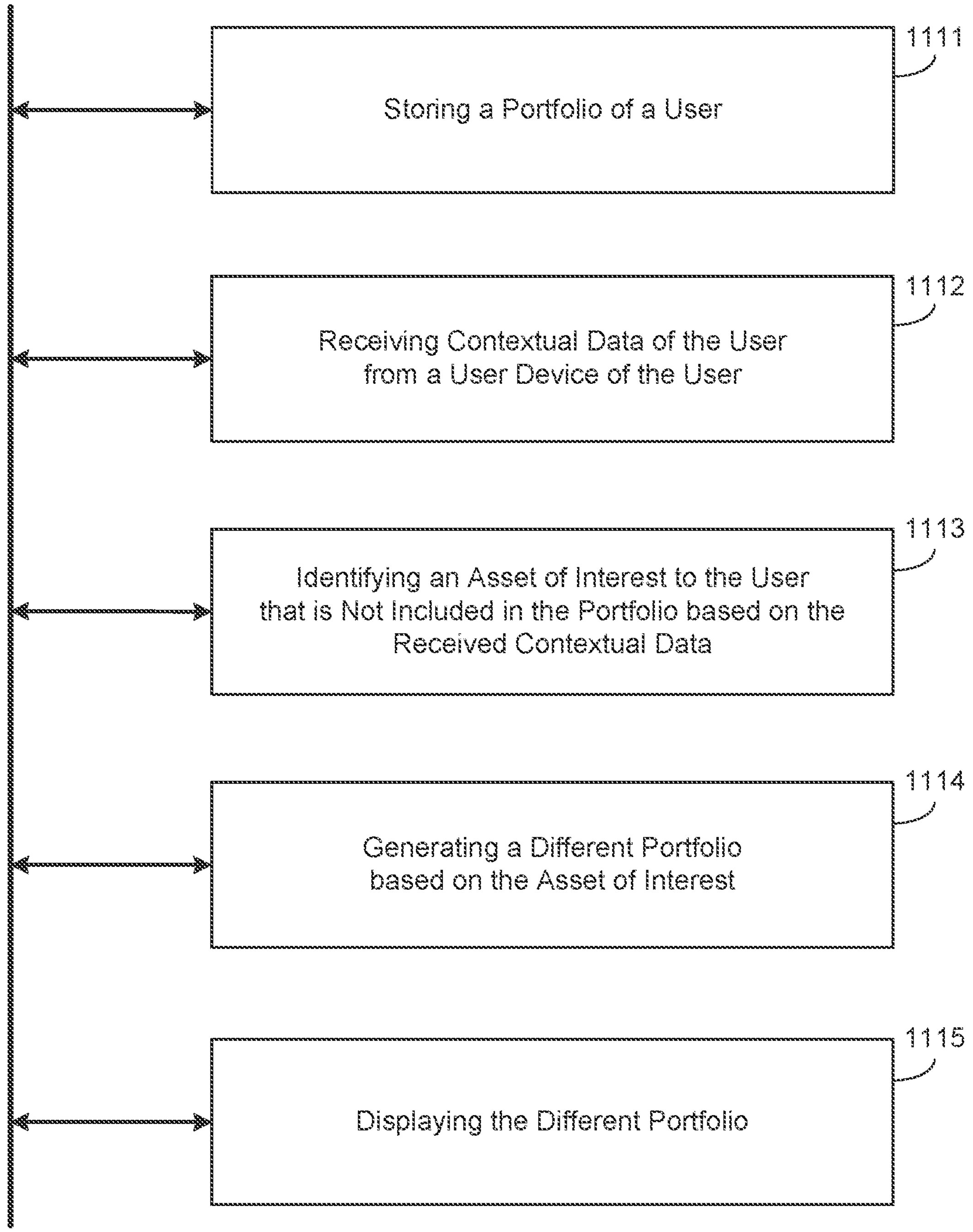
FIG. 11B is a diagram illustrating a method of generating a different portfolio based on a missing asset according to example embodiments.

FIG. 11B illustrates a method 1110 of generating a different portfolio based on a missing asset according to example embodiments. As an example, the method 1100 may be performed by a computing system, a software application, a server, a cloud platform, a combination of systems, and the like. Referring to FIG. 11B, in 1111, the method may include storing a portfolio of assets of a user in memory.

In 1112, the method may include receiving contextual data of the user from a user device of the user. In 1113, the method may include identifying an asset of interest that is not included in the stored portfolio based on execution of a generative artificial intelligence (GenAI) model on the portfolio of assets and the received contextual data of the user. In 1114, the method may include generating a different portfolio based on the asset of interest not included in the portfolio. In 1115, the method may include displaying the different portfolio via a user interface.

In some embodiments, the generating the different portfolio may include generating a new portfolio that includes the asset of interest and one or more assets from among the portfolio of assets. In some embodiments, the generating may further include determining an optimum amount of the asset of interest to be included in the new portfolio based on the execution of the GenAI model. In some embodiments, the method may further include training the GenAI model to generate the different portfolio based on execution of the GenAI model on the portfolio of the user's assets and portfolios of other users' assets.

In some embodiments, the generating the different portfolios may include extracting a future performance of the asset of interest from an external data source, generating a graphic illustration that represents the performance of the asset of interest, and modifying the portfolio of assets to include the graphic illustration. In some embodiments, the generating the different portfolio may include generating a display window with information about the asset of interest and overlaying the display window on content of existing assets within the portfolio. In some embodiments, the contextual data may include one or more of a browsing history and a call log from a user device of the user.

Figure 11C:
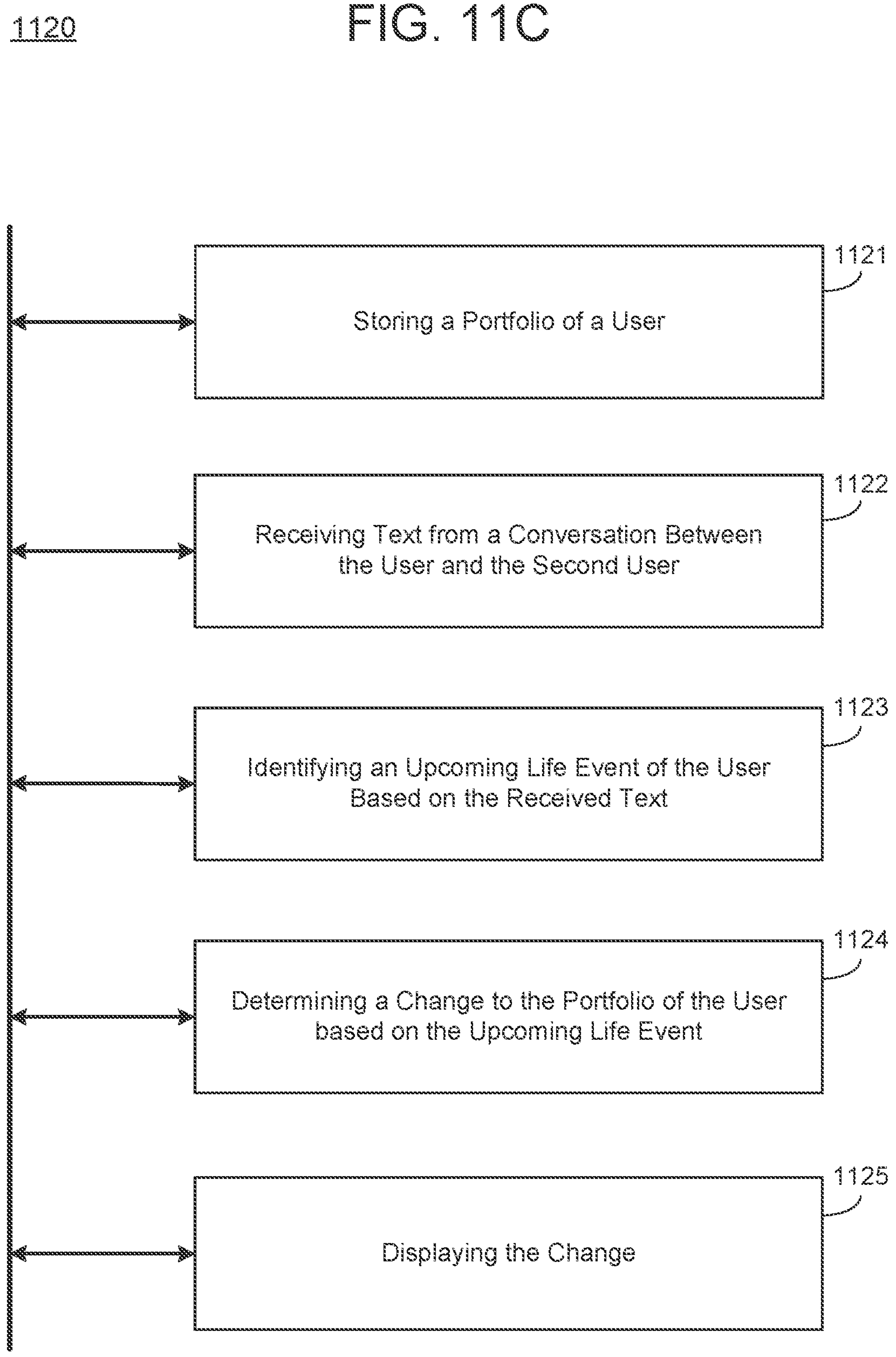
FIG. 11C is a diagram illustrating a method of determining a change to a portfolio based on an upcoming life event according to example embodiments.

FIG. 11C illustrates a method 1120 of determining a change to a portfolio based on an upcoming life event according to example embodiments. As an example, the method 1120 may be performed by a computing system, a software application, a server, a cloud platform, a combination of systems, and the like. Referring to FIG. 11C, in 1121, the method may include storing a portfolio of assets of a user in memory. In 1122, the method may include receiving text from a conversation between the user on a first device and a second user on a second device. In 1123, the method may include identifying an upcoming life event of the user based on execution of a generative artificial intelligence (GenAI) model on the received text from the conversation. In 1124, the method may include determining a change to the portfolio of assets of the user based on the upcoming life event and existing assets within the portfolio of assets. In 1125, the method may include displaying the change via a user interface.

In some embodiments, the receiving may include receiving a transcript from one or more of a call, a meeting, and a teleconference between the first user and the second user, and identifying the upcoming life event based on execution of the GenAI model on the transcript. In some embodiments, the receiving may include deleting personally identifiable information from the transcript before executing the GenAI model on the transcript. In some embodiments, the identifying may include identifying one or more of a medical event, a travel event, a purchase event, and a sale event, based on execution of the GenAI model on the conversation and displaying information about the one or more of the medical event, the travel event, the purchase event, and the sale event on the user interface along with the change.

In some embodiments, the determining the change may further include determining how the portfolio of assets should change based on execution of the GenAI model on the identified upcoming life event and the portfolio of assets of the user, and the displaying may include displaying information about how the portfolio of assets should change via the user interface. In some embodiments, the determining the change may include determining a new asset to add to the existing assets within the portfolio based on execution of the GenAI model on the identified upcoming life event and the portfolio of assets of the user, and the displaying comprises displaying information about how to purchase the new asset via the user interface.

In some embodiments, the determining the change may include determining an existing asset to sell from among the existing assets within the portfolio based on execution of the GenAI model on the identified upcoming life event and the portfolio of assets of the user, and the displaying comprises displaying information about how to sell the existing asset via the user interface. In some embodiments, the method may further include training the GenAI model based on execution of the GenAI model on the portfolio of the user's assets, the portfolio assets of other users, and life events of other users.

Figure 11D:
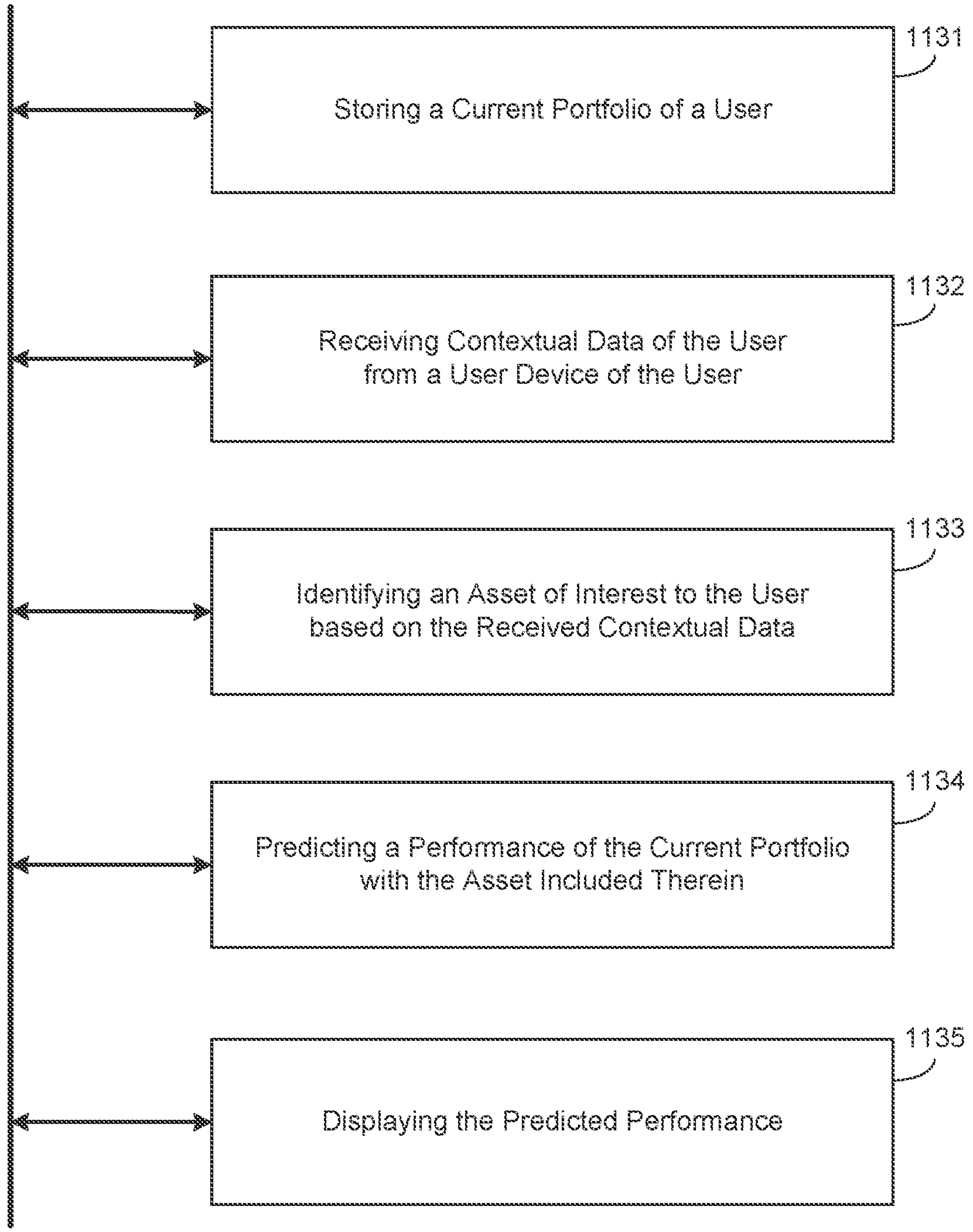
FIG. 11D is a diagram illustrating a method of predicting the performance of a portfolio with an asset of interest according to example embodiments.

FIG. 11D illustrates a method 1130 of predicting the performance of a portfolio with an asset of interest according to example embodiments. As an example, the method 1130 may be performed by a computing system, a software application, a server, a cloud platform, a combination of systems, and the like. Referring to FIG. 11C, in 1131, the method may include storing a user's current portfolio in memory.

In 1132, the method may include receiving contextual data of the user from a user device of the user. In 1133, the method may include identifying an asset of interest of the user based on execution of a generative artificial intelligence (GenAI) model based on the user's received contextual data and the user's current portfolio stored in memory. In 1134, the method may include predicting a performance of the current portfolio with the identified asset of interest included therein at a future point in time. In 1135, the method may include displaying the predicted performance of the current portfolio with the identified asset of interest included therein at the future point in time.

In some embodiments, the contextual data may include browsing history from a user device's browser, and the identifying comprises identifying the asset of interest-based execution of the GenAI model on the browsing history. In some embodiments, the contextual data may include a call log from the user device, and the identifying may include identifying the asset of interest-based execution of the GenAI model on the call log.

In some embodiments, the predicting the performance may include executing a machine learning model on the current portfolio with the identified asset included therein to determine the performance of the current portfolio with the identified asset included therein at the future point in time.

In some embodiments, the method may further include modifying the current portfolio by removing one or more existing assets within the current portfolio to make room for the identified asset of interest prior to execution of the machine learning model on the current portfolio with the identified asset included therein. In some embodiments, the method may further include generating a digital report based on execution of the GenAI model on the current portfolio with the identified asset included therein and displaying the digital report via a user interface of a software application. In some embodiments, the predicting may include predicting the performance of the current portfolio with the identified asset of interest included therein from a current point in time to the future point in time. In some embodiments, the identifying the asset of interest may further include identifying the asset of interest based on execution of the GenAI model on a plurality of other portfolios of other users.

Figure 11E:
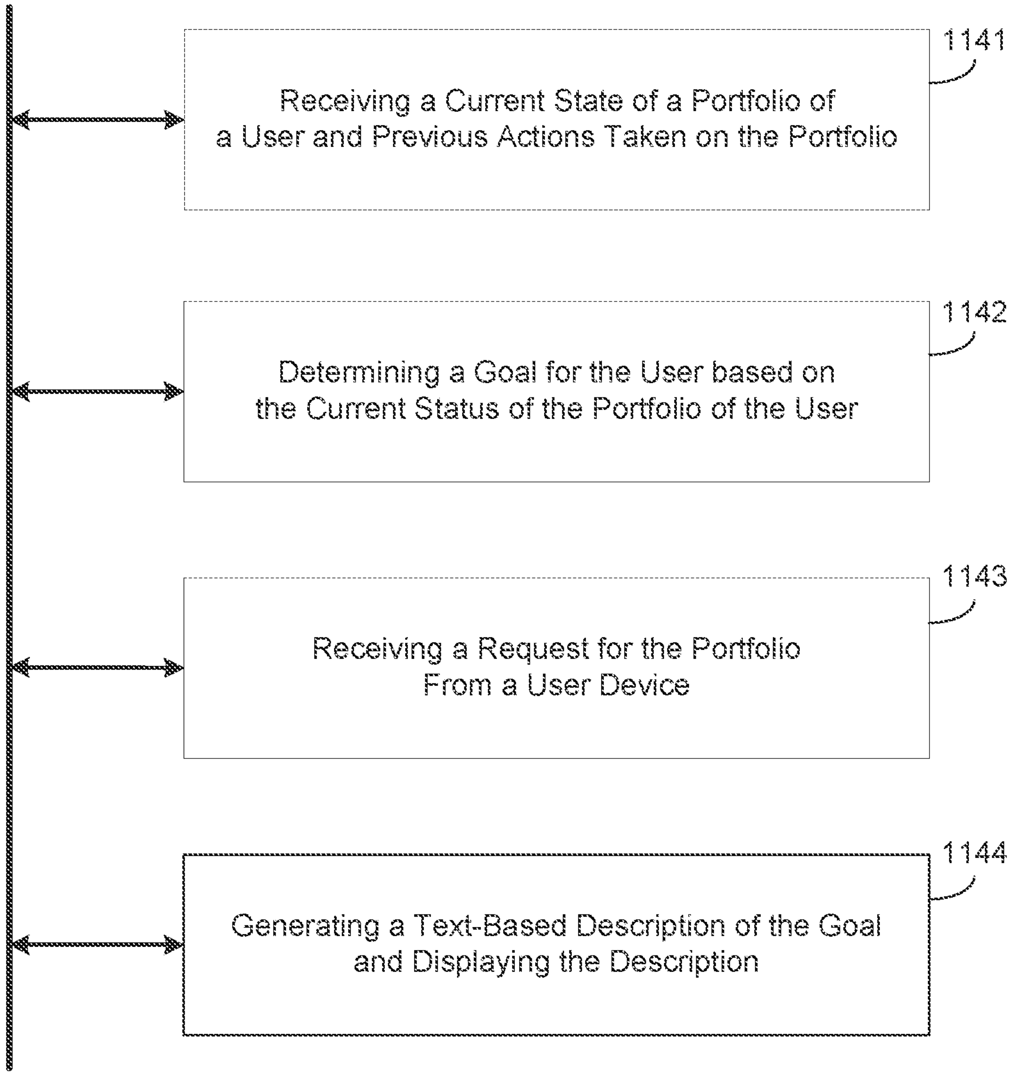
FIG. 11E is a diagram illustrating a method of determining a goal for a user based on context according to example embodiments.

FIG. 11E illustrates a method 1140 of determining a goal for a user based on context according to example embodiments. As an example, the method 1140 may be performed by a computing system, a software application, a server, a cloud platform, a combination of systems, and the like. Referring to FIG. 11E, in 1141, the method may include receiving a current status of a portfolio of a user and previous actions taken on the portfolio over a predetermined period of time.

In 1142, the method may include determining a goal for the user based on execution of a generative artificial intelligence (GenAI) model on the current status of the user portfolio and the previous actions taken. In 1143, the method may include receiving a request for the user's portfolio via a user device. In response to the request, in 1144, the method may include generating a text-based description of the personal goal and displaying the text-based description of the personal goal with portfolio content on a user interface of the user device.

In some embodiments, the method may further include training the GenAI model to determine the goal for the user based on execution of the GenAI model on portfolios and goals of other users prior to executing the GenAI model based on the user's portfolio. In some embodiments, the receiving the request may include receiving an input on the user interface of the user device. In some embodiments, the portfolio may include a file with a description of assets owned by the user, and the previous actions may include previous actions taken on the assets owned by the user.

In some embodiments, the method may further include displaying a prompt on the user interface and receiving a response via the user interface, and the determining the goal for the user may further include determining the goal for the user based on the prompt and the response to the prompt. In some embodiments, the receiving the request may include receiving the request from a videoconferencing software application, and the displaying comprises displaying the goal for the user on a user interface of the videoconferencing software application. In some embodiments, the current status may include receiving a description of assets that previously existed within the portfolio and actions taken on the assets to arrive at the portfolio's current status.

Figure 11F:
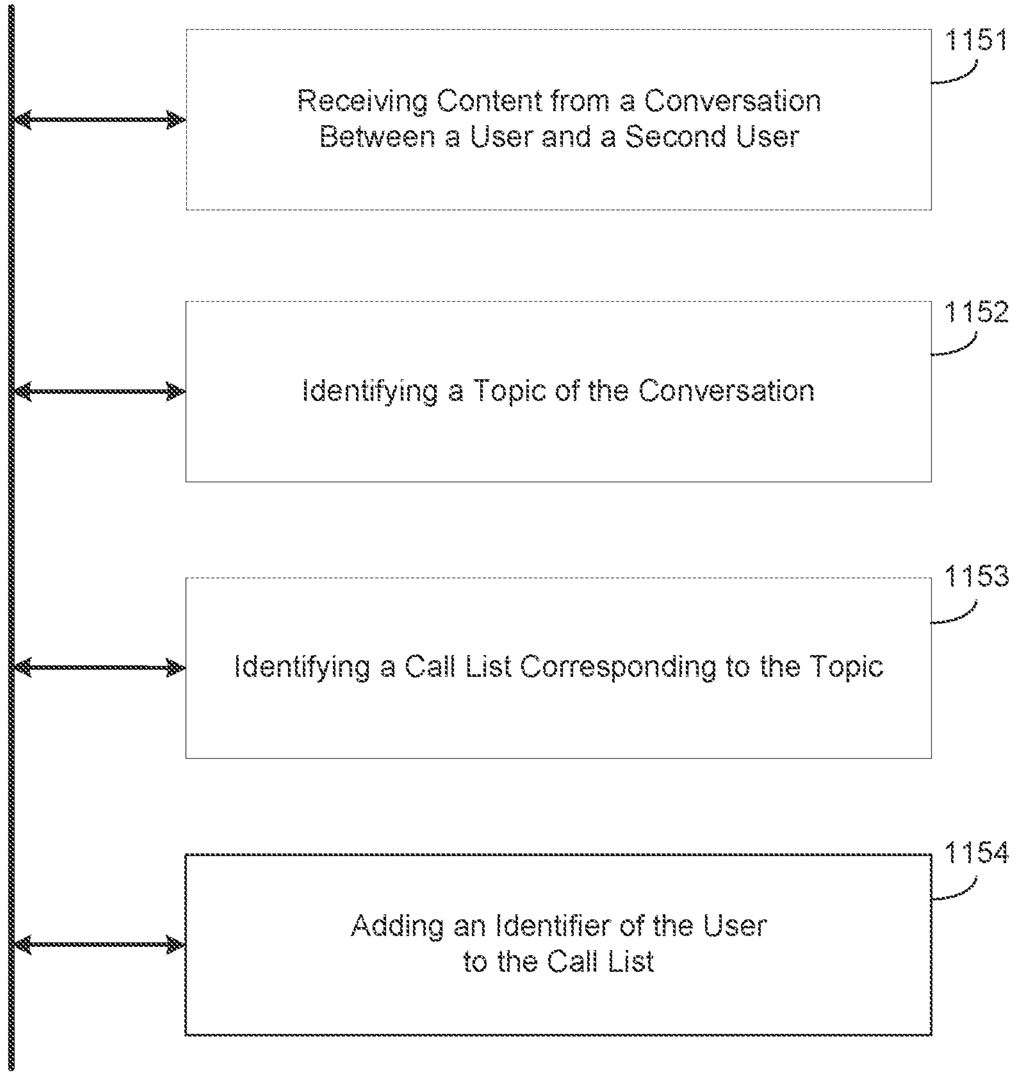
FIG. 11F is a diagram illustrating a method of generating an automated call list based on call content according to example embodiments.

FIG. 11F illustrates a method 1150 of generating an automated call list based on call content according to example embodiments. As an example, the method 1150 may be performed by a computing system, a software application, a server, a cloud platform, a combination of systems, and the like. Referring to FIG. 11F, in 1151, the method may include receiving content from a conversation between a user on a user device and a second user on a user device connected to the user device via a network. In 1152, the method may include identifying a topic of the conversation based on execution of a generative artificial intelligence (GenAI) model on the received content from the conversation. In 1153, the method may include identifying a call list previously stored in memory associated with the topic of the conversation based on keywords included in the identified topic of the conversation. In 1154, the method may include adding an identifier of the user to the call list stored in memory.

In some embodiments, the receiving may include listening to an audio call between the user device and the second user device and identifying the topic of conversation while the audio call is taking place. In some embodiments, the identifying may further include converting audio content from the audio call into text via a converter and executing the GenAI model on the text of the audio call to identify the topic of the conversation. In some embodiments, the method may further include displaying an indicator of the addition to the call list via a user interface on the second user device. In some embodiments, the method may further include identifying call content to be discussed with the call list based on execution of the GenAI model on the content from the conversation and storing the call content with the call list in the memory.

In some embodiments, the receiving may include receiving a chat conversation from a conversation window displayed on one of the first and second devices, and the identifying may include identifying the topic of interest based on execution of the GenAI model on text content included in the chat conversation. In some embodiments, the method may further include training the GenAI model to identify topics of conversations based on execution of the GenAI model on historical conversations and conversations. In some embodiments, the adding may include adding a phone number of the user device to a meeting invite and transmitting the meeting invite to the user device and the second user device.

Figure 11G:
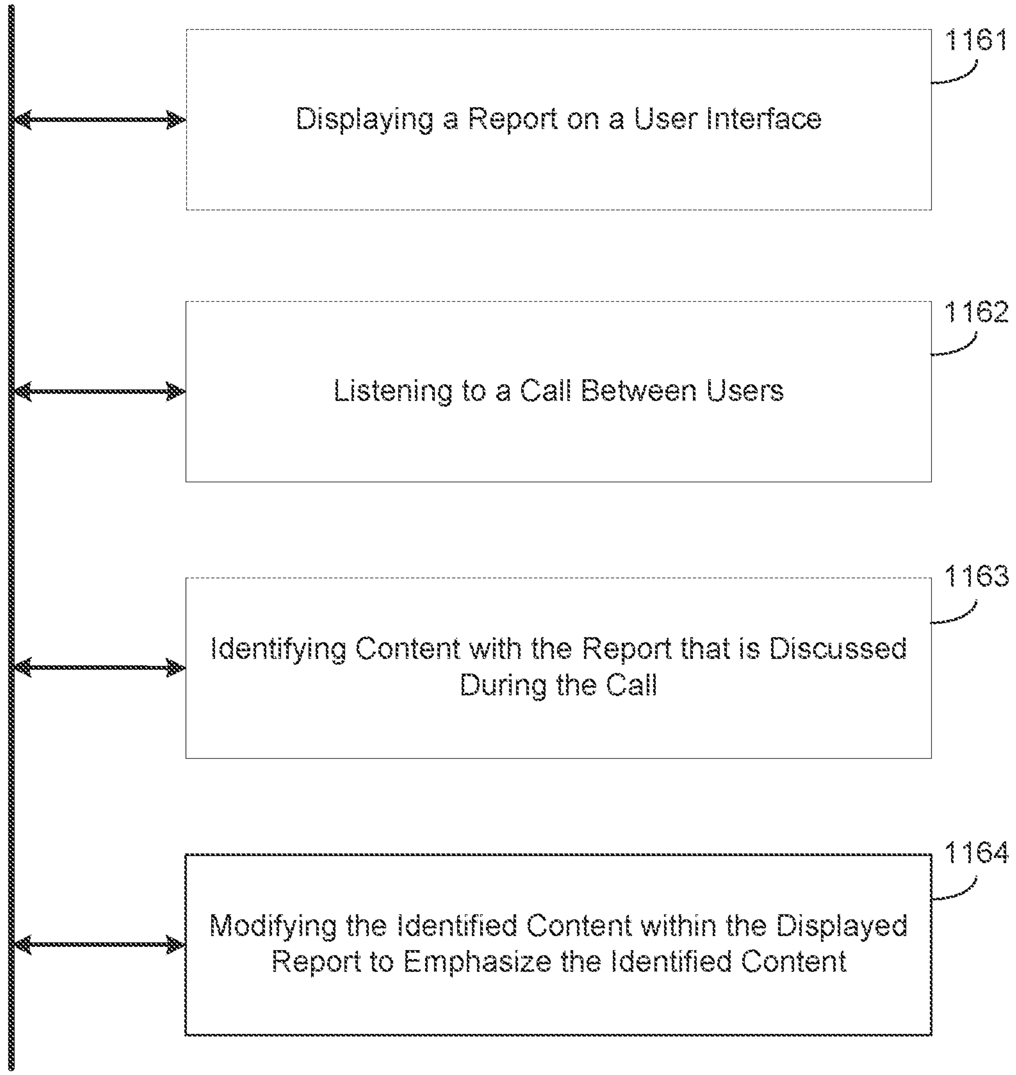
FIG. 11G is a diagram illustrating a method of dynamically modifying a user interface based on content discussed during a meeting according to example embodiments.

FIG. 11G illustrates a method 1160 of dynamically modifying a user interface based on content discussed during a meeting according to example embodiments. As an example, the method 1160 may be performed by a computing system, a software application, a server, a cloud platform, a combination of systems, and the like.

Referring to FIG. 11G, in 1161, the method may include displaying a report on a software application's user interface on a user device. In 1162, the method may include listening to a call between a user on the user device and a different user on a second user device that is connected to the user device via a network. In 1163, the method may include executing a generative artificial intelligence (GenAI) model based on content heard during the call and content displayed on the user interface to identify content within the displayed report discussed during the call. In 1164, the method may include modifying the displayed report to emphasize the identified content within the displayed report on the user interface.

In some embodiments, the displaying may include displaying a plurality of modules on the user interface, identifying a module from among the plurality of modules displaying the identified content, and enlarging only the identified module from among the plurality of modules to emphasize the identified content.

In some embodiments, the modifying may include modifying the report to emphasize the identified content on a user interface of the user device during the call between the user device and the second user device. In some embodiments, the report may include a sequence of windows of content to be displayed during the call, and the modifying comprises rearranging the sequence of windows of content based on the identified content.

In some embodiments, the executing may further include converting audio content from the call into text via a converter and executing the GenAI model on the text of the call to determine the identified content. In some embodiments, the method may further include identifying call content to be discussed at a later point in time during the call based on execution of the GenAI model on the content that is heard during the call, and displaying the call content on a user interface of the different user device. In some embodiments, the modification may include modifying an appearance of the identified content within the report to distinguish the identified content from others.

The above embodiments may be implemented in hardware, a computer program executed by a processor, firmware, or a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from and write information to the storage medium. In the alternative, the storage medium may be integral to the processor. The processor and the storage medium may reside in an application specific integrated circuit ("ASIC"). In the alternative, the processor and the storage medium may reside as discrete components. For example, FIG. 12 illustrates an example computer system architecture, which may represent or be integrated with any of the above-described components, etc.

Figure 12:
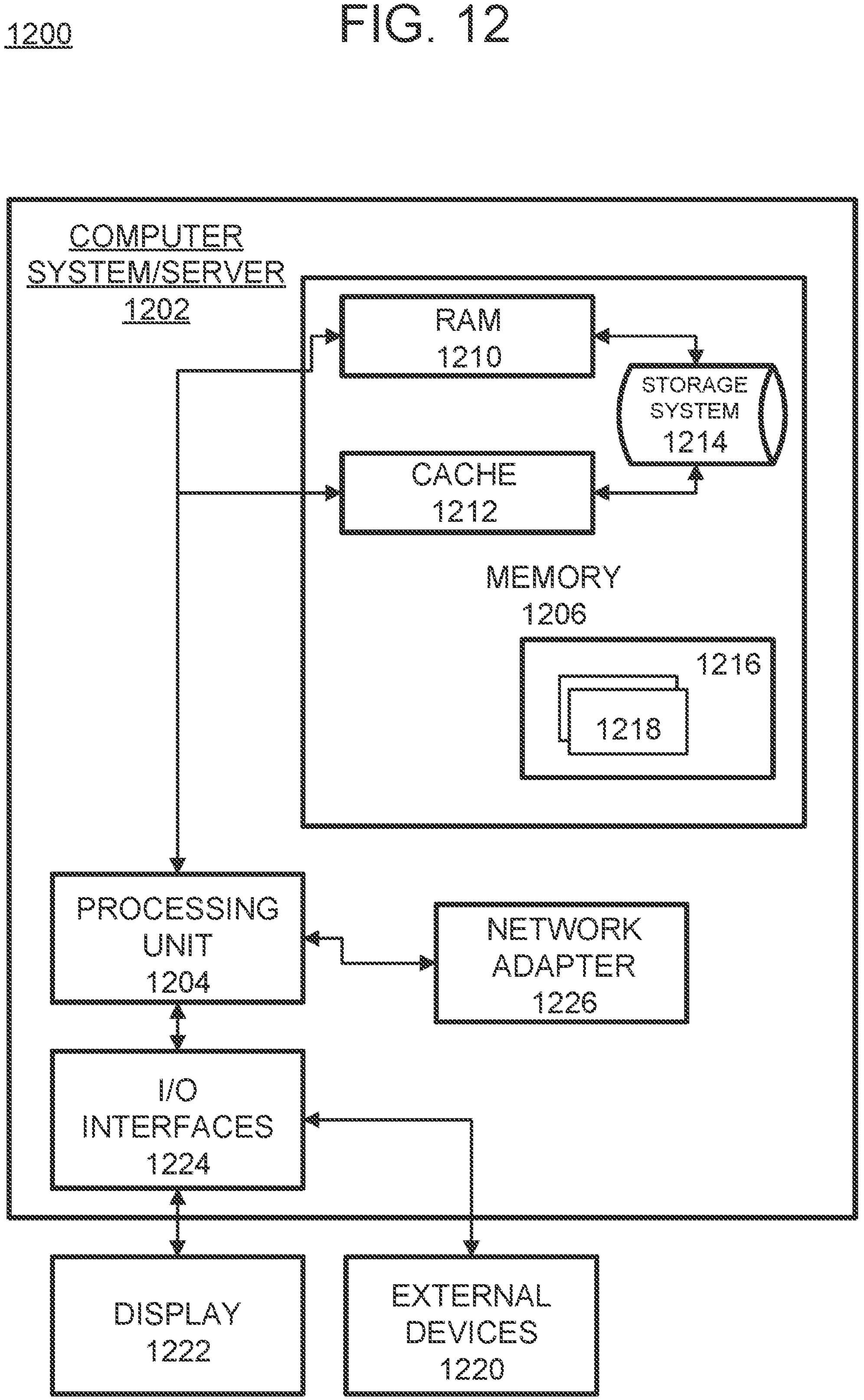
FIG. 12 is a diagram illustrating a computing system that may be used in any of the example embodiments described herein.

FIG. 12 illustrates an example system 1200 that supports one or more example embodiments described and/or depicted herein. The system 1200 comprises a computer system/server 1202, operational with numerous other general or special purpose computing system environments or configurations. Examples of well-known computing systems, environments, and/or configurations that may be suitable for use with computer system/server 1202 include but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 1202 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in local and remote computer system storage media, including memory storage devices.

As shown in FIG. 12, computer system/server 1202 in the example system 1200 is a general-purpose computing device. The components of computer system/server 1202 may include, but are not limited to, one or more processors or processing units (processor 1204), a system memory 1206, and a bus that couples various system components, including the system memory 1206 to the processor 1204.

The bus represents one or more of several types of bus structures, including a memory bus or memory controller, a peripheral bus, an accelerated graphics port, and a processor or local bus using various bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes various computer system readable media. Such media may be any available media that is accessible by computer system/server 1202, and it includes both volatile and non-volatile media, removable and non-removable media. The system memory 1206, in one embodiment, implements the flow diagrams of the other figures. The system memory 1206 can include computer system readable media in volatile memory, such as random-access memory (RAM) 1210 and/or cache memory 1212. Computer system/server 1202 may further include other removable/non-removable, volatile/non-volatile computer system storage media. By way of example, only storage system 1214 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM or other optical media can be provided. In such instances, each can be connected to the bus by one or more data media interfaces. As further depicted and described below, the system memory 1206 may include at least one program product with a set (e.g., at least one) of program modules configured to carry out the functions of various embodiments of the application.

Program/utility 1216, having a set (at least one) of program modules 1218, may be stored in the system memory 1206 by way of example, and not limitation, as well as an operating system, one or more application programs, other program modules, and program data. Each of the operating system, one or more application programs, other program modules, and program data or some combination thereof may include an implementation of a networking environment. Program modules 1218 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 1202 may also communicate with one or more external devices 1220 such as a keyboard, a pointing device, a display 1222, etc.; one or more devices that enable a user to interact with computer system/server 1202; and/or any devices (e.g., network card, modem, etc.) that enable computer system/server 1202 to communicate with one or more other computing devices. Such communication can occur via I/O interfaces 1224. Still yet, computer system/server 1202 can communicate with one or more networks, such as a local area network (LAN), a general wide area network (WAN), and/or a public network (e.g., the Internet) via network adapter 1226. As depicted, network adapter 1226 communicates with the other components of computer system/server 1202 via a bus. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

In one embodiment, the process of generating an efficient call script may include understanding the unique needs and nuances of each client. The current solution begins by determining metrics, such as client-set goals, distinct usage patterns, and comprehensive financial data. This analysis is used in an advanced transformer model, which computes a similarity score matrix. This matrix categorizes and identifies customers, especially those who align closely with a similarity score threshold of 80% or higher. As target customer segments are examined, the initial interactions (i.e., primary calls) are more closely examined. Leveraging a speech-to-text conversion model, spoken words from the primary calls are transformed into textual transcripts. These transcripts are further analyzed to ensure that the content resonates on a personal level. This is achieved through a semantic modification process. By aligning the text with a customer's past interactions and specific word choices, the resulting call script becomes personalized, enhancing engagement and rapport. Using an LLM model, continuous integration ensures that each call script remains not just current but evolves with the shifting needs and preferences of the customer base.

In one embodiment, the current solution comprises a system designed to capture and analyze pertinent details from conversational interactions between a user and an advisor. This is achieved through the dual mechanism of textual and tonal analysis applied to a captured call transcript. Textual analysis forms the primary component of this dual approach. By leveraging sophisticated Natural Language Processing (NLP) algorithms, the system parses transcribed interactions. This functionality, which is rigorously trained on extensive datasets, identifies key financial terms, queries, and specific patterns, allowing the system to discern the user's interests and questions. The outcome of this analysis serves as a foundation, providing a clear roadmap for the subsequent steps of report generation. For example, the textual analysis assures that the user's explicit queries are not only heard but also cataloged with precision.

While textual analysis focuses on the spoken word, tonal analysis dives deeper, exploring the nuances of how these words are conveyed. This process examines auditory attributes such as pitch, volume, and speech rate, which may be vital indicators of sentiment, urgency, or emphasis. Advanced audio processing algorithms underpin this method, analyzing the captured tone of interactions. For example, a heightened pitch might signal excitement, whereas a slowed speech rate could hint at contemplation. Machine learning models, trained on vast auditory datasets, then correlate these tonal variations to distinct sentiments. When used in tandem with textual insights, tonal analysis ensures that the generated reports reflect not just the user's questions but also their emotional context. The integration of tone analysis is particularly beneficial, as it allows the system to discern underlying sentiments and detect any non-standard query phrasings, ensuring comprehensive query capture. Upon acquiring a clear understanding of the user's queries, the system accesses a repository of pre-approved, trusted online sources. These sources enable the system to predict potential financial outcomes associated with the integration or removal of specific assets in the user's portfolio. To ensure that the generated report remains contemporaneous and relevant, the system additionally taps into vetted news agencies to glean recent market insights and developments. Consequently, the user, as well as their advisor, is furnished with a comprehensive report that not only addresses the initial query but also encapsulates broader market dynamics.

In one embodiment, a client's life goals are determined by the current solution. This determination is a multifaceted process that is employed to tailor personalized financial strategies. The initial step involves an extensive data collection phase. Information about clients' life aspirations can be manually entered by financial advisors into the customer database. This method offers a more personal touch, capturing direct interactions and discussions about financial objectives. An analysis is applied to the goals-based achievement plans set by clients on the app. These plans not only reveal current financial aims but also hint at broader life objectives. A GenAI system broadens the data collection scope. It possesses the capability to infer potential life goals by evaluating a client's web search history and social media activity, leveraging data sourced from this evaluated data. Post-data collection, an analysis phase commences, which involves matching the discerned life goals and demographics of the client with established customer segments. Such a comparison ensures that strategies are tailored to resonate with specific client profiles. Continuing with the analytics, the LLM version of the Gen AI model performs further analysis, juxtaposing individual client goals against the broader database of customers. The objective is a nuanced financial strategy intricately woven to align with the client's unique demographic and financial attributes. The underlying strength of the Gen AI model stems from its comprehensive training. It's honed using a dataset of customers. This data is categorized dynamically, with each client assigned a distinct financial score reflective of their past financial decisions. Positive scores indicate beneficial outcomes, while negative ones highlight less favorable choices. The segmentation process in the model includes metrics such as age, risk appetite, demographic data, financial savings, and transactional history. This approach ensures that the resulting financial strategies are not just efficient but deeply personalized, aligning seamlessly with each client's life trajectory.

When a client demonstrates interest in a specific asset by searching for it, the current solution logs this action in databases, categorizing it under 'recent searches.' This process not only captures the mere act of searching but also encapsulates additional parameters that enhance an understanding of the client's level of interest. For example, the duration a client spends on a particular asset page provides valuable insights into their level of engagement and possible intent. This stored data is used for subsequent analytical processes. Specifically, this information us utilized when setting up a simulated portfolio for A/B testing purposes where two scenarios are envisioned: one where the portfolio includes the searched asset and another where it's excluded. This bifurcation aids in discerning the potential impact of the asset on the overall portfolio. The simulation process uses the predictive capabilities of the Gen AI system. Leveraging vast datasets and intricate algorithms, the model forecasts potential outcomes. One of the foundational techniques employed in this predictive phase is the Martingale technique, a renowned strategy in probability theory. The culmination of this process is a dual-fold output: a projected price for the new asset and a comprehensive portfolio simulation that integrates the probable effects of adding the asset.

In one embodiment, the current solution anticipates an expected life change of a client, utilizing a dual-faceted approach. First, the current solution listens intently to the calls between the advisor and the client. During these interactions, any mention by the caller of potential future scenarios conveyed either through direct statements, examples, or broader hypotheticals, is considered. These voiced anticipations provide a direct insight into what the client envisions for their future. Concurrently, a more analytical method is deployed, examining the transaction and web browsing histories associated with the client. Such data offers a window into the client's financial behaviors and digital interests, both of which can hint at impending life events or shifts. Upon collating these inputs from all accounts associated with a client, they are then processed through the Gen AI machine learning model. This advanced system generates a probabilistic score for an array of potential life events. To ensure precision and relevance, the approach focuses on the top three scenarios with a probability exceeding 85%. These high-probability predictions are then presented to the client, resonating with their voiced anticipations, and offering additional scenarios they might not have expressly mentioned.

For example, a client who, through indirect indications or digital behaviors, seems to be expecting a child. Upon detecting such cues, the machine learning model identifies the top three financial or logistical tasks that align with such a life event. This could range from setting up a RESP for future educational expenses to exploring comprehensive health plans.

When an advisor engages in a dialogue with a client about their financial report, the current solution adapts the content displayed on the client's screen, based on the real-time conversation unfolding between the two parties via the use of a GenAI model, designed to comprehend and act upon the nuances of the conversation. Training the GenAI model for such interactive capabilities involves a multi-faceted approach. Primarily, the model utilizes the conversation history to anticipate client queries or concerns. The GenAI system has integrated access to the entity's other simulation models designed for predictive-based inquiries. Therefore, when discussions lean towards forward-looking financial scenarios, GenAI taps into these predictive models for relevant data. Concurrently, for conversations that dwell more on the intricacies of financial jargon, the GenAI LLM (Language Learning Model) adjusts the complexity of terminologies to align with the client's comprehension level. The outcome of these interactions is an additional, tailored report delivered to the client immediately post-conversation. An alternative method of report modification stems from the advisor's proactive involvement. If, during the conversation, the advisor discerns specific questions or concerns from the client, they have the facility to manually input this information into a dedicated chat interface. Once entered, the GenAI LLM processes the advisor's inputs. By interfacing with the appropriate predictive models, the model ensures the client receives an updated report in near real-time, such as a few minutes.

In one embodiment, a system comprising a storage medium and a communication interface connected to the storage medium exists wherein the communication interface is configured to capture data comprising voice notes and/or short voice memos from a user. Responsive to the reception of the data, the current application identifies a main intention or objective of the memo. Based on the recognized intent, the system searches its stored contacts to determine a most relevant individual associated with the mentioned objective. The GenAI model, as described herein, is executed to draft a concise message and/or meeting agenda related to the intention. The system schedules this as a digital reminder or meeting in an appropriate user's device in the storage medium.

In one embodiment, a system is presented comprising a visual input device, such as a camera, and an associated graphics processing unit (GPU). The visual input device captures non-verbal cues and gestures of a user during a video call. The system identifies the user's underlying intentions or objectives from the video conversation via a processing of the cues and gestures. Once discerned, the system matches the intention to a different user from a predetermined list based on visual data associations. The GenAI model, as described herein, is then executed to frame a visual storyboard or presentation. This visual storyboard is automatically embedded in a digital visual diary or timeline of the identified user in the GPU's memory.

In one embodiment, a system is presented, comprising a text input interface and a connected database. Users can type or input text messages or emails. Upon receiving these text inputs, a text analysis system detects the user's primary objective or purpose from the content. Using the associations in the database, a suitable match, i.e., a different user associated with the detected goal, is found. The GenAI model, as described herein, composes a detailed email or message script, which is utilized as a draft or a scheduled message in a mailbox of the matched user stored within the database.

In one embodiment, a system comprising a storage module, an audio output system, and an associated computational unit is presented. This computational unit, when connected to the storage module, maintains a collection of investments held by a user. The system additionally connects to wearable gadgets of the user to gather data, such as biometric and mood data. By applying the GenAI model, as described herein, on the current investments and the biometric inputs, the system identifies an unheld financial instrument or asset that may pique the user's interest. The system drafts an alternative investment plan including this new asset. The user is then informed (e.g., audibly informed) about this new potential investment strategy via the audio output system, in the form of a synthesized voice narration, for example.

In one embodiment, a system comprising an optical scanner, a projection system, and a linked central processing mechanism is presented. The central mechanism stores a user's collection of tangible assets like art, jewelry, or collectibles. The optical scanner captures images or patterns related to the user's present surroundings or worn attire. The GenAI model, as described herein, is executed on the user's asset list and the visual cues, and deduces a possible item of attraction that is not present in the user's collection. The system generates a hypothetical collection considering this new item. This newly crafted collection is then visually projected for the user via the projection system, allowing them to see how the new item would fit with their existing assets.

In one embodiment, a system is presented, comprising a tactile feedback module, a touchscreen panel, and a linked analytical engine. The analytical engine maintains records of a user's real estate properties and synchronizes with the user's device, such as a smartphone, to collect travel and location-based data. Using the GenAI model, as described herein, on the real estate data and the geographical preferences of the user, the system recognizes a potential property location the user might desire. The model then generates a different real estate portfolio containing this new property suggestion. The user can then explore this new portfolio on the touchscreen panel, with the tactile feedback module providing responsive haptic signals for an immersive browsing experience.

In one embodiment, a system is presented, comprising a storage unit, a speaker system, and an integrated computational module. This module, linked to the storage unit, holds an archive of a user's financial investments. The system is also able to access voice recordings from telephonic conversations between the user and another party. By running a GenAI model, as described herein, on these voice recordings, the system discerns potential milestones in the user's life. Depending on this identified life event and the user's current financial situation, the apparatus suggests potential modifications to the user's investment strategy. These proposed changes are then communicated to the user audibly through the speaker system.

In one embodiment, a system is presented, comprising a data connectivity module and a connected analytical engine. This engine archives physical properties owned by a user, such as houses or vehicles. The system also connects to messaging apps to analyze chat histories involving the user through communication with the user device, such as a mobile device. A GenAI model, as described herein, when applied to these chat excerpts, detects forthcoming significant changes in the user's life, such as a relocation or an expanding family. Based on such detected events and the existing physical properties of the user, the apparatus suggests a new property strategy. This proposed property plan is visually displayed to the user.

In one embodiment, a system is presented comprising a biometric reader, a touchscreen display, and a connected processing core. The core keeps records of a user's insurance policies. Through the biometric reader on the user receiving data, such as a heart rate or skin conductivity, the apparatus gauges the emotional intensity of a user during face-to-face conversations. When the GenAI model, as described herein, deduces from these biometric signals a significant life event, such as a health concern or imminent marriage, the system recalibrates the user's insurance coverage suggestions. These revised insurance proposals are presented to the user.

In one embodiment, a system is presented, comprising a data synchronization module and an associated analytical engine. This engine, synchronized with the data module, retains an inventory of a user's stock market investments. The system accesses a device associated with the user, such as a smartphone, to obtain real-time activities, such as recent web searches or news consumption. After applying the GenAI model, as described herein, to the combination of these activities and the user's stock portfolio, it identifies a stock or financial instrument the user might find interesting. The system simulates the future performance of the user's portfolio upon adding this newly identified stock. The user is informed about the identified performance and the new stock suggestion.

In one embodiment, a system is presented, comprising a wearable connectivity interface and a connected forecasting module. This module archives a list of a user's real estate holdings and gathers data such as visited locations or viewed property advertisements. The GenAI model, as described herein, processes this data in conjunction with the user's current property list to identify a potential new property location. The system displays the prospective valuation or benefits of the user's real estate collection if the new property were to be added.

In one embodiment, a system is presented, comprising a sensor array, a digital interactive table, and an integrated computational core. The core holds data regarding a user's collection of rare items like antiques or vintage cars. By monitoring ambient environmental factors like room temperature, humidity, or light exposure through the sensor array, the system infers optimal conditions for storing such collectibles. Using the GenAI model described herein, the apparatus determines if a newly coveted item, based on these conditions and the current collection, would be beneficial. The system simulates the prospective appreciation or depreciation of the entire collection if the new item were to be incorporated. This prediction is visually mapped out on the digital interactive table for the user's analysis.

In one embodiment, a system is presented, comprising a vocal transcription unit, a speaker system, and an associated advisory engine. This engine captures the user's oral interactions or directives concerning their investment portfolio over a specific timeframe. Using the GenAI model, as described herein. on these vocal inputs and the user's recent portfolio changes, it defines a financial aspiration for the user. When the user vocalizes a query about their investment portfolio via a voice-activated device, the apparatus responds by voicing out the deduced goal along with an auditory summary of their current portfolio composition.

In one embodiment, a system is presented, comprising a biometric input module and a connected goal-formulation core. The biometric input module, such as a pulse sensor or a facial expression detector, captures the user's physiological responses when they view or adjust their digital assets collection. Through the GenAI model, as described herein, by analyzing these responses along with the recorded portfolio interactions, the system crafts a probable objective for the user's digital collection. When the user physically interacts with their digital device, like a touchscreen or wearable gadget, seeking portfolio details, the apparatus provides tactile signals outlining the identified goal.

In one embodiment, a system is presented, comprising a gesture recognition system and a linked objective-deduction module. This module chronicles a user's movements or gestures, such as hand swipes or nods, when they engage with their collection of tangible assets such as art or antiques. With the GenAI model, as described herein, assistance, by considering these gestures and the historical data of the tangible assets' repositioning or examination, it determines a potential collecting ambition for the user. Upon the gesture prompting a request for information on their collection, the apparatus displays the inferred collecting ambition alongside a graphical representation of their existing tangible assets.

In one embodiment, a system is presented, comprising a visual capture module, a display unit, and an associated classification engine. This engine accesses video streams from a video call between a user and another participant. By running the GenAI model, as described herein, on the visual elements such as images, slides, or charts shared during the conversation, it determines the discussion's primary theme. Based on visual cues or symbols from the identified theme, the system correlates with a pre-existing video conference group or list stored in the memory. The user's video profile or avatar is then added to this group, and the update is visually represented on the display unit.

In one embodiment, a system is presented, comprising a sentiment analysis tool, a notification system, and a connected contextual core. The tool gauges the emotional undertones of a conversation between a user and a peer, based on voice modulations or word choices. The GenAI model, as described herein, when applied to these emotional markers, discerns the underlying subject of the discussion. Based on emotional keywords or tonal inflections, the system aligns with a relevant emotional support group or helpline list stored in the memory. The user's contact information is subsequently added to this group, and a confirmation or welcome message is relayed to the user through the notification system.

In one embodiment, a system is presented comprising an ambient noise detector and a linked topic-detection unit. The detector picks up background sounds or noises during a voice call between a user and another individual. Utilizing the GenAI model described herein on these background auditory elements, it identifies the conversation's probable environment or setting, such as a cafe, office, or park. Based on auditory signatures or specific environmental sounds, the system maps to a contextual group or list, e.g., "Cafe Networkers" or "Park Joggers" stored in the memory. The user's device ID or number is then added to this relevant list.

In one embodiment, a system is presented comprising a visual recognition system, and a connected analytical engine. The engine, when activated, initiates a real-time transcription of a video call between a user and another participant and captures any accompanying visual elements like charts, slides, or gestures. By applying the GenAI model as described herein on this transcribed content and content in the initially displayed report, the portions of the report discussed during the call are determined. The system enhances these identified sections on the user interface using modified visuals.

In one embodiment, a system is presented comprising an ambient noise filter, an auditory alert system, and a linked content-highlighting core. As a voice call between a user and another user progresses, the noise filter isolates the conversation by filtering out background sounds. The GenAI model as described herein, when applied to the filtered voice content and the report's content, determines the segments of the report being addressed during the call. The user interface then bolsters these pinpointed segments by changing their auditory pitch or tone. When the user clicks or selects these emphasized segments, the auditory alert system plays back distinct tones to mark their importance.

In one embodiment, a system is presented comprising a sentiment analysis module, a projection system, and an associated emotion-mapping unit. The module gauges the emotional undertones and emphasis during a conversation between a user and another party. By deploying the GenAI model as described herein on these emotional markers and the content of the report, the system discerns the sections of the report that elicited strong reactions or were discussed. The system uses the projection system to overlay emotional icons or symbols (such as a smiley or exclamation mark) on these identified segments of the report on the user interface.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application but is intended to provide one example of many embodiments. Indeed, methods, systems, and apparatuses disclosed herein may be implemented in localized and distributed forms consistent with computing technology.

It should be noted that some of the system features described in this specification have been presented as modules to emphasize their implementation independence. For example, a module may be implemented as a hardware circuit comprising custom, very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, etc.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations, which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several code segments, among different programs, and across several memory devices. Similarly, operational data may be identified and illustrated within modules, embodied in any suitable form, and organized within any suitable type of data structure. The operational data may be collected as a single data set or may be distributed over different locations, including over different storage devices, and may exist, at least partially, merely as electronic signals on a system or network.

It will be readily understood that the application components, as generally described and illustrated in the figures herein, may be arranged and designed in a wide variety of configurations. Thus, the detailed description of the embodiments is not intended to limit the scope of the application as claimed but is merely representative of selected embodiments of the application.

One with ordinary skill in the art will readily understand that the above may be practiced with steps in a different order and/or hardware elements in configurations that are different from those disclosed. Therefore, although the application has been described based on these preferred embodiments, certain modifications, variations, and alternative constructions would be apparent to those of skill in the art.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:

a memory configured to store call lists; and a processor coupled to the memory, the processor configured to:

receive live content from a conversation between a first device and a second device connected via a network;

identify a topic of the conversation based on execution of a generative artificial intelligence (GenAI) model on the live content from the conversation;

identify a call list that contains devices scheduled to receive a call associated with the topic of the conversation;

add an identifier of the first device to the call list; and import call content to be discussed on the call from the apparatus into a calendar application of the first device, prior to the call.

2. The apparatus of claim 1, wherein the processor is configured to listen to a live conversation between the first device and the second device and identify the topic of conversation while the live conversation occurs.

3. The apparatus of claim 2, wherein the processor is configured to convert audio content from the live conversation into text via a converter and execute the GenAI model on the text to identify the topic of the conversation.

4. The apparatus of claim 1, wherein the processor is further configured to display an indicator of addition to the call list via a user interface on the first device.

5. The apparatus of claim 1, wherein the processor is further configured to generate the call content based on execution of the GenAI model on the live content from the conversation, and store the call content with the call list in the memory.

6. The apparatus of claim 1, wherein the processor is configured to receive a chat conversation from a conversation window displayed on the first device and the second device, and identify the topic of interest based on execution of the GenAI model on text content included in the chat conversation.

7. The apparatus of claim 1, wherein the processor is configured to train the GenAI model to identify topics of conversations based on execution of the GenAI model on historical conversations and topics of the conversations.

8. The apparatus of claim 1, wherein the processor is configured to add a phone number of the first device to a meeting invite and import the meeting invite to the calendar application of the first device.

9. The apparatus of claim 1, wherein the processor is configured to generate structured call agenda data associated with the topic of conversation and import the structured call agenda data into the calendar application.

10. A method comprising:

receiving, at a host platform, live content from a conversation between a first device and a second device connected via a network;

identifying a topic of the conversation based on execution of a generative artificial intelligence (GenAI) model on the live content from the conversation;

identifying a call list containing devices scheduled to receive a call associated with the topic of the conversation;

adding an identifier of the first device to the call list; and importing call content to be discussed during the call from the host platform into a calendar application of the first device, prior to the call.

11. The method of claim 10, wherein the receiving comprises listening to a live conversation between the first device and the second device and identifying the topic of conversation while the live conversation occurs.

12. The method of claim 11, wherein the identifying further comprises converting audio content from the live conversation into text via a converter and executing the GenAI model on the text to identify the topic of the conversation.

13. The method of claim 10, wherein the method further comprises displaying an indicator of addition to the call list via a user interface on the first device.

14. The method of claim 10, wherein the method further comprises generating the call content based on execution of the GenAI model on the live content from the conversation, and store the call content with the call list in memory.

15. The method of claim 10, wherein the receiving comprises receiving a chat conversation from a conversation window displayed on the first device and the second device, and the identifying comprises identifying the topic of interest based on execution of the GenAI model on text content included in the chat conversation.

16. The method of claim 10, wherein the method further comprises training the GenAI model to identify topics of conversations based on execution of the GenAI model on historical conversations and topics of the conversations.

17. The method of claim 10, wherein the adding comprises adding a phone number of first device to a meeting invite and the importing comprises importing the meeting invite to the calendar application of the first device.

18. A non-transitory computer-readable medium comprising instructions stored therein which when executed by a processor cause a computer to perform:

receiving, at a host platform, live content from a conversation between a first device and a second device connected via a network;

identifying a topic of the conversation based on execution of a generative artificial intelligence (GenAI) model on the live content from the conversation;

identifying a call list containing devices scheduled to receive a call associated with the topic of the conversation;

adding an identifier of the first device to the call list; and importing call content to be discussed during the call from the host platform into a calendar application of the first device, prior to the call.

19. The non-transitory computer-readable medium of claim 18, wherein the receiving comprises listening to a live conversation between the first device and the second device and identifying the topic of conversation while the live conversation occurs.

20. The non-transitory computer-readable medium of claim 18, wherein the computer is further configured to perform displaying an indicator of addition to the call list via a user interface on the first device.

* * * * *